United States Patent
Hwang et al.

(10) Patent No.: US 12,216,508 B2
(45) Date of Patent: Feb. 4, 2025

(54) ARM STRUCTURE, HINGE STRUCTURE INCLUDING THE ARM STRUCTURE, AND ELECTRONIC DEVICE INCLUDING THE SAME

(71) Applicant: Samsung Electronics Co., Ltd., Suwon-si (KR)

(72) Inventors: Seunghyun Hwang, Suwon-si (KR); Donghyun Byun, Suwon-si (KR); Sukjin Yun, Suwon-si (KR); Uyhyeon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 18/170,071

(22) Filed: Feb. 16, 2023

(65) Prior Publication Data

US 2023/0205282 A1  Jun. 29, 2023

Related U.S. Application Data

(63) Continuation of application No. 17/323,434, filed on May 18, 2021, now Pat. No. 11,809,239.

(30) Foreign Application Priority Data

May 27, 2020 (KR) .................. 10-2020-0063724
Jul. 30, 2020 (KR) .................. 10-2020-0095315
Sep. 8, 2020 (KR) .................. 10-2020-0114513

(51) Int. Cl.
*G06F 1/16* (2006.01)
*F16C 11/04* (2006.01)
(Continued)

(52) U.S. Cl.
CPC ............ *G06F 1/1681* (2013.01); *F16C 11/04* (2013.01); *G06F 1/1652* (2013.01); *E05D 3/122* (2013.01);
(Continued)

(58) Field of Classification Search
CPC .... G06F 1/1681; G06F 1/1652; G06F 1/1616; G06F 1/1633; H04M 1/022; H04M 1/0268; H04M 1/0216
See application file for complete search history.

(56) References Cited

U.S. PATENT DOCUMENTS 6,948,217 B2    9/2005  Higano et al.
7,111,362 B2 *  9/2006  Gordecki ............ H04M 1/0216
                                                           361/679.28
(Continued)

FOREIGN PATENT DOCUMENTS

CN         1589534 A    3/2005
CN       107797612 A    3/2018
(Continued)

OTHER PUBLICATIONS

European Search Report dated Jun. 19, 2023, issued in European Application No. 23158483.0.
(Continued)

*Primary Examiner* — Anthony M Haughton
*Assistant Examiner* — Theron S Milliser
(74) *Attorney, Agent, or Firm* — Jefferson IP Law, LLP

(57) ABSTRACT

An arm structure of an electronic device is provided. The arm structure includes an arm body, a first cam disposed on one side of the arm body and including a first hole into which at least a portion of a rotating shaft providing a folding operation of the electronic device is inserted, a peak and a valley being formed around the first hole, a second cam arranged side-by-side on a same axis as the one side of the arm body, spaced apart from the first cam, and including a second hole into which at least a portion of the rotating shaft is inserted, a peak and a valley being formed around the second hole, and a connecting part disposed on another side
(Continued)

of the arm body and fastened with a rotating part providing rotation of the electronic device.

20 Claims, 30 Drawing Sheets

(51) Int. Cl.
 *E05D 3/12* (2006.01)
 *E05D 11/10* (2006.01)
(52) U.S. Cl.
 CPC ..... *E05D 11/1014* (2013.01); *E05Y 2201/418* (2013.01); *E05Y 2999/00* (2024.05)

(56) References Cited

U.S. PATENT DOCUMENTS

| | | | | |
|---|---|---|---|---|
| 7,219,393 B2* | 5/2007 | Kida | .................. | G06F 1/1681 16/221 |
| 7,383,618 B2* | 6/2008 | Lu | .................. | H04M 1/0216 16/303 |
| 7,515,707 B2* | 4/2009 | Ka | .................. | G06F 1/1683 455/575.4 |
| 8,266,766 B2* | 9/2012 | Huang | .................. | G06F 1/1681 16/303 |
| 8,286,307 B2* | 10/2012 | Cheng | .................. | H04M 1/0216 16/303 |
| 9,027,205 B2 | 5/2015 | Ahn et al. | | |
| 9,198,312 B2 | 11/2015 | Zhang et al. | | |
| 9,798,359 B2* | 10/2017 | Seo | .................. | G06F 1/1652 |
| 9,992,888 B2 | 6/2018 | Moon et al. | | |
| 10,037,058 B2 | 7/2018 | Kato | | |
| 10,231,347 B2 | 3/2019 | Seo et al. | | |
| 10,364,837 B2* | 7/2019 | Lee | .................. | F16C 11/04 |
| 10,394,062 B1 | 8/2019 | Song | | |
| 10,433,438 B2 | 10/2019 | Moon et al. | | |
| 10,465,427 B2 | 11/2019 | Chen et al. | | |
| 10,725,505 B1* | 7/2020 | Hallar | .................. | G06F 1/1662 |
| 10,775,852 B2 | 9/2020 | Kim et al. | | |
| 10,827,633 B2 | 11/2020 | Yoo et al. | | |
| 10,845,850 B1 | 11/2020 | Kang et al. | | |
| 10,856,430 B2 | 12/2020 | Yoo et al. | | |
| 10,915,149 B2* | 2/2021 | Harmon | .................. | E05F 1/1253 |
| 10,945,346 B2 | 3/2021 | Moon et al. | | |
| 11,032,929 B2 | 6/2021 | Yoo et al. | | |
| 11,061,445 B2 | 7/2021 | Kim et al. | | |
| 11,231,754 B2 | 1/2022 | Kang et al. | | |
| 11,266,033 B2 | 3/2022 | Moon et al. | | |
| 11,287,853 B2* | 3/2022 | Yao | .................. | G06F 1/1652 |
| 11,340,661 B2* | 5/2022 | Yen | .................. | G06F 1/1616 |
| 11,385,687 B1 | 7/2022 | Kim et al. | | |
| 11,435,785 B2* | 9/2022 | Song | .................. | G06F 1/1652 |
| 11,467,633 B2 | 10/2022 | Liao et al. | | |
| 11,576,272 B2 | 2/2023 | Yoo et al. | | |
| 11,611,641 B2* | 3/2023 | Cha | .................. | H04M 1/0268 |
| 11,619,978 B2* | 4/2023 | Jan | .................. | G06F 1/1681 361/679.27 |
| 11,625,076 B2* | 4/2023 | Yao | .................. | G06F 1/1616 16/354 |
| 11,843,710 B2* | 12/2023 | Huang | .................. | H04M 1/0214 |
| 11,846,998 B2* | 12/2023 | Wu | .................. | H05K 5/0226 |
| 2004/0025299 A1 | 2/2004 | Higano et al. | | |
| 2005/0117284 A1* | 6/2005 | Kida | .................. | G06F 1/1681 361/679.27 |
| 2012/0272481 A1* | 11/2012 | Ahn | .................. | H04M 1/0216 16/386 |
| 2013/0014346 A1 | 1/2013 | Ahn et al. | | |
| 2014/0084772 A1 | 3/2014 | Zhang et al. | | |
| 2018/0049329 A1 | 2/2018 | Seo et al. | | |
| 2018/0059740 A1 | 3/2018 | Kato | | |
| 2018/0077810 A1 | 3/2018 | Moon et al. | | |
| 2018/0230726 A1 | 8/2018 | Chen et al. | | |
| 2018/0309861 A1* | 10/2018 | Lin | .................. | H04M 1/021 |
| 2018/0324964 A1 | 11/2018 | Yoo et al. | | |
| 2020/0097051 A1 | 3/2020 | Liu | | |
| 2020/0348732 A1 | 11/2020 | Kang et al. | | |
| 2021/0041921 A1 | 2/2021 | Kang et al. | | |
| 2021/0081007 A1* | 3/2021 | Jan | .................. | G06F 1/1681 |
| 2021/0165466 A1 | 6/2021 | Kang et al. | | |
| 2021/0173449 A1* | 6/2021 | Yao | .................. | G06F 1/1616 |
| 2021/0181808 A1 | 6/2021 | Liao et al. | | |
| 2021/0247815 A1 | 8/2021 | Shim et al. | | |
| 2021/0263565 A1* | 8/2021 | Yen | .................. | G06F 1/1681 |
| 2022/0035421 A1* | 2/2022 | Yao | .................. | G06F 1/1652 |
| 2022/0113770 A1 | 4/2022 | Kang et al. | | |
| 2022/0182471 A1* | 6/2022 | Cha | .................. | H04M 1/0268 |
| 2022/0264756 A1 | 8/2022 | Oh | | |
| 2022/0291725 A1 | 9/2022 | Kim et al. | | |
| 2022/0303371 A1* | 9/2022 | Liao | .................. | H04M 1/0216 |
| 2022/0317730 A1 | 10/2022 | Cho | | |
| 2022/0407950 A1* | 12/2022 | Huang | .................. | H04M 1/0268 |
| 2023/0007797 A1* | 1/2023 | Jiang | .................. | H05K 5/0226 |
| 2023/0044990 A1 | 2/2023 | Park et al. | | |
| 2023/0213983 A1* | 7/2023 | Yun | .................. | H04M 1/022 361/679.27 |
| 2023/0403347 A1* | 12/2023 | Liu | .................. | H04M 1/022 |
| 2024/0032226 A1* | 1/2024 | Jiang | .................. | G06F 1/1652 |

FOREIGN PATENT DOCUMENTS

| | | |
|---|---|---|
| CN | 109478384 A | 3/2019 |
| JP | 2007-064427 A | 3/2007 |
| KR | 10-1142836 B1 | 5/2012 |
| KR | 10-1210540 B1 | 12/2012 |
| KR | 20-0466763 Y1 | 5/2013 |
| KR | 10-2018-0027467 A | 3/2018 |
| KR | 10-1856780 B1 | 5/2018 |
| KR | 10-2019-0062107 A | 6/2019 |
| WO | 03/044974 A1 | 5/2003 |
| WO | 2018/223875 A1 | 12/2018 |

OTHER PUBLICATIONS

European Search Report dated Jun. 20, 2023, issued in European Application No. 21813739.6.
U.S. Notice of Allowance dated Jun. 30, 2023, issued in U.S. Appl. No. 17/323,434.
U.S. Office Action dated Feb. 16, 2023, issued in U.S. Appl. No. 17/323,434.
International Search Report with Written Opinion dated Sep. 16, 2021; International Appln. No. PCT/KR2021/006219.
Korean Office Action with English translation dated Oct. 27, 2021; Korean Appln. No. 10-2020-0095315.
Indian Office Action dated Feb. 8, 2024, issued in Indian Application No. 202217070170.
Chinese Office Action dated Sep. 29, 2024, issued in Chinese Application No. 202180038788.3.

* cited by examiner

ARM STRUCTURE, HINGE STRUCTURE INCLUDING THE ARM STRUCTURE, AND ELECTRONIC DEVICE INCLUDING THE SAME

CROSS-REFERENCE TO RELATED APPLICATION(S)

This application is a continuation application of prior application Ser. No. 17/323,434, filed on based on May 18, 2021, which is based on and claims priority under 35 U.S.C. § 119 (a) of a Korean patent application number 10-2020-0063724, filed on May 27, 2020, in the Korean Intellectual Property Office, of a Korean patent application number 10-2020-0095315, filed on Jul. 30, 2020, in the Korean Intellectual Property Office, and of a Korean patent application number 10-2020-0114513, filed on Sep. 8, 2020, in the Korean Intellectual Property Office, the disclosure of each of which is incorporated by reference herein in its entirety.

BACKGROUND

1. Field

The disclosure relates to an electronic device including a structure of an arm and a structure of a hinge. More specifically, the disclosure relates to a structure of an arm and a structure of a hinge capable of providing a detent load of a specified size such that a folding operation or a folded state of a foldable electronic device remains stable.

2. Description of Related Art

Portable electronic devices such as smartphones may provide various functions, such as a call, a video playback, and an internet search, based on various types of applications. Users may want to use the above-mentioned various functions through a wider screen. However, the larger the screen, the lower the portability may be. Accordingly, foldable portable electronic devices with enhanced portability by utilizing a foldable structure have been developed.

In the foldable electronic device, a hinge structure may be disposed to be connected with adjacent housings and rotate to support the housings while the housings are rotating at a predetermined angle.

The foldable electronic device may include a display in which at least a portion is folded. The display is formed to have a predetermined thickness or less so that it is foldable, and thus, the strength of the display may be weakened, and stabbing may occur due to external pressure or impact. To solve the problem, a display with increased rigidity or reaction force (e.g., increase in the thickness of the display) may be applied. When the display thickness increases, the repulsive force in the folded state (for example, the restoring force generated to return to the unfolded state) increases, which may lead to defects in the folding operation of the display (for example, the display may not be completely folded).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an arm structure and a hinge structure capable of providing a detent load (or hinge force, or force for maintaining a specific state of an electronic device) of a specified size such that a folding operation or a folded state of a foldable electronic device remains stable, and an electronic device including the same.

Another aspect of the disclosure is to provide an arm structure and a hinge structure capable of providing a detent load of a specified size without increasing the size (e.g., thickness) of the electronic device or while suppressing an increase in size (e.g., thickness), and an electronic device including the same.

Additional aspects will be set forth in part in the description which follows and, in part, will be apparent from the description, or may be learned by practice of the presented embodiments.

In accordance with an aspect of the disclosure, an electronic device (or portable electronic device, portable communication device, foldable electronic device, foldable electronic device having a communication function, or the like) is provided. The electronic device includes a housing including a first housing and a second housing, a hinge structure accommodated in the housing and connected to the first housing and the second housing, and a flexible display disposed over the first housing, the hinge structure, and the second housing. The hinge structure includes a first rotating shaft rotating about a first axis, a second rotating shaft rotating about a second axis, a first arm part including a first cam structure and a second cam structure connected to the first rotating shaft, a second arm part including a third cam structure and a fourth cam structure connected to the second rotating shaft, a first rotating part connected to the first arm part and rotating about a third axis, a second rotating part connected to the second arm part and rotating about a fourth axis, a first cam member including a first cam engaged with the first cam structure and a second cam engaged with the third cam structure, a second cam member including a third cam engaged with the second cam structure and a fourth cam engaged with the fourth cam structure, a first elastic body connected to the first rotating shaft to provide an elastic force to the first cam, a second elastic body connected to the second rotating shaft to provide an elastic force to the second cam, a third elastic body connected to the first rotating shaft to provide an elastic force to the third cam, and a fourth elastic body connected to the second rotating shaft to provide an elastic force to the fourth cam.

In accordance with another aspect of the disclosure, a hinge structure used for a foldable electronic device is provided. The hinge structure includes a first rotating part connected to a first housing of the foldable electronic device and rotating within a predetermined angular range, a second rotating part connected to a second housing of the foldable electronic device and rotating with rotation of the first rotating part, a first arm part connected to the first rotating part and including a first cam structure and a second cam structure spaced apart from each other by a predetermined interval, a second arm part connected to the second rotating part and including a third cam structure and a fourth cam structure spaced apart from each other by a predetermined interval, a first rotating shaft rotating about a first axis with at least a portion thereof being inserted into the first cam structure and the second cam structure, a second rotating shaft rotating about a second axis with at least a portion thereof being inserted into the third cam structure and the fourth cam structure, a first cam member put on the first rotating shaft and including a first cam engaged with the first cam structure and a second cam engaged with the third cam structure, a second cam member put on the second rotating shaft and including a third cam engaged with the second cam structure and a fourth cam engaged with the fourth cam structure, a first elastic body connected to the first rotating shaft to provide an elastic force to the first cam, a second elastic body connected to the second rotating shaft to provide an elastic force to the second cam, a third elastic body connected to the first rotating shaft to provide an elastic force to the third cam, and a fourth elastic body connected to the second rotating shaft to provide an elastic force to the fourth cam, in which the first rotating part may rotate about a third axis and the second rotating part may rotate about a fourth axis.

In accordance with another aspect of the disclosure, an arm structure used for a foldable electronic device is provided. The arm structure includes an arm body, a first cam disposed on one side of the arm body and including a first hole into which at least a portion of a rotating shaft used for a folding operation of the foldable electronic device is inserted, a peak and a valley being formed around the first hole, a second cam arranged side-by-side on the same axis as the one side of the arm body, spaced apart from the first cam, and including a second hole into which at least a portion of the rotating shaft is inserted, a peak and a valley being formed around the second hole, and a connecting part disposed on the other side of the arm body and fastened with a rotating part used for rotation of the foldable electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
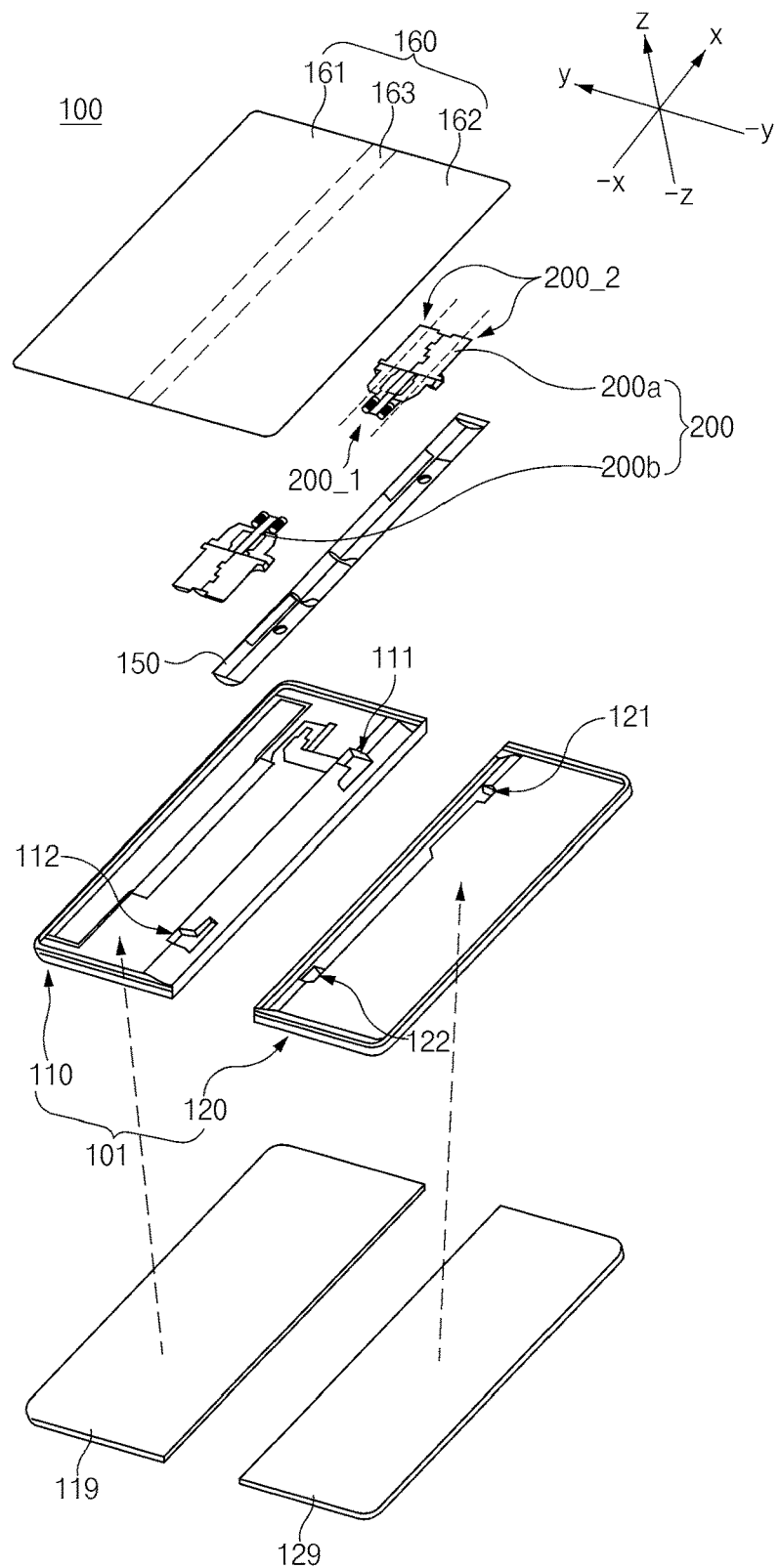
FIG. 1A is an exploded perspective view illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used here, terms and phrases such as "have," "may have," "include," or "may include" indicates the existence of features (e.g., numbers, functions, actions, or parts such as components), and do not exclude the existence of additional features.

As used here, the phrases "A or B," "at least one of A or/and B," or "one or more of A or/and B" may include all possible combinations of the items listed together. For example, "A or B," "at least one of A and B," or "at least one of A or B" may indicate all of (1) including at least one A, (2) including at least one B, or (3) including both at least one A and at least one B.

As used here, the terms such as "first," "second," "the first," or "the second" may modify various components, regardless of order and/or importance, and are used to distinguish one component from another, but does not limit the components. For example, the first user device and the second user device may indicate different user devices regardless of order or importance. For example, without departing from the teachings disclosed in the disclosure, a first element could be termed a second element, and similarly, in reverse, a second element could be termed a first element.

When a component (e.g., a first component) is referred to as being "(operatively or communicatively) coupled with/to" or "connected to" another component (e.g., a second component), it should be understood that any of the above components may be directly connected to another component, or may be connected via another component (e.g., a third component). In contrast, when a certain component (e.g., the first component) is referred to as being "directly coupled" or "directly connected" to another component (e.g., the second component), it is to be understood that no other component (e.g., the third component) intervenes between the certain component and the other component.

As used here, the phrase "configured to (or set to)," may be interchangeably used with, for example, "suitable for," "having the capacity to," "designed to," "adapted to," "made to," or "capable of," depending on the circumstances. The phase "configured (or set) to" may not necessarily mean only "specifically designed to" in hardware. In some circumstances, the phrase "device configured to" may mean that the device "can" perform an operation with other devices or parts. For example, the phrase "processor configured (or set) to perform A, B, and C" may mean a dedicated processor (e.g., embedded processor) for performing corresponding operations, or a generic-purpose processor (e.g., CPU or application processor) that performs the operations by executing one or more software programs stored in a memory device.

The terms and phrases as used here are merely provided to describe specific embodiments, and may not be intended to limit the scope of other embodiments. A singular form is intended to include a plural form, unless the context clearly indicates otherwise. Terms, including technical or scientific terms, as used here, may have the same meaning as commonly understood by a person skilled in the art to which the embodiments of the disclosure belong. Terms such as those defined in commonly-used dictionaries should be interpreted as having a meaning that is consistent with their meaning in the context of the relevant art and will not be interpreted in an idealized or overly formal sense unless expressly so defined here. In some cases, even terms defined here cannot be interpreted to exclude embodiments of the disclosure.

Examples of an electronic device according to various embodiments of the disclosure may include at least one of a smartphone, a tablet personal computer (PC), a mobile phone, a video phone, an e-book reader, a desktop PC, a laptop personal computer, a netbook computer, a workstation, a server, a personal digital assistant (PDA), a portable multimedia player (PMP), an moving picture experts group (MPEG-1 or MPEG-2) audio layer 3 (MP3) player, a mobile medical device, a camera, or a wearable device. According to various embodiments, the wearable device may include at least one of an accessory-type device (e.g., watches, rings, bracelets, anklets, necklaces, glasses, contact lenses, or head-mounted devices (HMD), a textiles or clothing integrated-type device (e.g., electronic clothing), a body attachment-type device (e.g., skin pads or tattoo), or a bio-implantable-type device (implantable circuits).

Hereinafter, an electronic device according to various embodiments will be described with reference to the accompanying drawings. In the disclosure, the term user may refer to a person using an electronic device or a device using the electronic device (e.g., an artificial intelligence electronic device).

FIG. 1A is an exploded perspective view illustrating an electronic device according to an embodiment of the disclosure.

Figure 1B:
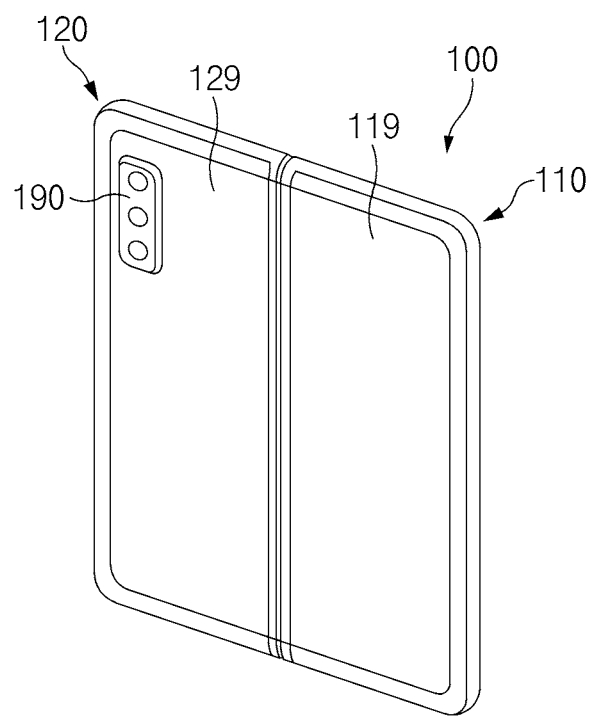
FIG. 1B is a diagram illustrating an example of a rear surface of an electronic device according to an embodiment of the disclosure.

FIG. 1B is a diagram illustrating an example of a rear surface of an electronic device according to an embodiment of the disclosure.

Figure 1C:
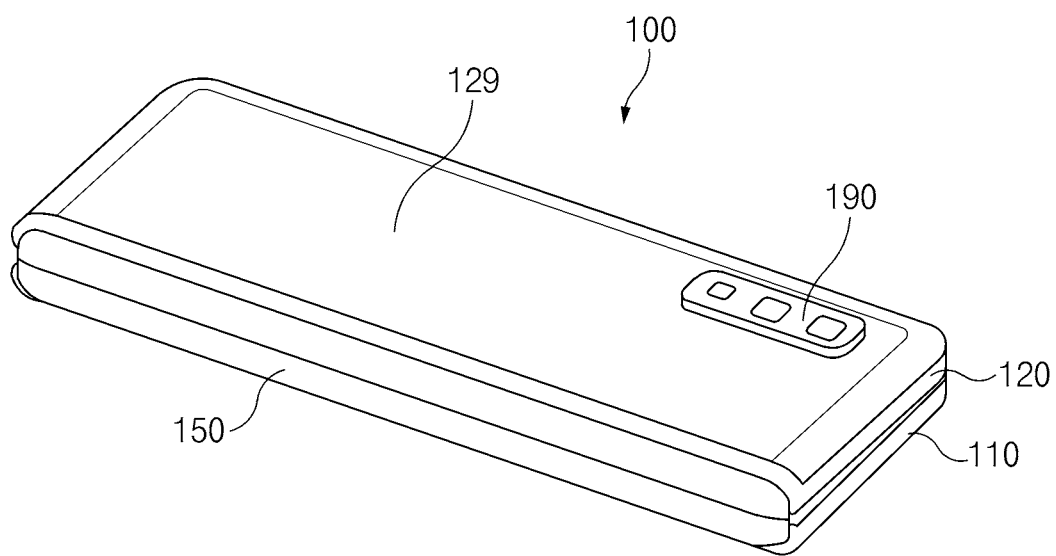
FIG. 1C is a diagram illustrating an example of a folded state of an electronic device according to an embodiment of the disclosure.

FIG. 1C is a diagram illustrating an example of a folded state of an electronic device according to an embodiment of the disclosure.

Referring to FIGS. 1A to 1C, an electronic device 100 (or a foldable electronic device, a flexible display device, a flexible & foldable electronic device, or the like) according to an embodiment of the disclosure may include a housing 101 (e.g., a first housing 110 and a second housing 120), a hinge housing 150, a hinge structure 200 (e.g., a first hinge structure 200a and a second hinge structure 200b), and a display 160 (or a flexible display, a display module, or the like) at least partially disposed in a front direction (e.g., z-axis direction) of the hinge structure 200. Additionally or alternatively, the electronic device 100 may include a first cover 119 that at least partially covers a rear surface (e.g., a surface facing in a-z-axis direction) of the first housing 110, and a second cover 129 that at least partially covers a rear surface (e.g., a surface facing in the −z-axis direction) of the second housing 120. Alternatively, the first cover 119 may be integrally formed with the first housing 110 to form the rear surface, and the second cover 129 may be integrally formed with the second housing 120 to form the rear surface.

The housing 101 may be comprised of at least one pair capable of rotating about a predetermined axis. For example, the housing 101 may include a first housing 110 and a second housing 120. Depending on the arrangement shape, the first housing 110 may be arranged to be continuous with the second housing 120 (e.g., when a center portion 163 of the display 160 is flattened or when the housing 101 is in an unfolded state), or may be arranged to be side-by-side with the second housing 120. Alternatively, when the center portion 163 of the display 160 is folded, one surface of the first housing 110 may be arranged to face one surface of the second housing 120.

The first housing 110 may be, for example, formed, at least partially, of a metal material, or may be formed, at least partially, of a non-metal material. The first housing 110 may be formed of a material having a certain size of rigidity so as to support at least a portion of the display 160. On at least a portion of the front surface of the first housing 110, one region of the display 160 (e.g., at least a portion of a first portion 161 of the display 160 and at least a portion of one side of the center portion 163) may be disposed. At least a portion of the first housing 110 may be adhered to the first portion 161 of the display 160. Alternatively, at least a portion of the front edge of the first housing 110 may be adhered to the edge of the first portion 161 of the display 160. Alternatively, at least a portion of the front surface (surface in the z-axis direction) of the first housing 110 may be at least partially adhered to the first portion 161 of the display 160. In this regard, an adhesive layer may be disposed at least partially between the first housing 110 and the first portion 161 of the display 160. The first housing 110 is provided at least partially in a hollow shape, or is provided such that an empty space is formed by being coupled with the first cover 119, where electronic elements required for driving the electronic device 100 (e.g., a printed circuit board, at least one processor mounted on the printed circuit board, at least one memory, and an element such as a battery) may be disposed.

According to various embodiments of the disclosure, edges of the first housing 110 (e.g., the three edges except for the remaining edge facing the second housing 120 when the electronic device 100 is in the unfolded state) may protrude at a predetermined height from the bottom surface of the center portion of the housing to surround at least one side edge of the display 160. Alternatively, on at least one of the edges of the first housing 110, sidewalls facing at least a portion of the edge of the display 160 may be disposed. The sidewalls formed at least partially on edges of the first housing 110 may be formed to have a specified height at the three edges except for the remaining edge facing the second housing 120. The edge of the first housing 110 facing the second housing 120 may include a depressed portion of which at least a portion has a certain curvature such that at least a portion of the hinge housing 150 may be disposed. For example, on the edge facing the second housing 120, the first housing 110 may include a first step 111 in which a portion of the first hinge structure 200a positioned in the hinge housing 150 is positioned and a second step 112 in which a portion of the second hinge structure 200b positioned in the hinge housing 150 is disposed.

According to various embodiments of the disclosure, depending on the arrangement, the second housing 120 may be arranged side-by-side with the first housing 110, or at least one surface of the second housing 120 may be arranged to face one surface of the first housing 110 (e.g., the surface on which the display 160 is disposed). For example, the second housing 120 may be made of the same material as the first housing 110. As the second housing 120 and the first housing 110 are arranged to be horizontally or vertically symmetrical in shape, the second housing 120 may be disposed such that its front surface supports at least a portion of the region (e.g., at least a portion of a second portion 162 of the display 160 and at least a portion of the other part of the center portion 163) other than the region disposed on the first housing 110 in the display 160. At least a portion of the second housing 120 may be adhered to the second portion 162 of the display 160. Alternatively, the front edge of the second housing 120 may be adhered to the edge of the second portion 162 of the display 160. Alternatively, the lower side of the front surface of the second housing 120 may be adhered to one side of the second portion 162 of the display 160. In this regard, an adhesive layer may be disposed at least in part between the second housing 120 and the second portion 162 of the display 160. The second housing 120 may be provided at least partially in a hollow shape similar to the first housing 110, or may be provided such that an empty space is formed by being coupled with the second cover 129, where electronic elements required for driving the electronic device 100 may be disposed. According to various embodiments of the disclosure, a camera 190 may be disposed on the rear surface of the second housing 120, and in connection with the disposition of the camera 190, a hole may be formed in the second cover 129, where the camera 190 may be disposed.

According to various embodiments of the disclosure, edges of the second housing 120 (e.g., the three edges except for the remaining edge facing the first housing 110) may protrude at a predetermined height from the bottom surface of the center portion of the second housing 120 to surround the other side edge of the display 160. Alternatively, on at least one of the edges of the second housing 120, sidewalls facing at least a portion of the edge of the display 160 may be disposed, which are similar to the sidewalls formed on the first housing 110. The sidewalls formed at least partially on edges of the second housing 120 may be formed to have a specified height at the three edges except for the remaining edge facing the first housing 110.

According to various embodiments of the disclosure, the portion of the second housing 120 facing the first housing 110 may include a depressed portion of which at least a portion has a certain curvature such that the hinge housing 150 may be disposed. For example, the second housing 120 may include a third step 121 in which a portion of the hinge housing 150 having the first hinge structure 200a mounted on the edge facing the first housing 110 is disposed, and a fourth step 122 in which a portion of the hinge housing 150 having the second hinge structure 200b mounted thereon is disposed.

According to various embodiment of the disclosure, the electronic device 100 may include at least one sensor disposed inside the first housing 110 or the second housing 120. The sensor may include, for example, at least one of a proximity sensor, an illuminance sensor, an iris sensor, an image sensor (or camera), or a fingerprint sensor.

According to various embodiments of the disclosure, depending on the folded or unfolded state of the electronic device 100, the hinge housing 150 may be covered by one of the first housing 110 and the second housing 120 (e.g., the unfolded state of the housing 101), or may be exposed to the outside (e.g., the folded state of the housing 101). For example, if the first housing 110 and the second housing 120 are arranged side-by-side, the hinge housing 150 may be covered by the first housing 110 and the second housing 120. If one surface of the first housing 110 and one surface of the second housing 120 are arranged to face each other, the hinge housing 150 may be disposed such that at least a portion thereof is exposed to the outside at side edges of the first housing 110 and the second housing 120 (e.g., the edges of the first housing 110 and the second housing 120 facing each other in the unfolded state). The hinge housing 150 may be at least partially empty inside, and a sidewall may be disposed such that at least some of both side edges (e.g., edges in the x-axis and −x-axis directions) are closed. At least one boss fastened to the first hinge structure 200a and the second hinge structure 200b may be disposed on at least a portion of the inner side surface of the hinge housing 150.

According to various embodiments of the disclosure, at least a portion of the display 160 may have flexibility. According to an embodiment of the disclosure, the display 160 may include the first portion 161 or a first region disposed on the first housing 110, the second portion 162 or a second region disposed on the second housing 120, and a center portion 163 or a central region that is adjacent to the first housing 110 and the second housing 120 in a state in which the electronic device 100 is in the unfolded state and corresponds to the position of the hinge structure 200. According to various embodiments of the disclosure, the entire display 160 may have flexibility. Alternatively, at least a portion of the center portion 163 of the display 160 may have flexibility. The center portion 163 of the display 160 may be disposed such that the first housing 110 and the second housing 120 are not adhered to each other. For example, the center portion 163 of the display 160 may be spaced apart from the front surface of the hinge structure 200 (e.g., the surface in the z-axis direction) when the electronic device 100 is folded. The first portion 161 of the display 160 may be adhered to at least a portion of the first housing 110, and the second portion 162 of the display 160 may be adhered to at least a portion of the second housing 120. In this regard, adhesive layers may be disposed in at least a portion of the region between the display 160 and the first housing 110 and in at least a portion of the region between the display 160 and the second housing 120, respectively. The display 160 may include various layers. For example, the display 160 may include an outer protective layer (or a glass layer or a polymer layer) that has a certain amount of transparency and is equal to or greater than a specified size, a display panel layer disposed under the outer protective layer to display a screen, and a first rear layer disposed under the display panel layer. The first rear layer may include an impact absorbing layer (or embossing) and a heat-dissipating layer (or a metal sheet layer). Additionally or alternatively, the first rear layer may further include an electromagnetic induction panel (e.g., a digitizer). According to various embodiments of the disclosure, the display 160 may further include a second rear layer disposed under the first rear layer. The second rear layer may include at least one metal layer (or metal sheet) at least partially formed of a metal material. The second rear layer may include a specified pattern (e.g., lattice pattern, slit pattern) such that at least a portion of the second rear layer may be bent. Alternatively, at least a portion of the second rear layer may be formed of another material (e.g., polymer material, rubber, leather material) that is possible to be bent.

According to various embodiments of the disclosure, at least one hinge structure 200 may be disposed with respect to the x-axis direction. For example, the hinge structure 200 may include a first hinge structure 200a and a second hinge structure 200b. The hinge structure 200 may include a first portion 200_1 disposed inside the hinge housing 150, and a second portion 200_2 disposed above the hinge housing 150 or corresponding to a peripheral structure that is not overlapped with the hinge housing 150 with respect to the z-axis (e.g., a structure combined with the first housing 110 and the second housing 120). In the first portion of the hinge structure 200, at least a portion of the first hinge structure 200a may be disposed in a first region inside the hinge housing 150 (e.g., a region in the hinge housing 150 that is biased in the x-axis direction). In the first portion of the hinge structure 200, at least a portion of the second hinge structure 200b may be disposed in a second region inside the hinge housing 150 (e.g., a region in the hinge housing 150 that is biased in the −x-axis direction). At least a portion of the second portion of the hinge structure 200 may rotate in response to the rotation operation of the first housing 110 and the second housing 120. At least one of the first hinge structure 200a and the second hinge structure 200b according to an embodiment of the disclosure may include a plurality of detent structures.

Figure 2:
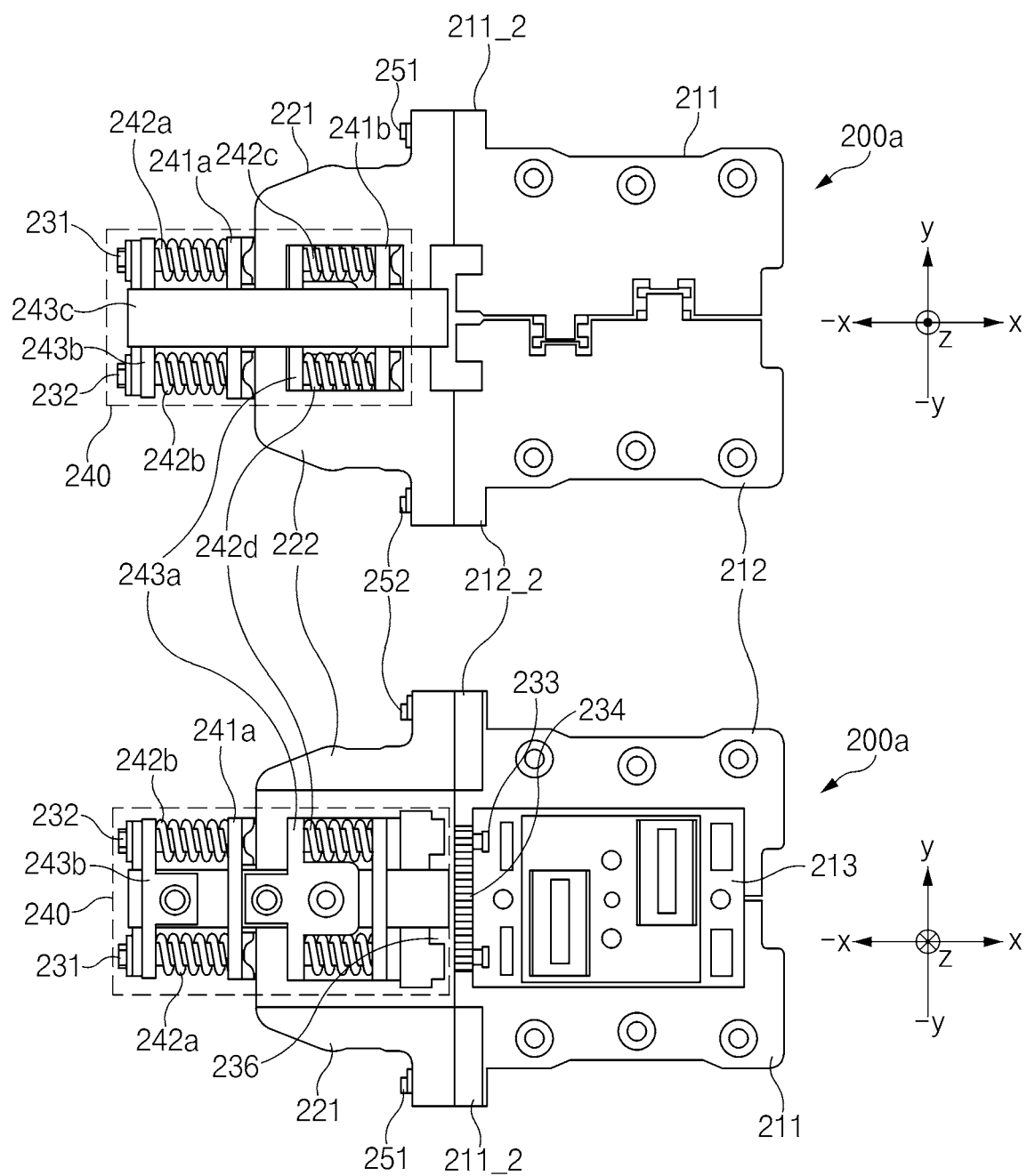
FIG. 2 is a diagram illustrating an example of a front surface and a rear surface of a hinge structure of an electronic device related to a plurality of detent structures according to an embodiment of the disclosure.

FIG. 2 is a diagram illustrating an example of a front surface and a rear surface of a hinge structure of an electronic device related to a plurality of detent structures according to an embodiment of the disclosure.

Figure 3:
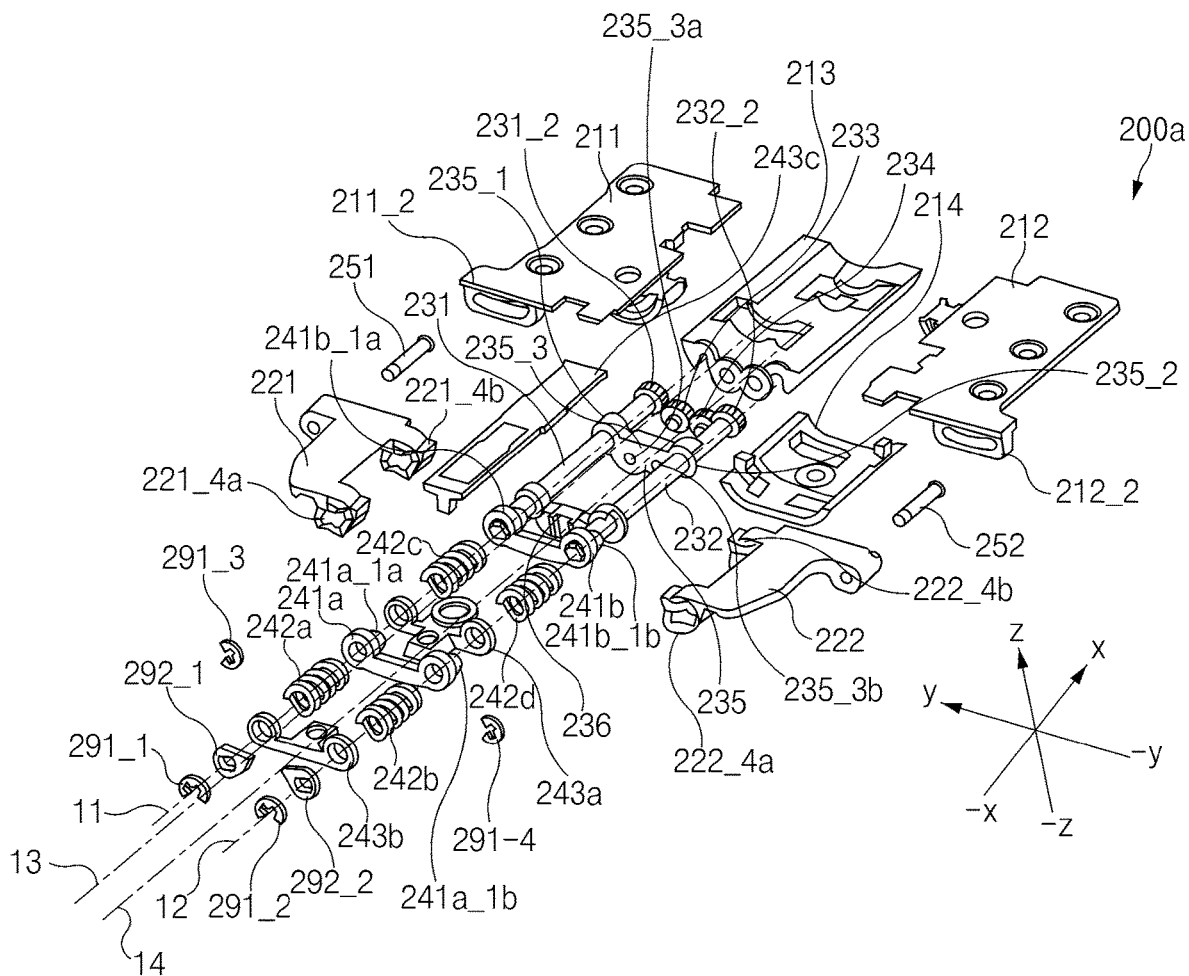
FIG. 3 is a diagram illustrating a surface in a first direction in an exploded perspective view of a hinge structure according to an embodiment of the disclosure.

FIG. 3 is a diagram illustrating a surface in a first direction in an exploded perspective view of a hinge structure according to an embodiment of the disclosure.

Figure 4:
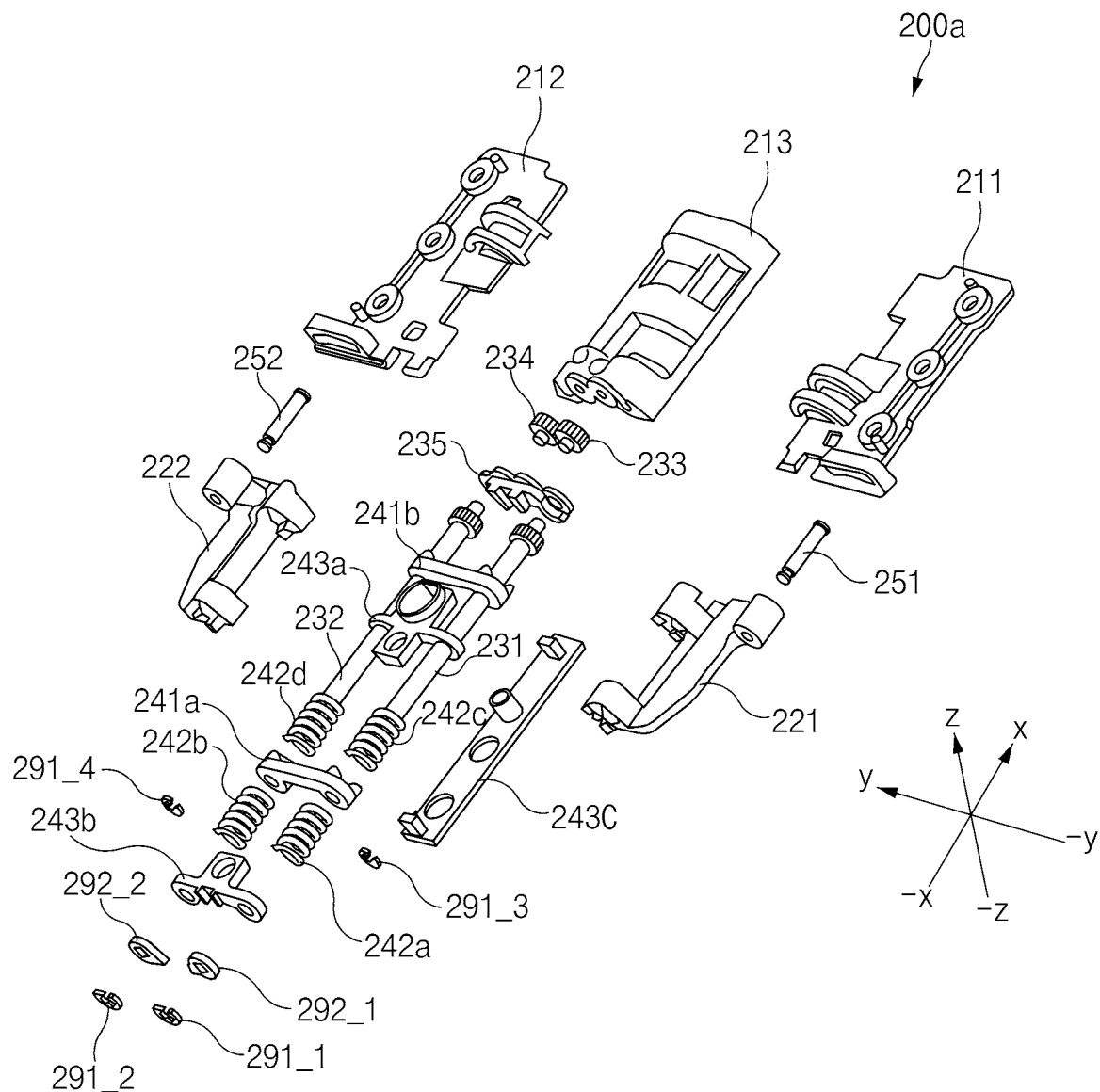
FIG. 4 is a diagram illustrating a surface in a second direction in an exploded perspective view of a hinge structure according to an embodiment of the disclosure.

FIG. 4 is a diagram illustrating a surface in a second direction in an exploded perspective view of a hinge structure according to an embodiment of the disclosure.

Referring to FIGS. 1A, 1B, 1C, 2, 3, and 4, the electronic device 100 according to an embodiment of the disclosure may include a plurality of hinge structures 200, and the first hinge structure 200a and the second hinge structure 200b may have the same structure and shape. In the following, a description will be given based on the first hinge structure 200a. FIG. 1A has illustrated a structure in which the first hinge structure 200a and the second hinge structure 200b are disposed in the hinge housing 150; however, the disclosure is not limited thereto, and three or more hinge structures may be mounted on the hinge housing 150.

According to various embodiments of the disclosure, the first hinge structure 200a may include rotating parts 211 and 212, a fixing bracket 213, arm parts 221 and 222, idle gears 233 and 234, and a multi-detent structure 240.

According to various embodiments of the disclosure, the rotating parts 211 and 212 may form a driving trajectory of the display 160. The rotating parts 211 and 212 may include a first rotating part 211 coupled to one side of the fixing bracket 213 and a second rotating part 212 coupled to the other side of the fixing bracket 213. The first rotating part 211 may rotate within a first angular range (e.g., clockwise or counterclockwise with respect to the x-axis) while being coupled to one side of the fixing bracket 213. The second rotating part 212 may rotate within a second angular range (e.g., counterclockwise or clockwise with respect to the x-axis) while being coupled to one side of the fixing bracket 213. The first angular range and the second angular range may have the same size and have opposite directions. When the electronic device 100 is in the unfolded state, the edge of the first rotating part 211 in the −y-axis direction may be disposed adjacent to the edge of the second rotating part 212 in the y-axis direction. When the electronic device 100 is in the folded state, an upper surface of the first rotating part 211 (e.g., a surface facing in the z-axis direction) and an upper surface of the second rotating part 212 (e.g., a surface facing in the z-axis direction) may be arranged to face each other. The first rotating part 211 may rotate within a certain angular range (e.g., within 0 degrees to 100 degrees or within 0 degrees to 95 degrees) around the third axis (13 in FIG. 14) (or virtual axis). The second rotating part 212 may rotate within a certain angular range (e.g., within 0 degrees to −100 degrees or within 0 degrees to −95 degrees) around the fourth axis (14 in FIG. 14) (or virtual axis). The third axis 13 and the fourth axis 14 may be positioned to be spaced apart by a predetermined interval. The third axis 13 and the fourth axis 14 may be positioned above a first axis (11 in FIG. 14) and a second axis (12 in FIG. 14) with respect to the z-axis.

According to various embodiments of the disclosure, the fixing bracket 213 may be at least partially disposed and fixed in an inner empty space of the hinge housing 150. In this regard, at least a portion of the fixing bracket 213 may have a size corresponding to an inner empty space of the hinge housing 150. In addition, at least a portion of the fixing bracket 213 may have a shape corresponding to an inner empty space of the hinge housing 150, for example, a semi-cylindrical shape. The fixing bracket 213 may include at least one hole into which at least one boss formed in the hinge housing 150 may be inserted. One side of the first rotating part 211 may be disposed on one side of the fixing bracket 213 so as to be rotatable within a certain angular range, and one side of the second rotating part 212 may be disposed on the other side of the fixing bracket 213 so as to be rotatable within a certain angular range. A portion of the multi-detent structure 240 (e.g., one side of a first rotating shaft 231 and one side of a second rotating shaft 232) and some of the idle gears 233 and 234 may be disposed on one side of the front surface (end in the x-axis direction) of the fixing bracket 213. According to various embodiments of the disclosure, the first hinge structure 200a may further include a bracket cover 214 disposed close to the rear surface of the fixing bracket 213 (e.g., in the z-axis direction) and fastened with the rear surface of the fixing bracket 213 (e.g., the surface can be seen in the direction from the −z-axis to the z-axis).

According to various embodiments of the disclosure, the arm parts (or arm structures) 221 and 222 may rotate about the rotating axes (e.g., the first rotating axis 11 and the second rotating axis 12) while sliding on one side of the rotating parts 211 and 212 in response to the rotation of the rotating parts 211 and 212 of the electronic device 100 and may implement the detent operation while being engaged with cam members 241a and 241b. For example, the arm parts 221 and 222 may have one side connected to the rotating parts 211 and 212 through fastening parts 251 and 252, and may move while sliding along at least a portion of the sides of the rotating parts 211 and 212 with the rotation of the rotating parts 211 and 212. The arm parts 221 and 222 may include, for example, the first arm part 221 connected to the first rotating part 211 through the first fastening part 251, and the second arm part 222 connected to the second rotating part 212 through the second fastening part 252. The first arm part 221 may include a first cam structure 221_4a and a second cam structure 221_4b fastened to the cam members 241a and 241b included in the multi-detent structure 240, and the second arm part 222 may include a third cam structure 222_4a and a fourth cam structure 222_4b fastened to the cam members 241a and 241b included in the multi-detent structure 240. The first cam structure 221_4a and the second cam structure 221_4b fastened to the cam members 241a and 241b may implement a cam type detent when the electronic device 100 is folded or unfolded. The first arm part 221 and the second arm part 222 may provide a hinge force (or detent feeling) of the electronic device 100 by using the cam structures 221_4a, 221_4b, 222_4a, and 222_4b engaged with the cam members 241a and 241b. The arm parts 221 and 222 may not only provide a more robust and stable hinge force (or detent feeling) based on the multi-detent structure 240, but also support the provision of improved abrasion resistance and a softer hinge force (or detent feeling) through the multi-detent structure 240.

According to various embodiments of the disclosure, the multi-detent structure 240 may include the first rotating shaft 231, the second rotating shaft 232, a rotating shaft support member 235, a stopper 236, a first cam member 241a, a second cam member 241b, a center bar 243c, a center bracket 243a, a shaft bracket 243b, support rings 292_1 and 292_2, a plurality of fixing clips 291_1, 291_2, 291_3, and 291_4, and a plurality of elastic bodies 242a, 242b, 242c, and 242d.

According to various embodiments of the disclosure, the first rotating shaft 231 and the second rotating shaft 232 may provide a cam-type hinge force (or detent feeling). The first rotating shaft 231 and the second rotating shaft 232 may have a length longer than a separation distance between cam structures formed on the arm parts 221 and 222. The first rotating shaft 231 and the second rotating shaft 232 may be disposed to be spaced apart from each other, and may be disposed parallel to each other in the x-axis direction. Shaft gears 231_2 and 232_2 may be formed on the first rotating shaft 231 and the second rotating shaft 232, respectively, and the respective shaft gears 231_2 and 232_2 may be disposed to engage with different idle gears (e.g., first idle gear 233, the second idle gear 234). Accordingly, the arm parts 221 and 222 of the hinge structure 200 may rotate at the same point of time and at the same angle by the force generated while the first rotating part 211 and the second rotating part 212 are rotating. The first rotating shaft 231 may rotate about the first axis 11, and the second rotating shaft 232 may rotate about the second axis 12.

According to various embodiments of the disclosure, one side of the rotating shaft support member 235, one side of the stopper 236, one side of the center bracket 243a, one side of the shaft bracket 243b, the first support ring 292_1, and the first fixing clip 291_1 may be put on the first rotating shaft 231. A first cam 241a_1a formed on the first cam member 241a, a third cam 241b_1a formed on the second cam member 241b, the first cam structure 221_4a and the second cam structure 221_4b of the first arm part 221, the first elastic body 242a, and the third elastic body 242c may be put on the first rotating shaft 231. A first shaft gear 231_2 may be formed on the first rotating shaft 231, and at least a portion of the first shaft gear 231_2 may be disposed to engage with the first idle gear 233. One end (e.g., an end in the x-axis direction) of the first rotating shaft 231 may be disposed on one side (e.g., an end in the −x-axis direction) of the fixing bracket 213.

According to various embodiments of the disclosure, the other side of the rotating shaft support member 235, the other side of the stopper 236, the other side of the center bracket 243a, the other side of the shaft bracket 243b, the second support ring 292_2, and the second fixing clip 291_2 may be put on the second rotating shaft 232. A second cam 241a_1b formed on the first cam member 241a, a fourth cam 241b_1b formed on the second cam member 241b, the third cam structure 222_4a and the fourth cam structure 222_4b of the second arm part 222, the second elastic body 242b, and the fourth elastic body 242d may be put on the second rotating shaft 232. A second shaft gear 232_2 may be formed on the second rotating shaft 232, and at least a portion of the second shaft gear 232_2 may be disposed to engage with the second idle gear 234. One end (e.g., an end in the x-axis direction) of the second rotating shaft 232 may be disposed on one side (e.g., an end in the −x-axis direction) of the fixing bracket 213.

According to various embodiments of the disclosure, the rotating shaft support member 235 may include a first ring 235_1 fastened to the first rotating shaft 231 and a second ring 235_2 connected to the second rotating shaft 232, and a ring body 235-3 facing one side of the idle gears 233 and 234 while connecting the first ring 235_1 and the second ring 235-2. The ring body 235_3 may include a first hole 235_3a into which one side of the first idle gear 233 may be inserted and a second hole 235_3b into which one side of the second idle gear 234 may be inserted. The rotating shaft support member 235 may be disposed between the stopper 236 and the shaft gears 231_2 and 232_2 formed on the rotating shafts 231 and 232. The rotating shaft support member 235 may be disposed to surround at least a portion of the idle gears 233 and 234 to guide the idle gears 233 and 234 so as not to deviate from specified positions.

According to various embodiments of the disclosure, the center bar 243c may be provided in a bar shape in which the length in the x-axis direction is longer than that in the y-axis direction, and may be disposed between the first rotating shaft 231 and the second rotating shaft 232 to cover a space between the first rotating shaft 231 and the second rotating shaft 232. The center bar 243c may include at least one protrusion formed in the −z-axis direction. The at least one protrusion may be fastened to a hole formed in the center bracket 243a and a hole formed in the shaft bracket 243b. The center bar 243c may be moved in the z-axis or −z-axis direction with the rotation of the first arm part 221 and the second arm part 222. For example, the center bar 243c may be moved in the z-axis direction to support the display 160 in a state in which the electronic device 100 is unfolded, and may move downward by a predetermined distance in the z-axis direction to secure the distance from the display 160 such that the display 160 is not damaged by a drop impact or an external force in a state in which the electronic device 100 is folded.

According to various embodiments of the disclosure, the shaft bracket 243b may be disposed between the support rings 292_1 and 292_2 and the first elastic body 242a and the second elastic body 242b. The shaft bracket 243b may include ring-shaped wings that may be put on the first rotating shaft 231 and the second rotating shaft 232, and may include a body for supporting the wings. The shaft bracket 243b may be fastened to the protrusion formed on the center bar 243c. The shaft bracket 243b may guide the first rotating shaft 231 and the second rotating shaft 232 to maintain a predetermined distance while the first rotating shaft 231 and the second rotating shaft 232 are rotating.

According to various embodiments of the disclosure, the plurality of fixing clips 291_1, 291_2, 291_3, and 291_4 may include a first fixing clip 291_1 coupled to one side of the first rotating shaft 231 (e.g., an end in the −x-axis direction), a second fixing clip 291_2 coupled to one side of the second rotating shaft 232 (e.g., an end in the −x-axis direction), a third fixing clip 291_3 coupled to one side of the first fastening part 251 (an end in the −x-axis direction), and a fourth fixing clip 291_4 coupled to one side of the second fastening part 252 (an end in the −x-axis direction). The first fixing clip 291_1 may serve to fix the components (e.g., at least one of the first support ring 292_1, one side of the shaft bracket 243b, the first elastic body 242a, the first cam 241a_1a, one side of the center bracket 243a, the third elastic body 242c, the third cam 241b_1a, one side of the stopper 236, and one side of the rotating shaft support member 235) put on the first rotating shaft 231 so as not to deviate from one side (−x-axis direction). The second fixing clip 291_2 may serve to fix the components (e.g., at least one of the second support ring 292_2, the other side of the shaft bracket 243b, the second elastic body 242b, the second cam 241a_1b, the other side of the center bracket 243a, the fourth elastic body 242d, the fourth cam 241b_1b, the other side of the stopper 236, and the other side of the rotating shaft support member 235) put on the second rotating shaft 232 so as not to deviate from one side (−x-axis direction). The third fixing clip 291_3 may serve to prevent the first fastening part 251 inserted through the first arm part 221 and the first rotating part 211 from being separated from the first arm part 221 or the first rotating part 211 while the first arm part 221 slides along the side surface of the first rotating part 211. The fourth fixing clip 291_4 may serve to prevent the second fastening part 252 inserted through the second arm part 222 and the second rotating part 212 from being separated from the second arm part 222 and the second rotating part 212 while the second arm part 222 slides along the side surface of the second rotating part 212.

According to various embodiments of the disclosure, the plurality of elastic bodies 242a, 242b, 242c, and 242d may include, for example, a first elastic body 242a disposed between one side of the shaft bracket 243b and the first cam 241a_1a of the first cam member 241a, a second elastic body 242b disposed between the other side of the shaft bracket 243b and the second cam 241a_1b of the first cam member 241a, a third elastic body 242c disposed between one side of the center bracket 243a and the third cam 241b_1a of the second cam member 241b, and a fourth elastic body 242d disposed between the other side of the center bracket 243a and the fourth cam 241b_1b of the second cam member 241b. The plurality of elastic bodies 242a, 242b, 242c, and 242d may provide an elastic force required for cam motion of the first cam member 241a and the second cam member 241b, respectively. According to an embodiment of the disclosure, in order to provide the same hinge force (or detent feeling) during the rotating operation of the electronic device 100, the first elastic body 242a and the second elastic body 242b (or the third elastic body 242c and the fourth elastic body 242d) may have the same characteristics. For example, the plurality of elastic bodies 242a, 242b, 242c, and 242d may have a spring structure having the same or similar length, thickness, and diameter. Alternatively, according to various embodiments of the disclosure, the plurality of elastic bodies 242a, 242b, 242c, and 242d may have different lengths, thicknesses, and diameters (e.g., the first elastic body 242a and the second elastic body 242b has the same or similar first length, first thickness, and first diameter, and the third elastic body 242c and the fourth elastic body 242d has the same or similar second length (second length different from the first length), second thickness (second thickness different from the first thickness), and second diameter (second diameter different from the first diameter)).

As described above, the hinge structures 200a and 200b according to an embodiment of the disclosure may include rotating parts 211 and 212 coupled to the hinge housing 150 and the housings 110 and 120 and involved in the folding or unfolding operation of the display 160 placed on the upper side, the multi-detent structure 240 connected to the rotating parts 211 and 212, and a gear structure (e.g., a shaft gear of the first rotating shaft 231, a shaft gear of the second rotating shaft 232, and idle gears 233 and 234) for supporting simultaneous rotation of the first housing 110 and the second housing 120.

With the above configuration, the hinge structures 200a and 200b may rotate around virtual axes (or a third axis 13 and a fourth axis 14) formed above the surface of the rotating parts 211 and 212 to implement folding or unfolding of the display 160, and may suppress torsion of the housings 110 and 120 during the hinge operation process by providing an improved detent feeling based on the plurality of cam structures and supporting simultaneous hinge operation of the housings 110 and 120 based on the gear structures (e.g., the shaft gear on the first rotating shaft 231, the shaft gear on the second rotating shaft 232, and idle gears 233 and 234). Furthermore, the hinge structures 200a and 200b may support a temporarily fixed state including a partially folded state at a certain angle, for example, between 30 degrees and 60 degrees (e.g., the angle between the front surface of the first housing 110 and the front surface of the second housing 120) as well as unfolded state or the folded state of the housings 110 and 120.

In order to increase the detent load in the hinge structure according to an embodiment of the disclosure, it is necessary to increase the elastic force acting on the cam motion, and accordingly, it is necessary to expand the free field of the spring (e.g., an elastic body), reduce the number of windings of the spring, or increase the wire diameter of the spring; however, the free field expansion and the reduction of the number of windings have a slight effect of increasing the load, and increasing the load over a certain value may exceed the allowable stress limit of the spring, resulting in a spring break. In order to increase the spring load, the inner diameter of the spring may be reduced or the outer diameter of the spring may be increased, and for the inner diameter reduction, the diameter of the rotating shafts 231 and 232 is to be reduced, which may result in the fact that the concentricity of the rotating shafts 231 and 232 is lowered and warpage occurs in the process of manufacturing parts. In addition, for the outer diameter increase, there may be a condition where interference of the surrounding parts related to the spring occurs or additional space is required to exclude the part interference (e.g., an increase in the thickness of the hinge structure and an increase in the thickness of the electronic device 100 accordingly). In addition, for an increase in the limited elastic force of the spring, a load may be concentrated on the cam component, which may accelerate wear. In this regard, the hinge structures 200a and 200b of the electronic device 100 according to various embodiments of the disclosure may improve wear performance (e.g., as the number of cam structures and cams increase, the loss load decreases with the number, for example, four cam structures provide ¼ loss load) by increasing the maximum load and the constant load acting on the cam motion and suppressing the space increase (e.g., reducing or preventing the increase in thickness of the hinge structure) by the plurality of elastic bodies 242a, 242b, 242c, and 242d, in a state in which the plurality of cam members 241a and 241b are fastened to the arm parts 221 and 222. According to various embodiments of the disclosure, the first elastic body 242a and the third elastic body 242c may have the same length, and the second elastic body 242b and the fourth elastic body 242d may have the same length. According to various embodiments of the disclosure, the first elastic body 242a and the third elastic body 242c have different lengths, and in a state in which the lengths of the second elastic body 242b and the fourth elastic body 242d are different from each other, the sum of the lengths of the first elastic body 242a and the third elastic body 242c may be equal to the sum of the lengths of the second elastic body 242b and the fourth elastic body 242d.

Figure 5:
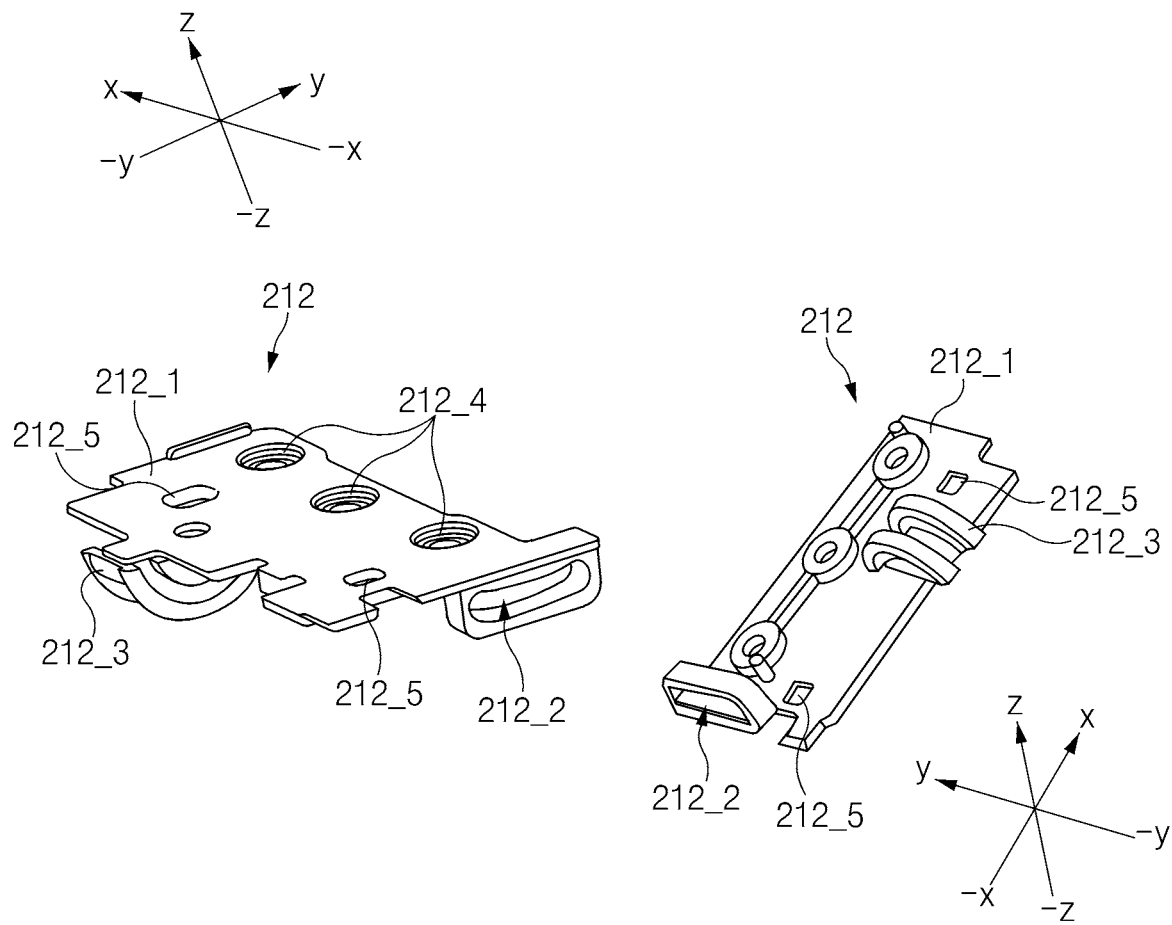
FIG. 5 is a diagram illustrating an example of a rotating part according to an embodiment of the disclosure.

FIG. 5 is a diagram illustrating an example of a rotating part according to an embodiment of the disclosure.

Before description, the rotating part illustrated in FIG. 5 is an example of the second rotating part in FIGS. 3 and 4 above. The second rotating part 212 may have the same size, shape, and material except for a structure in which it is symmetrical to the first rotating part 211 with respect to the first axis 11 (or the second axis 12). In the following description, the structure of the rotating part will be described based on the second rotating part 212.

Referring to FIG. 5, the second rotating part 212 according to an embodiment of the disclosure may include a bracket body 212_1, a slide hole 212_2 formed at one end of the bracket body 212_1 (e.g., an end in the −x-axis direction), a rail 212_3 formed at the other end of the bracket body 212_1 (e.g., an end in the −y-axis direction), and a housing coupling hole 212_4 used for coupling with the second housing (e.g., the second housing 120 of FIGS. 1A to 1C). Similar to the second rotating part 212, the first rotating part 211 described above in FIG. 3 or FIG. 4 may include the bracket body, the slide hole, the rail, and the housing coupling hole.

According to various embodiments of the disclosure, the bracket body 212_1 has a length in the x-axis relatively longer than that in the y-axis, at least a portion of the surface facing in the z-axis is formed to be flat, and at least a portion of the surface facing in the −z axis is also flat as a whole. Based on the illustrated drawing, the slide hole 212_2 is formed at the right end of the bracket body 212_1 (e.g., the end in the −x-axis direction) to face in a lower direction (e.g., in the −z-axis direction), and the rail 212_3 may be disposed at one end of the bracket body 212_1 (e.g., end in the −y-axis direction) to face a lower surface (e.g., surface in the −z-axis direction). At least one housing coupling hole 212_4 used for coupling the second housing 120 may be disposed in the bracket body 212_1. In the illustrated drawing, the three housing coupling holes 212_4 are arranged; however, the disclosure is not limited thereto. For example, two or more housing coupling holes 212_4 may be formed, and two or more housing coupling holes 212_4 may be disposed to be spaced apart from the bracket body 212_1. According to various embodiments of the disclosure, at least one bracket coupling hole 212_5 may be disposed in the bracket body 212_1. The bracket coupling hole 212_5 is fastened to a coupling protrusion formed on the fixing bracket 213 when the electronic device 100 is in the unfolded state, and may be separated from the coupling protrusion of the fixing bracket 213 when the electronic device 100 is in the folded state. The number of bracket coupling holes 212_5 may correspond to the number of coupling protrusions of the fixing bracket 213.

According to various embodiments of the disclosure, the slide hole 212_2 may be disposed at the other end of the bracket body 212_1 (e.g., the end in the −x-axis direction) and may be disposed under the bracket body 212_1. The slide hole 212_2 may be formed to have a length in a first direction (e.g., the y-axis direction) longer than that in a third direction (e.g., the x-axis direction). Accordingly, the second fastening part 252 inserted into the slide hole 212_2 may be slid in any of the first direction (e.g., the y-axis direction) and the second direction (e.g., the −y-axis direction) within the slide hole 212_2. The slide hole 212_2 may be disposed to face a surface of the second arm part 222 in a fourth direction (e.g., a surface disposed in the −x-axis direction). At least a portion of the slide hole 212_2 may be aligned with a connection hole of the second arm part 222. Accordingly, at least a portion of the second fastening part 252 may be disposed inside the slide hole 212_2 and the connection hole.

According to various embodiments of the disclosure, the rail 212_3 may be disposed at the end of the bracket body 212_1 in the second direction (e.g., the end in the −y-axis direction) and may be disposed under the bracket body 212_1. The rail 212_3 may have an arc shape of a predetermined angle. The rail 212_3 may be inserted into a rail groove (or rail type hole) disposed on the fixing bracket 213 and may rotate within a specified rotation range along the rail groove. According to an embodiment of the disclosure, the rotation range of the rail 212_3 may be included within an angle of the arc forming the shape of the rail 212_3. For example, the rotation range of the rail 212_3 may be at least a partial range within a range of −10 degrees to 100 degrees (e.g., a range of 0 degrees to 95 degrees). The rail 212_3 may rotate between the −z-axis and the z-axis based on the fourth axis 14 formed by the rail groove of the fixing bracket 213.

The housing coupling hole 212_4 may be formed on one side of the bracket body 212_1 (e.g., one side edge facing in the y-axis direction), and may be formed to penetrate through a surface in the first direction (e.g., a surface in the y-axis direction) and a surface in the second direction (e.g., a surface in the −y-axis direction). In the illustrated drawing, the bracket body 212_1 is illustrated as having three housing coupling holes 212_4 formed; however, the disclosure is not limited to the number.

Figure 6:
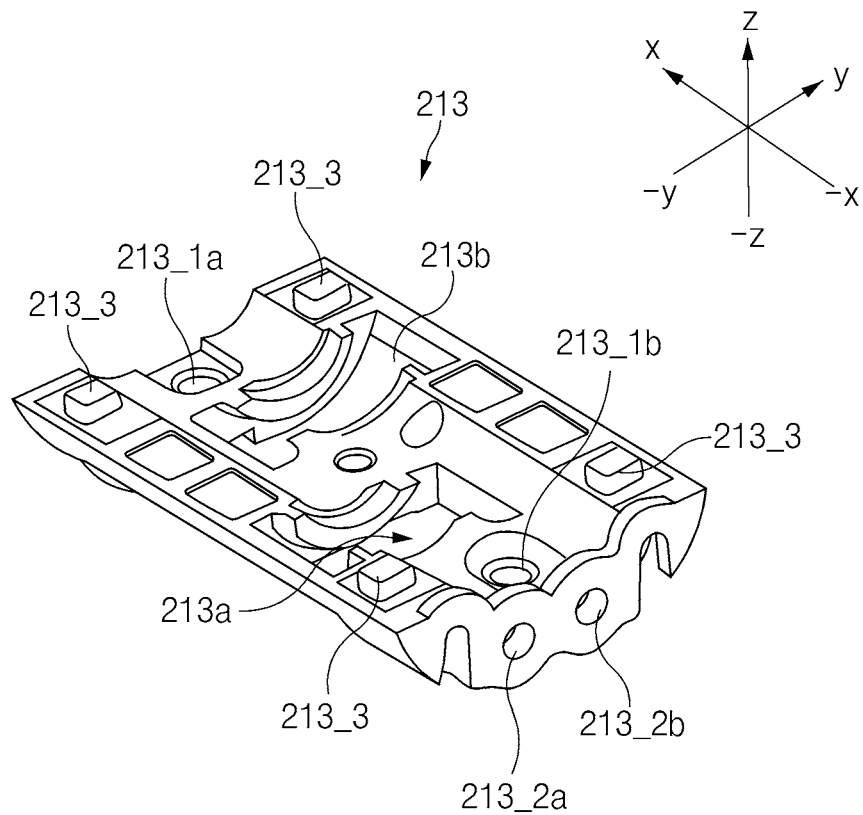
FIG. 6 is a diagram illustrating an example of a fixing bracket according to an embodiment of the disclosure.

FIG. 6 is a diagram illustrating an example of a fixing bracket according to an embodiment of the disclosure.

Referring to FIG. 6, at least a portion of the shape of the lower surface (e.g., a surface in the −z-axis direction) of the fixing bracket 213 may include a curved surface. For example, the lower surface of the fixing bracket 213 may be formed to correspond to the inner shape of the hinge housing (e.g., the hinge housing 150 of FIG. 1C). At least a portion of the upper surface (a surface in the z-axis direction) of the fixing bracket 213 may be provided in a flat shape, and may have rail grooves 213a and 213b (or rail holes) formed such that rotating brackets (e.g., the rotating brackets 211 and 212 in FIG. 2) are coupled thereto. According to an embodiment of the disclosure, the fixing bracket 213 may include a first rail groove 213a that at least partially has an arc shape in a z-axis cross-section (e.g., a cross-section cut in the direction from the z-axis to the −z-axis), and into which the rail of the first rotating part 211 is inserted from the first direction (e.g., y-axis direction) to the second direction (e.g., −y-axis direction).

Referring to FIGS. 3 and 6, according to an embodiment of the disclosure, the fixing bracket 213 may include a second rail groove 213b that at least partially has an arc shape in a z-axis cross-section (e.g., a cross-section cut in the direction from the z-axis to the −z-axis), and into which the rail 212_3 of the second rotating part 212 is inserted from the second direction (e.g., −y-axis direction) to the first direction (e.g., y-axis direction). The first rail groove 213a may be disposed biased in the −y-axis direction compared to the second rail groove 213b, and the second rail groove 213b may be disposed to be biased in the y-axis direction compared to the first rail groove 213a. The first rail groove 213a may rotate about the third axis 13, and the second rail groove 213b may rotate about the fourth axis 14. The third axis 13 and the fourth axis 14 may be formed above (air) the upper surface of the fixing bracket 213 (e.g., a surface in the z-axis direction), and the third axis 13 and the fourth axis 14 may be formed spaced apart by the first rail groove 213a disposed to be biased in the −y-axis direction and the second rail groove 213b disposed to be biased in the y-axis direction. According to an embodiment of the disclosure, the fixing bracket 213 may include a first groove 213_2a in which one end of the first rotating shaft 231 is disposed, and a second groove 213_2b in which one end of the second rotating shaft 232 is disposed, which are formed on a side disposed in the third direction (e.g., the x-axis direction).

According to various embodiments of the disclosure, the fixing bracket 213 may include a first fixing hole 213_1a and a second fixing hole 213_1b used to fix the fixing bracket 213 to the hinge housing 150. The electronic device 100 may fix the fixing bracket 213 to the hinge housing 150 by using a coupling member (e.g., a coupling member such as a screw). According to an embodiment of the disclosure, the first fixing hole 213_1a and the second fixing hole 213_1b may be disposed to be symmetrical diagonally on an upper surface of the fixing bracket 213 (e.g., a surface in the z-axis direction) in order to fix the fixing bracket 213 to the hinge housing 150 more firmly and stably.

According to various embodiments of the disclosure, the fixing bracket 213 may include at least one bracket protrusion 213_3 inserted into the bracket coupling hole 212_5 formed in the first rotating part 211. Furthermore, a bracket coupling hole may be formed in the second rotating part 212 in the same manner as the first rotating part 211, and the fixing bracket 213 may include bracket protrusions of the same shape at a position symmetrical to the bracket protrusion 213_3 inserted into the bracket coupling hole 212_5 of the first rotating part 211 with respect to the −x-axis. According to an embodiment of the disclosure, a plurality of bracket protrusions 213_3 may be disposed on a surface of the fixing bracket 213 in the z-axis direction. For example, the plurality of bracket protrusions 213_3 may be disposed at each edge of the surface of the fixing bracket 213 in the z-axis direction.

Figure 7:
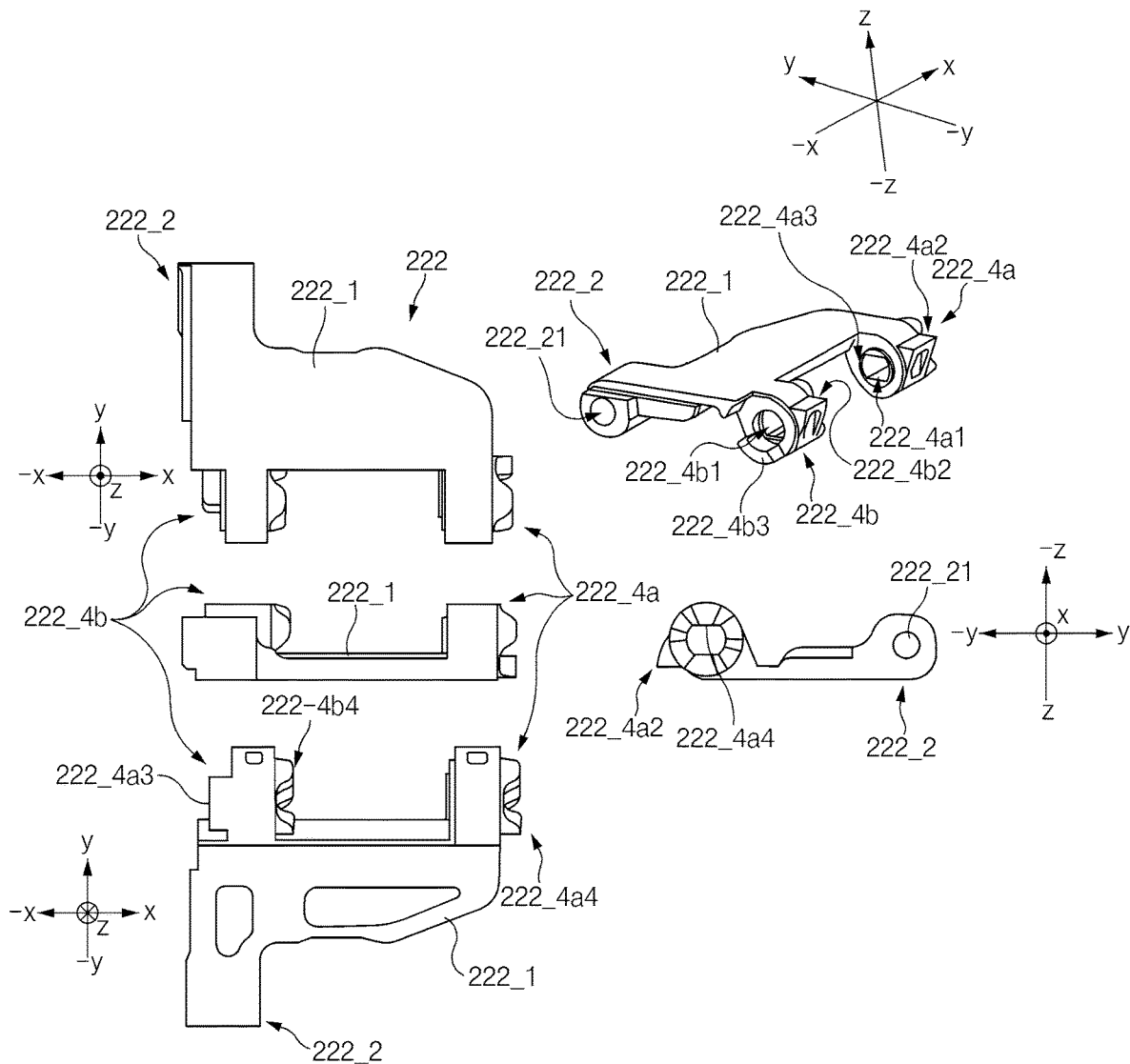
FIG. 7 is a diagram illustrating an example of an arm part according to an embodiment of the disclosure.

FIG. 7 is a diagram illustrating an example of an arm part according to an embodiment of the disclosure.

Before description, an arm part illustrated in FIG. 7 represents the second arm part with reference to FIG. 3. The second arm part 222 has a shape similar to the first arm part 221 (e.g., a shape symmetrical with respect to the x-axis) and may be formed of the same size and material. In the following, a description will be given based on the second arm part, among the first arm part and the second part arm of FIG. 3.

Referring to FIGS. 3 and 7, the second arm part 222 according to an embodiment of the disclosure may be fastened to the second rotating part 212 via a second fastening part (e.g., the second fastening part 252 in FIG. 3), and may rotate in connection with the second rotating part 212 when the hinge operation is performed. According to an embodiment of the disclosure, the second arm part 222 may include a basic body 222_1, a connecting part 222_2, the third cam structure 222_4a, and the fourth cam structure 222_4b.

According to various embodiments of the disclosure, at least a portion of an upper surface (e.g., a surface disposed toward the z-axis) of the basic body 222_1 may be formed to be flat. The connecting part 222_2 may be disposed on at least a portion of a lower surface (e.g., a surface in the −z-axis direction) of the upper edge (e.g., an end in the y-axis direction) of the basic body 222_1. The connecting part 222_2 may be formed in a ring shape or a pipe shape having a predetermined thickness. For example, the connecting part 222_2 may include a hole 222_21 opened in the third direction (e.g., the x-axis direction or the −x-axis direction). At least a portion of the second fastening part 252 may be disposed in the hole 222_21 of the connecting part 222_2. In this regard, the size of the hole 222_21 of the connecting part 222_2 may have a size similar to the diameter of the second fastening part 252. The third cam structure 222_4a and the fourth cam structure 222_4b may be disposed on a lower surface (e.g., a surface in the −z-axis direction) of the lower edge (e.g., end in the −y-axis direction) of the basic body 222_1. The third cam structure 222_4a and the fourth cam structure 222_4b may be disposed on the edge of the basic body 222_1 in the −y-axis direction, and the connecting part 222_2 may be disposed on the edge of the basic body 222_1 in the y-axis direction.

According to various embodiments of the disclosure, the third cam structure 222_4a may include a first fastening hole 222_4a1 having a uniform diameter in the direction from the x-axis to the −x-axis, a first holding portion 222_4a2 supporting the center bar 243c, a stepped jaw 222_4a3 at least partially engaged with the center bracket 243a, and a first cam protrusion 222_4a4 for cam motion.

According to various embodiments of the disclosure, at least a portion of the second rotating shaft 232 may be inserted into the first fastening hole 222_4a1. The first fastening hole 222_4a1 may be formed in a shape the same as or similar to a cross-section of one side of the second rotating shaft 232 (e.g., a cross-section cut in the direction from the z-axis to the −z-axis). For example, at least a portion of the cross-section of the first fastening hole 222_4a1 (e.g., the cross-section of the first fastening hole 222_4a1 when the third cam structure 222_4a is cut in the direction from the z-axis to the −z-axis) may include a straight line. The first fastening hole 222_4a1 may be disposed on the same axis (e.g., the second axis 12) as a second fastening hole 222_4b1 of the fourth cam structure 222_4b.

According to various embodiments of the disclosure, the first holding portion 222_4a2 may protrude in the −y-axis direction from one side of the periphery forming the first fastening hole 222_4a1 by a predetermined length. At least a portion of the z-axis cross-section of the first holding portion 222_4a2 may include a triangle. According to various embodiments of the disclosure, the size of the z-axis cross-section of the first holding portion 222_4a2 may have a shape gradually decreasing from the y-axis to the −y-axis. An upper surface (e.g., a surface facing in the z-axis direction) of the first holding portion 222_4a2 may be positioned lower than an upper surface (e.g., a surface facing in the z-axis direction) of the basic body 222_1 with respect to the z-axis. According to an embodiment of the disclosure, the first holding portion 222_4a2 may be positioned between one upper side (e.g., one point in the z-axis direction) and one lower side (e.g., one point in the −z-axis direction) of the periphery forming the first fastening hole 222_4a1, and may be formed to protrude in the −y-axis direction from a side (e.g., one point of the −y-axis direction) in the periphery of the first fastening hole 222_4a1. The first holding portion 222_4a2 may be integrated with the periphery forming the first fastening hole 222_4a1. In this regard, the first holding portion 222_4a2 may be formed of the same material as the periphery of the first fastening hole 222_4a1 or the basic body 222_1.

According to various embodiments of the disclosure, the stepped jaw 222_4a3 is provided for ease of assembly with the center bracket 243a, and may guide the center bracket 243a so that it is not separated until the rotating shaft is assembled. The stepped jaw 222_4a3 may be formed to protrude further by a predetermined height in the x-axis direction from a side surface facing in the x-axis direction in the periphery of the first fastening hole 222_4a1. The stepped jaw 222_4a3 may be disposed to surround the first fastening hole 222_4a1. In this regard, at least one of the outer or inner circumferential surface of the stepped jaw 222_4a3 may be circular or elliptical. According to various embodiments of the disclosure, the inner circumferential surface of the stepped jaw 222_4a3 may have a shape corresponding to the shape of the first fastening hole 222_4a1 (e.g., at least a portion of the z-axis cross-section includes a straight line). The stepped jaw 222_4a3 may be at least partially disposed on a ring-shaped ring provided in the center bracket 243a.

According to various embodiments of the disclosure, the first cam protrusion 222_4a4 may protrude by a predetermined height in the −x-axis direction from the side surface facing in the −x-axis direction in the periphery of the first fastening hole 222_4a1, and the protruding height may vary depending on the location. For example, the z-axis cross-section of the first cam protrusion 222_4a4 (e.g., the cross-section cut in the direction from the z-axis to the −z-axis) may have a circular shape or a shape in which at least a portion includes a straight line and the remaining portion includes a curve (at least a portion includes a D-cut form). The first cam protrusion 222_4a4 may have an uneven shape in the −x-axis direction. The first cam protrusion 222_4a4 having the uneven shape in the −x-axis direction may include at least partially a curved section. The height of the peaks of irregularities may be the same in the −x-axis direction, and the depth of the valleys of irregularities may be the same in the x-axis direction. The center portions of the peaks and valleys of irregularities may include a flat region having a predetermined length.

According to various embodiments of the disclosure, the fourth cam structure 242_4b may include a second fastening hole 222_4b1 having a uniform diameter in the direction from the x-axis to the −x-axis, a second holding portion 222_4b2 supporting the center bar 243c, a protrusion 222_4b3 at least partially engaged with the stopper 236, and a second cam protrusion 222_4ab for cam motion. The fourth cam structure 222_4b may be disposed on one side of the basic body 222_1 and may be disposed to be spaced apart from the third cam structure 222_4a by a predetermined distance. A separation distance between the third cam structure 222_4a and the fourth cam structure 222_4b may vary depending on the size or shape of at least one of elastic bodies, cam members, and the center bracket 243a disposed between the third cam structure 222_4a and the fourth cam structure 222_4b.

According to various embodiments of the disclosure, at least a portion of the second rotating shaft 232 may be inserted into the second fastening hole 222_4b1. The second fastening hole 222_4b1 may be formed in a shape the same as or similar to a cross-section of one side of the second rotating shaft 232 (e.g., a cross-section cut in the direction from the z-axis to the −z-axis). Accordingly, at least a portion of the cross-section of the second fastening hole 222_4b1 (e.g., the cross-section cut in the direction from the z-axis to the −z-axis) may have the same shape as the first fastening hole 222_4a1. The second fastening hole 222_4b1 may be disposed on the same axis (e.g., the second axis 12) as the first fastening hole 222_4a1 of the fourth cam structure 242_4b.

According to various embodiments of the disclosure, the second holding portion 222_4b2 may be provided in a shape the same as or similar to the first mounting portion 222_4a2. For example, the second holding portion 222_4b2 may be formed between one upper side (e.g., one point in the z-axis direction) and one lower side (e.g., one point in the −z-axis direction) of the periphery of the second fastening hole 222_4b1, and may be disposed to protrude in the −y-axis direction. According to an embodiment of the disclosure, similarly to the first holding portion 222_4a2, the second mounting portion 222_4b2 may have a shape in which the size of the protruding width gradually decreases in the direction from the z-axis to the −z-axis.

According to various embodiments of the disclosure, the protrusion 222_4b3 may have a predetermined thickness on one surface facing in the −x-axis direction in the periphery of the second fastening hole 222_4b1, and may protrude in the −x-axis direction by a predetermined length. According to an embodiment of the disclosure, the protrusion height of the protrusion 222_4b3 may have a height corresponding to the shape of one side of the stopper 236. The thickness of the protrusion 222_4b3 may have the same width as that of the periphery of the second fastening hole 222_4b1, and may have a width smaller than the total width of the periphery. The protrusion 222_4b3 may define a limit angle at which the second arm part 222 rotates within a specified angular range (e.g., within a range of 0 degrees to 100 degrees or 0 degrees to −100 degrees).

According to various embodiments of the disclosure, a second cam protrusion 222_4b4 may have a shape the same as or similar to the first cam protrusion 222_4a4. According to an embodiment of the disclosure, the second cam protrusion 222_4b4 may include irregularities protruding in the x-axis direction from one surface facing in the x-axis direction in the periphery of the second fastening hole 222_4b1. The second cam protrusion 222_4b4 may include at least one peak and valley. The center portions of the peak or valley of the second cam protrusion 222_4b4 may be formed to be flat. The size of a certain region at the center portion of the peak or valley of the second cam protrusion 222_4b4 (e.g., the size of the flat region) may be formed equal to the size of a certain region at the center portion of the peak or valley of the first cam protrusion 222_4a4. According to various embodiments of the disclosure, to provide a smoother hinge force (or detent feeling), the size of a certain region at the center portion of the peak or valley of the second cam protrusion 222_4b4 (e.g., the size of the flat region) may be formed to be different from the size of a certain region at the center portion of the peak or valley of the first cam protrusion 222_4a4.

According to various embodiments of the disclosure, the protrusions (or irregularities, or peaks and valleys) of the third cam structure 222_4a and the fourth cam structure 222_4b may be set to different directions (e.g., −x-axis direction). Alternatively, the directions of the protrusions of the third cam structure 222_4a and the fourth cam structure 222_4b may be different from each other. For example, the protrusion direction of the third cam structure 222_4a may be the −x-axis direction, and the protrusion direction of the fourth cam structure 222_4b may be the x-axis direction. The directions of the cams (e.g., 241a_1b and 241b_1b) may be also arranged to engage with the cam structures 222_4a and 222_4b depending on the arrangement direction of the cam structures 222_4a and 222_4b.

According to various embodiments of the disclosure, the second arm part 222 having the above-described structure may rotate about the second rotating shaft 232. In an arrangement state in which one side of the first cam member 241a (e.g., the second cam 241a_1b) is engaged with the third cam structure 222_4a and one side of the second cam member 241b (e.g., the fourth cam 241b_1b) is engaged with the fourth cam structure 222_4b, the second elastic body 242b may provide an elastic force to the second cam 241a_1b and the third cam structure 222_4a, and the fourth elastic body 242d may provide an elastic force to the fourth cam 241b_1b and the fourth cam structure 222_4b. The third cam structure 222_4a and the fourth cam structure 222_4b may perform a cam motion simultaneously or in multiple stages. According to an embodiment of the disclosure, the electronic device 100 may provide the third cam structure 222_4a and the fourth cam structure 222_4b into which the cam structure required for the cam motion is divided, and thus there is no increase in the size of the elastic bodies (e.g., increase in the diameter of the elastic body) or the thickness (e.g., the width of the line forming the elastic body), which makes it possible to provide a high elastic force without increasing the thickness of the electronic device 100. In addition, since the electronic device 100 may provide a rigid and improved (or greater) hinge force (or detent feeling or pressure) through a high elastic force, even if a display with increased tension, stiffness, or reaction force (e.g., increased thickness) is used, the folded or unfolded state of the electronic device 100 may be stably provided. The electronic device 100 may provide various holding angles more stably by using the arm part including a plurality of cam structures.

The second arm part 222 including the third cam structure 222_4a and the fourth cam structure 222_4b described above may have the same (or similar) configuration and shape as the first arm part 221 including the first cam structure 221_4a and the second cam structure 221_4b, based on the first axis 11 or the second axis 12.

Figure 8:
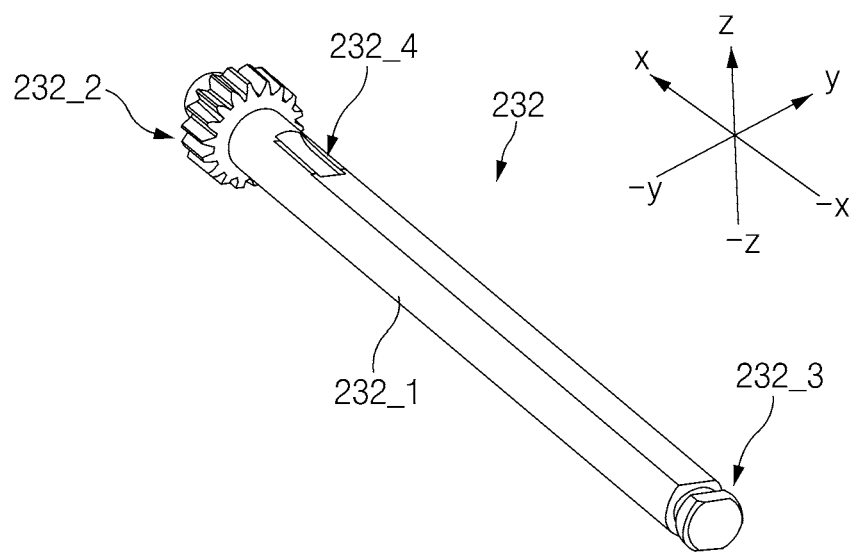
FIG. 8 is a diagram illustrating an example of a second rotating shaft according to an embodiment of the disclosure.

FIG. 8 is a diagram illustrating an example of a second rotating shaft according to an embodiment of the disclosure.

Before description, a second rotating shaft illustrated in FIG. 8 may have the same shape and material as the first rotating shaft.

Referring to FIGS. 3 and 8, according to an embodiment of the disclosure, the second rotating shaft 232 may include a column part 232_1, a shaft gear 232_2 (e.g., a second shaft gear 232_2 in FIG. 3), a ring holding groove 232_3, and a plate mounting groove 232_4. The second rotating shaft 232 may rotate about the second axis 12 in a predetermined angular range (e.g., an angular range from 0 degrees to 100 degrees or from 0 degrees to −100 degrees) with the rotation of the second arm part 222.

According to various embodiments of the disclosure, one end of the column part 232_1 (e.g., an end in the x-axis direction) may be fastened to one side of the fixing bracket 213, and the other end (e.g., an end in the −x-axis direction) thereof may be fastened to a fixing clip (e.g., 291_2). The column part 232_1 may have a rod shape in which the length in the x-axis direction is relatively longer than that in the y-axis direction. At least a portion of the z-axis cross-section (e.g., a cross-section cut in the direction from the z-axis to the −z-axis) of the column part 232_1 may include a curve, and the remaining portion of the column part 232_1 may include a straight line. For example, in the column part 232_1, at least a portion of one surface in the z-axis direction and at least a portion of one surface in the z-axis direction may be formed in a straight line in cross-section (a cross-section cut in the direction from the z-axis to the −z-axis), and at least a portion of one surface in the y-axis direction and at least a portion of one surface in the −y-axis direction may be formed in a curved shape. Accordingly, at least a portion of an upper portion of the column part 232_1 in the z-axis direction or the −z-axis direction may be formed as a flat surface, and at least a portion of the side surface in the y-axis direction or the −y-axis direction may be formed as a curved surface. The total length of the column part 232_1 may vary depending on the components put on the second rotating shaft 232. For example, one side of the rotating shaft support member 235, one side of the stopper 236, the first fastening hole 222_4a1 of the third cam structure 222_4a, the second fastening hole 222_4b1 of the fourth cam structure 222_4b, the second cam 241_1b, the fourth cam 241b_1b, the second elastic body 242b, the fourth elastic body 242d, one side of the center bracket 243a, one side of the shaft bracket 243bb, support rings 292_1 and 292_2, and the fixing clip may be coupled to the column part 232_1.

According to various embodiments of the disclosure, the shaft gear 232_2 may be disposed to be biased toward an end of the column part 232_1 in the x-axis direction. The shaft gear 232_2 has a larger cross-section than the z-axis cross-section (e.g., a cross-section cut in the direction from the z-axis to the −z-axis) of the column part 232_1, and a gear may be formed on an outer circumferential surface of the shaft gear 232_2. The shaft gear 232_2 may be disposed to engage with, for example, an idle gear (e.g., 234). The shaft gear 232_2 may be disposed between the end of the column part 232_1 in the x-axis direction and the plate holding groove 232_4.

According to various embodiments of the disclosure, the plate holding groove 232_4 may be formed on one side of an upper surface (e.g., at least a portion of a surface facing in the z-axis direction) of the column part 232_1. At least a portion of the rotating shaft support member 235 may be held in the plate holding groove 232_4. The plate holding groove 232_4 may be formed by being engraved lower than the periphery on one surface of the upper surface of the column part 232_1. The plate holding groove 232_4 may be disposed such that the rotating shaft support member 235 surrounds the idle gear 234 and the shaft gear 232_2.

According to various embodiments of the disclosure, the ring holding groove 232_3 may be disposed to be biased toward the −x axis of the column part 232_1. For example, the ring holding groove 232_3 may be formed at a position spaced apart from the end in the −x-axis direction of the column part 232_1 at a predetermined interval in the x-axis direction to have a lower height than the periphery and surround the entire circumference of the column part 232_1. Accordingly, the ring holding groove 232_3 may be provided in the shape of an engraved strip of the column part 232_1. For example, the fixing clip (e.g., 292_2) may be inserted into the ring holding groove 232_3.

In the above description, the second rotating shaft 232 has been described; however, the first rotating shaft 231 may also have the same configuration and material as the second rotating shaft 232. For example, the first rotating shaft 231 may include a column part, a shaft gear, a ring holding groove, and a plate mounting groove, and may rotate in a direction opposite to the second rotating shaft 232 about the first axis 11 spaced apart from the second axis 12 by a predetermined distance.

Figure 9:
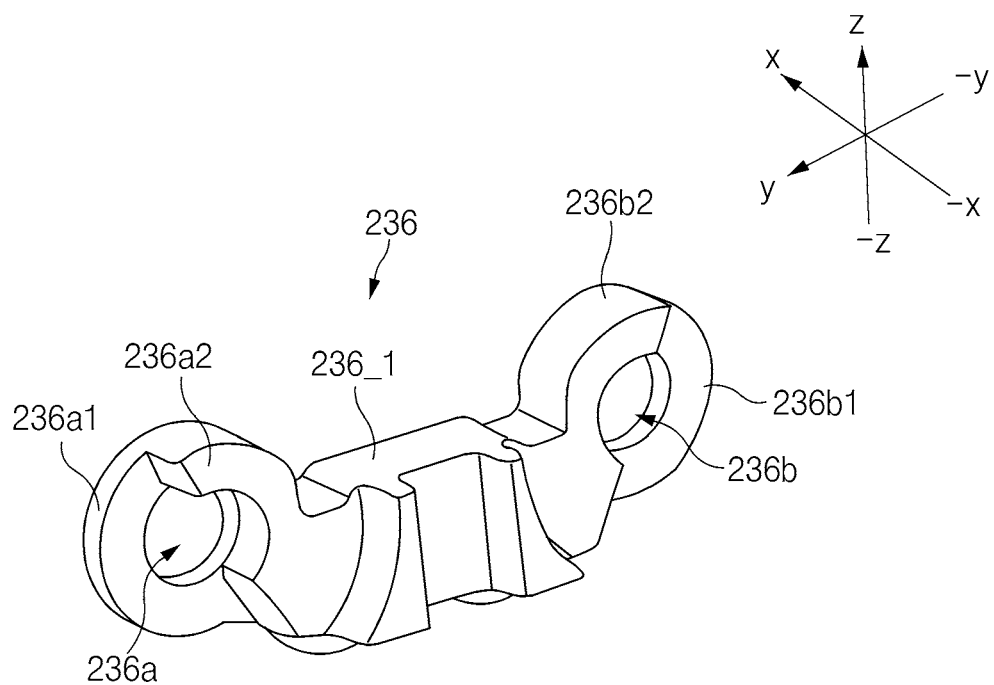
FIG. 9 is a diagram illustrating an example of a configuration of a stopper according to an embodiment of the disclosure.

FIG. 9 is a diagram illustrating an example of a configuration of a stopper according to an embodiment of the disclosure.

Referring to FIG. 9, according to an embodiment of the disclosure, the stopper 236 may prevent the first arm part 221 and the second arm part 222 from rotating beyond a specified angle, or may support a pressure when the pressure is applied out of the specified angle range. The stopper 236 may include a stopper body 236_1, a first shaft insertion hole 236a into which at least a portion of the first rotating shaft 231 is inserted, and a second shaft insertion hole 236b into which at least a portion of the second rotating shaft 232 is inserted.

According to various embodiments of the disclosure, the stopper body 236_1 may be formed to protrude further in the fourth direction (e.g., −x-axis direction) than the surfaces of the first shaft insertion hole 236a and the second shaft insertion hole 236b. The stopper body 236_1 may be formed to limit the rotation range of the first arm part 221 while the first arm part 221 is rotating, and limit the rotation range of the second arm part 222 while the second arm part 222 is rotating.

According to various embodiments of the disclosure, the stopper 236 may include a first hole periphery 236a1 forming the first shaft insertion hole 236a and a first stepped jaw 236a2 liming the rotation range of the first arm part 221. The first hole periphery 236a1 may have a strip shape in which the first shaft insertion hole 236a is formed in the center portion. The first stepped jaw 236a2 may be formed to protrude further in the −x-axis direction from a surface of the first hole periphery 236a1 in the −x-axis direction. The first stepped jaw 236a2 may be disposed to cover, for example, a certain surface (e.g., half) of the first hole periphery 236a1. The size of the first stepped jaw 236a2 formed on the first hole periphery 236a1 may vary greatly depending on the rotation design range of the first arm part 221. For example, if the rotation range of the first arm part 221 is designed to be relatively larger, the surface of the first hole periphery 236a1 on which the first stepped jaw 236a2 is disposed may be designed to be smaller, and conversely, if the rotation range of the first arm part 221 is designed to be relatively smaller, the surface of the first hole periphery 236a1 on which the first stepped jaw 236a2 is disposed may be designed to be larger.

According to various embodiments of the disclosure, the stopper 236 may include a second hole periphery 236b1 forming the second shaft insertion hole 236b and a second stepped jaw 236b2 liming the rotation range of the second arm part 222. The second hole periphery 236b1 may be disposed to be symmetrical with the first hole periphery 236a1 in the y-axis direction with respect to an axis crossing the x-axis of the stopper body 236_1 and the −x-axis (or virtual axis). The second shaft insertion hole 236b, the second hole periphery 236b1, and the second stepped jaw 236b2 may have the same (or similar) form as the first shaft insertion hole 236a, the first hole periphery 236a1, and the first stepped jaw 236a2. The second stepped jaw 236b2 may limit the rotation range of the second arm part 222.

According to various embodiments of the disclosure, a portion of the first hole periphery 236a1 and the second hole periphery 236b1 may be disposed to protrude further in the z-axis direction than an upper surface (a surface in the z-axis direction) of the stopper body 236_1. Accordingly, the first rotating shaft 231 and the second rotating shaft 232 inserted into the first shaft insertion hole 236a and the second shaft insertion hole 236b may be at least partially disposed above the stopper body 236_1 in the z-axis direction.

Figure 10:
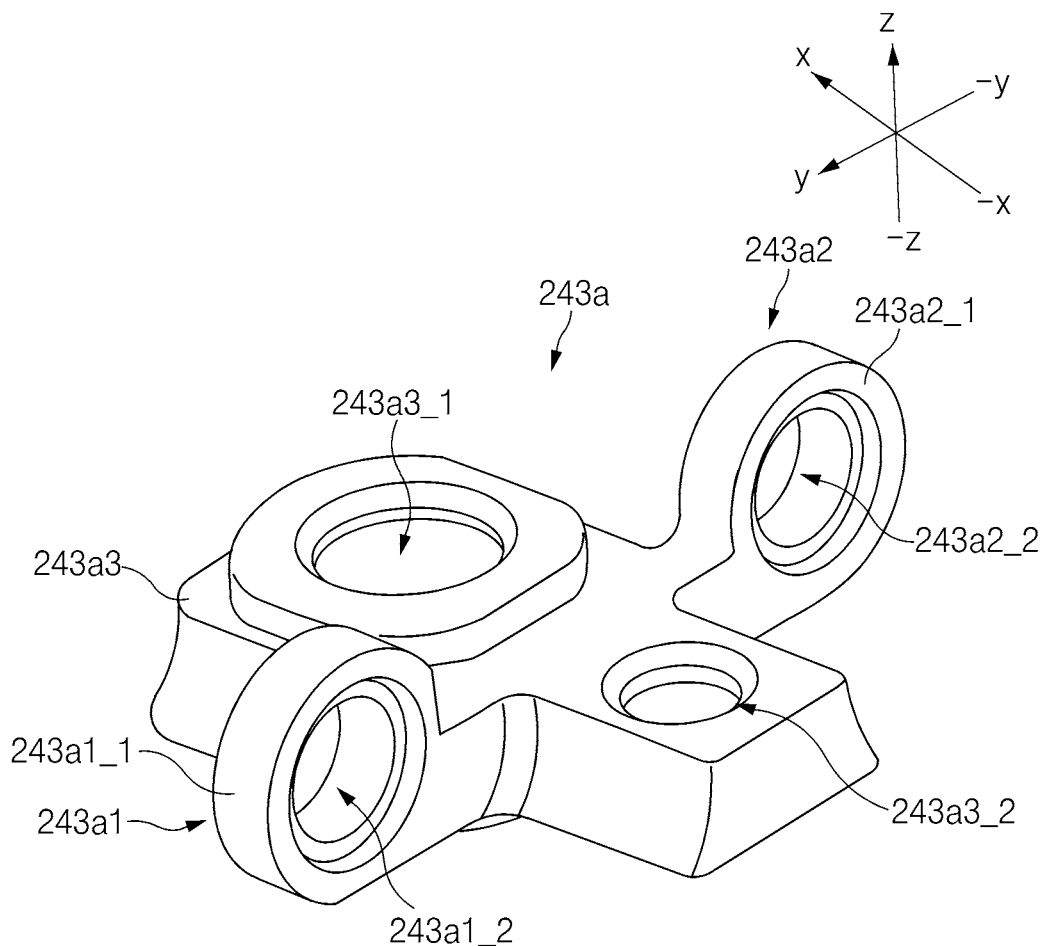
FIG. 10 is a diagram illustrating an example of a center bracket according to an embodiment of the disclosure.

FIG. 10 is a diagram illustrating an example of a center bracket according to an embodiment of the disclosure.

Referring to FIGS. 3 and 10, the center bracket 243a according to an embodiment of the disclosure may support the center bar 243c, and may be involved in the z-axis motion of the center bar 243c (e.g., guide the motion range of the center bar 243c). The center bracket 243a may include a center body 243a3, a first bracket wing part 243a1, and a second bracket wing part 243a2.

According to various embodiments of the disclosure, the center body 243a3 may have a certain thickness in the z-axis direction and may have an elongated shape in the x-axis direction as the x-axis or −x-axis direction is formed relatively larger than the y-axis direction. In the center body 243a3, an upper surface (e.g., a surface in the z-axis direction) may be formed to be narrower than a lower surface (e.g., a surface in the −z-axis direction) so as to correspond to adjacent elastic bodies (e.g., the third elastic body 242c and the fourth elastic body 242d) and the first cam member 241a, the rim thereof may have a certain inclination angle, and the shape thereof may be curved from the bottom to the top. The center body 243a3 may include a center coupling hole 243a3_1 opened in the z-axis direction and coupled with a boss formed in the center bar 243c, and a housing coupling hole 243a3_2 opened in the same direction as the center coupling hole 243a3_1 and coupled with a boss formed on one side of the hinge housing. The center coupling hole 243a3_1 and the housing coupling hole 243a3_2 may be disposed to be spaced apart by a predetermined distance.

According to various embodiments of the disclosure, the first bracket wing part 243a1 may be formed to protrude from the central region of the center body 243a3 in the y-axis direction. The first bracket wing part 243a1 may include a first bracket wing 243a1_1 and a first bracket hole 243a1_2. The first bracket wing 243a1_1 may have a circular band shape such that the first bracket hole 243a1_2 is formed in the center portion. In the first bracket wing 243a1_1, a step may be formed around the first bracket hole 243a1_2. Some of the cam structures (e.g., stepped jaw 222_4a3) formed in the first arm part 221 may be disposed in the step formed around the first bracket hole 243a1_2. The first bracket hole 243a1_2 may be opened in a direction perpendicular to the opening direction of the center coupling hole 243a3_1 or the housing coupling hole 243a3_2. The size of the first bracket hole 243a1_2 may be equal to or similar to the thickness of the first rotating shaft 231. Alternatively, the shape (e.g., circular shape) of the first bracket hole 243a1_2 may be different from the shape of the first rotating shaft 231 (e.g., a closed curve including some curves and some straight lines), and the diameter of the first bracket hole 243a1_2 may be larger than that of the first rotating shaft 231.

According to various embodiments of the disclosure, the second bracket wing part 243a2 may be formed to protrude from the central region of the center body 243a3 in the −y-axis direction, which is a direction opposite to the first bracket wing part 243a1. The second bracket wing part 243a2 may include a second bracket wing 243a2_1 and a second bracket hole 243a2_2. The second bracket wing 243a2_1 may have a circular band shape such that the second bracket hole 243a2_2 is formed in the center portion. Similar to the first bracket wing 243a1_1, the second bracket wing 243a2_1 may have a step formed on one side (e.g., the inner periphery where the second bracket hole 243a2_2 is formed), and some of the cam structures (e.g., the stepped jaw 222_4a3) formed on the second arm part 222 may be disposed in the step. The second bracket hole 243a2_2 may be opened in the same direction as the first bracket hole 243a1_2. The second bracket hole 243a2_2 may be formed the same as the first bracket hole 243a1_2, and may be formed partially different from the z-axis cross-section of the second rotating shaft 232 (e.g., the cross-section cut in the direction from the z-axis to the −z-axis). The second rotating shaft 232 may be inserted into the second bracket hole 243a2_2, and the second rotating shaft 232 may rotate within the second bracket hole 243a2_2.

Figure 11:
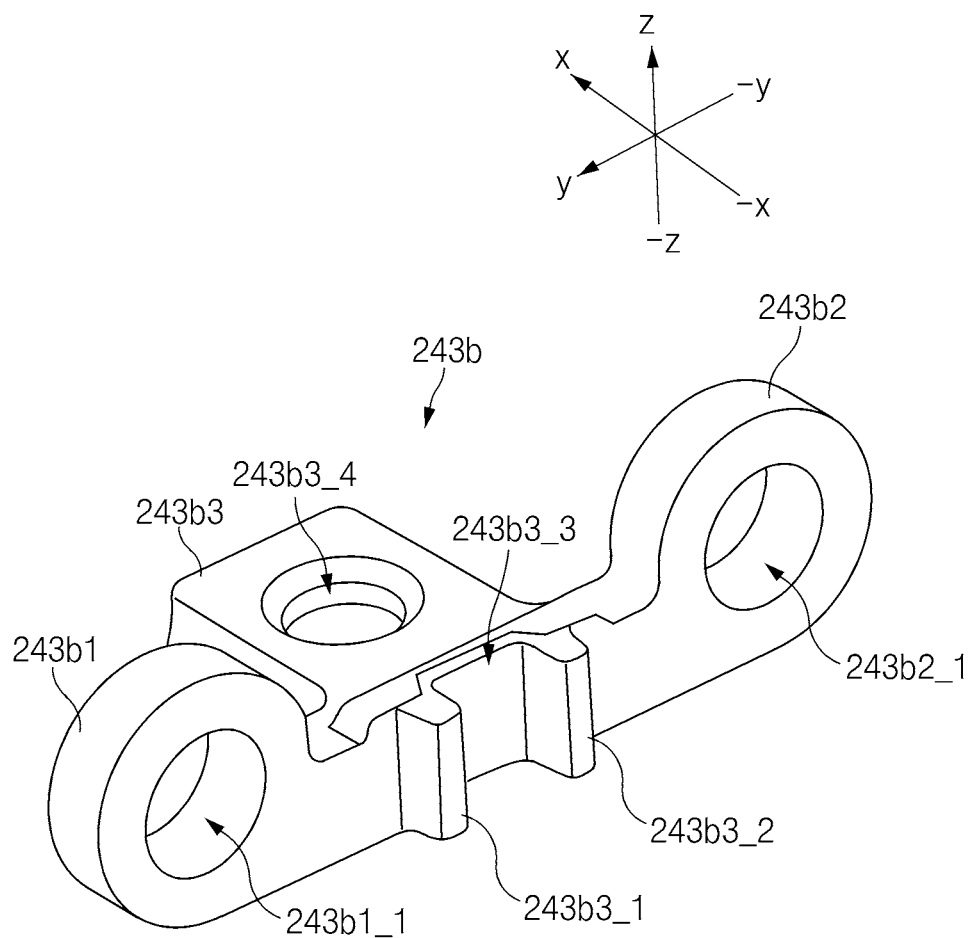
FIG. 11 is a diagram illustrating an example of a shaft bracket according to an embodiment of the disclosure.

FIG. 11 is a diagram illustrating an example of a shaft bracket according to an embodiment of the disclosure.

Referring to FIGS. 3 and 11, the shaft bracket 243b according to an embodiment of the disclosure may be combined with the first rotating shaft 231 and the second rotating shaft 232 to serve to fix the first rotating shaft 231 and the second rotating shaft 232. The shaft bracket 243b may include holes into which the first rotating shaft 231 and the second rotating shaft 232 are inserted, respectively, and may serve to support elastic bodies (e.g., the first elastic body 242a and the second elastic body 242b). The shaft bracket 243b may include a shaft bracket body 243b3, a first shaft wing 243b1, and a second shaft wing 243b2.

According to various embodiments of the disclosure, the shaft bracket body 243b3 may have x-axis and y-axis lengths longer than z-axis lengths. For example, the overall shape of the shaft bracket body 243b3 may have a rectangular shape having a predetermined thickness. Side portions (e.g., y-axis edge and −y-axis edge) of the shaft bracket body 243b3 may have a shape in which the size of the entire surface gradually decreases from the bottom surface to the top surface. Alternatively, at least some of the side portions of the shaft bracket body 243b3 may have a curved shape in which a cross-section (e.g., a cross-section cut in the direction from the z-axis to the −z-axis) is curved inward (e.g., in the direction from the y-axis to the −y-axis or from the −y-axis to the y-axis). One side of the first elastic body 242a and one side of the second elastic body 242b may be disposed adjacent to the side portion of the shaft bracket body 243b_3. One side edge (e.g., −x-axis edge) of the shaft bracket body 243b3 may include protrusions 243b3_1 and 243b3_2 protruding in the −x-axis direction and disposed to be spaced apart from each other at a predetermined interval on the y-axis. A locking part protruding in the −z-axis direction from the end of the center bar 243c may be fastened to a valley 243b3_3 between the protrusions 243b3_1 and 243b3_2 spaced apart from each other. A coupling hole 243b3_4 coupled with a boss formed in the hinge housing 150 may be disposed inside the shaft bracket body 243b3. The coupling hole 243b3_4 may be disposed to be opened in the z-axis direction, for example.

According to various embodiments of the disclosure, the first shaft wing 243b1 may extend to one side of the shaft bracket body 243b3 (e.g., the edge in the y-axis among the edges in the −x-axis), and may have a ring shape in which a first shaft insertion hole 243b1_1 into which the first rotating shaft 231 is inserted is formed in the center portion. The first shaft insertion hole 243b1_1 may be formed in a direction perpendicular to a direction in which the coupling hole 243b3_4 is opened (e.g., the x-axis or −x-axis direction). The size of the first shaft insertion hole 243b1_1 may be similar to or larger than the circumference of the first rotating shaft 231.

According to various embodiments of the disclosure, the second shaft wing 243b2 may be disposed symmetrically with the first shaft wing 243b1 with respect to the x-axis. For example, the second shaft wing 243b2 may extend to one side of the shaft bracket body 243b3 (e.g., the edge in the −y-axis among the edges in the −x-axis), and may have a ring shape in which a second shaft insertion hole 243b2_1 into which the second rotating shaft 232 is inserted is formed in the center portion. The second shaft insertion hole 243b2_1 may be opened in the same direction as the first shaft insertion hole 243b1_1. The size of the second shaft insertion hole 243b2_1 may be similar to or larger than the circumference of the second rotating shaft 232. The first shaft wing 243b1 and the second shaft wing 243b2 may be disposed parallel to each other on the y-axis.

Figure 12:
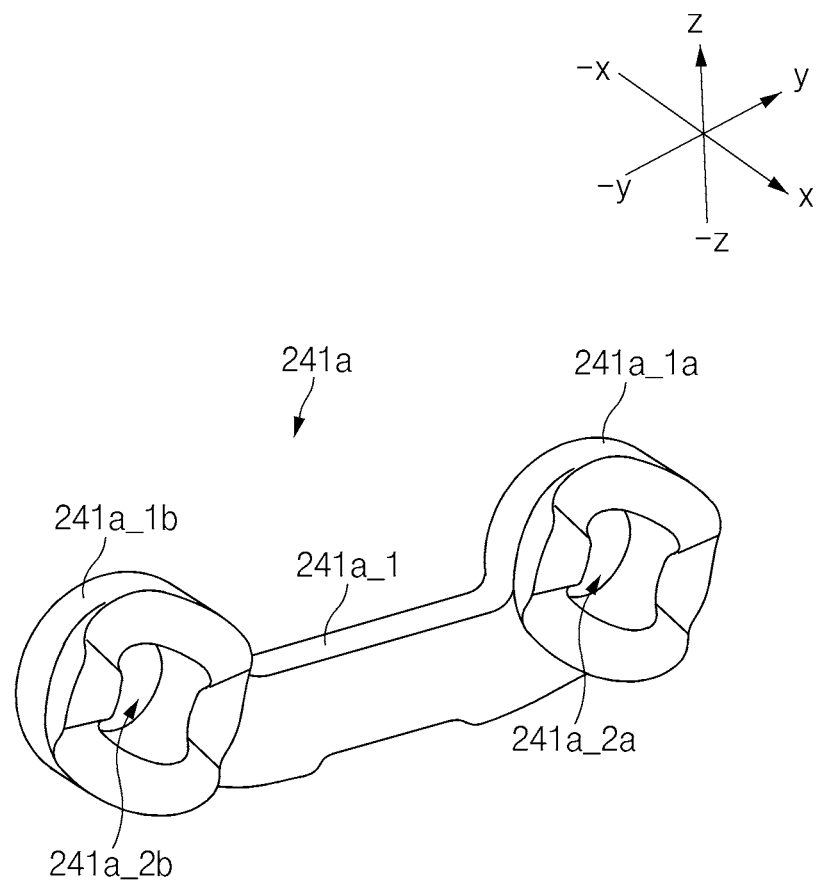
FIG. 12 is a diagram illustrating an example of a cam member according to an embodiment of the disclosure.

FIG. 12 is a diagram illustrating an example of a cam member according to an embodiment of the disclosure.

Before description, the cam member illustrated in FIG. 12 may be at least one of the first cam member 241a disposed between the shaft bracket 243b and the center bracket 243a, or the second cam member 241b disposed between the center bracket 243a and the stopper 236. In the following, a description will be given based on the first cam member 241a.

Referring to FIGS. 3 and 12, the first cam member 241a may include a cam body 241a_1, the first cam 241a_1a, the second cam 241a_1b, a first cam hole 241a_2a, and a second cam hole 241a_2b. The cam body 241_1 may have the first cam 241a_1a and the second cam 241a_1b disposed at both side edges. The cam body 241a_1 may be disposed between the center body 243a3 of the center bracket 243a and the shaft bracket body 243b_3 of the shaft bracket 243b.

According to various embodiments of the disclosure, the first cam 241a_1a may have peaks and valleys arranged in the x-axis direction, and a first cam hole 241a_2a may be formed in the center portion to allow the first rotating shaft 231 to pass through. The first cam 241a_1a may be disposed to engage with the first cam structure 221_4a of the first arm part 221. One side of the first elastic body 242a may contact the surface of the first cam 241a_1a in the −x-axis direction.

According to various embodiments of the disclosure, the second cam 241a_1b may be disposed in the same direction as the first cam 241a_1a, and may be disposed to be spaced apart from the first cam 241a_1a by the y-axis length of the cam body 241_1. The second cam 241a_1b may be disposed to engage with the third cam structure 222_4a of the second arm part 222, and the second elastic body 242b may contact the surface of the second cam 241a_1b in the −x-axis direction. The second cam hole 241a_2b may be formed in the center portion of the second cam 241a_1b such that the second rotating shaft 232 may be inserted therein.

According to various embodiments of the disclosure, the first cam member 241a may be retreated in the −x-axis direction by the first cam structure 221_4a and the second cam structure 221_4b while the first arm part 221 and the second arm part 222 are rotating within a certain angle range and then in the case of further rotation, the first cam member 241a may be disposed such that the peaks and valleys of the first cam structure 221_4a and the second cam structure 221_4b of the first arm part 221 and the second arm part 222 are engaged, and in this process, the first cam member 241a may move in the x-axis direction due to the elasticity of the first elastic body 242a and the second elastic body 242b to return to its original position.

As mentioned above, according to various embodiments of the disclosure, the cam member illustrated in FIG. 12 may be the second cam member 241b. In this case, the third cam 241b_1a of the second cam member 241b may be disposed to engage with the second cam structure 221_4b of the first arm part 221 and the fourth cam 241b_1b of the second cam member 241b may be disposed to engage with the fourth cam structure 222_4b of the second arm part 222 while the first cam 241a_1a of the first cam member 241a is disposed to engage with the first cam structure 221_4a of the first arm part 221 and the second cam 241a_1b of the first cam member 241a is disposed to engage with the third cam structure 222_4a of the second arm part 222. In relation to the cam motion of the second cam member 241b, the third elastic body 242c and the fourth elastic body 242d may provide an elastic force to the second cam member 241b.

As described above, the cam structures and the cams engaging with the cam structures according to the embodiment of the disclosure may provide a more rigid and stronger detent feeling by being disposed such that the two cam structures formed on the first arm part 221 and the two cam structures formed on the second arm part 222 are simultaneously engaged with the two cam members 241a and 241b. Alternatively, the cam structures and cams engaging with the cam structures according to various embodiments of the disclosure may provide a more rigid and stronger detent feeling based on a stronger elastic force based on four elastic bodies 242a, 242b, 242c, and 242d. In this process, a plurality of cam structures and cams may be provided, thereby providing improved wear resistance for the cam motion process while providing a higher hinge force (or detent capacity (or stronger detent capacity)) without increasing the thickness or size.

Figure 13:
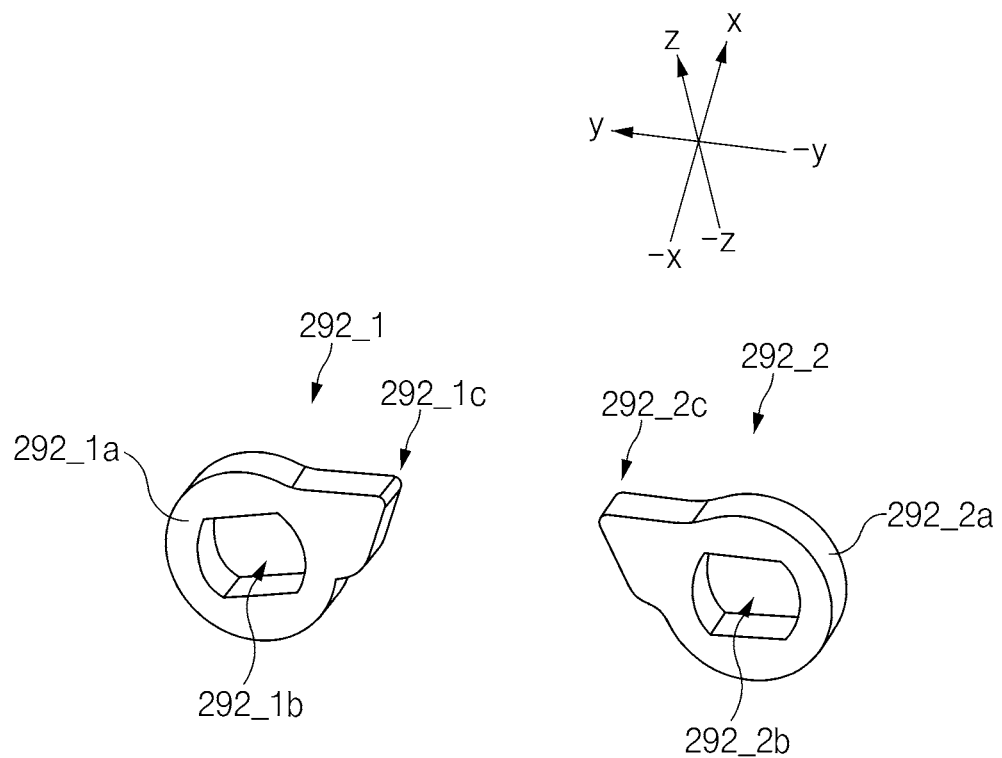
FIG. 13 is a diagram illustrating an example of support rings according to an embodiment of the disclosure.

FIG. 13 is a diagram illustrating an example of support rings according to an embodiment of the disclosure.

Referring to FIG. 13, the support rings 292_1 and 292_2 according to an embodiment of the disclosure may include the first support ring 292_1 coupled with the first rotating shaft 231 and the second support ring 292_2 coupled with the second rotating shaft 232.

According to various embodiments of the disclosure, the first support ring 292_1 may include a first ring hole 292_1b into which the first rotating shaft 231 is inserted, and a first ring body 292_1a forming the first ring hole 292_1b. The first ring body 292_1a may have the first ring hole 292_1b disposed in a center portion thereof, and may be provided in a ring shape as a whole. The first ring body 292_1a may include a first support protrusion 292_1c protruding from one side of the outer circumferential surface in the −y-axis direction. The first support protrusion 292_1c may have a shape (e.g., a triangular shape) in which the width becomes narrower as it moves away from the first ring body 292_1a. At least a portion of the upper surface (a surface facing toward the z-axis) of the first support protrusion 292_1c may be formed to be flat, and at least a portion of a lower cross-section (e.g., a cross-section cut in a direction from the z-axis to the −z-axis) may include a curve. The first support protrusion 292_1c may support one side of the center bar 243c while the first arm part 221 and the second arm part 222 are disposed in parallel on the y-axis. The first ring hole 292_1b may have a cross-section the same as or similar to the z-axis cross-section of the first rotating shaft 231 (e.g., the cross-section cut in the direction from the z-axis to the −z-axis). For example, the first ring hole 292_1b may include a straight section in at least a portion of the z-axis cross-section (e.g., a cross-section cut in the direction from the z-axis to the −z-axis), and a circular section in the remaining section. Alternatively, the first ring hole 292_1b may have a shape in which straight sections and circular sections are alternately disposed in the z-axis cross-section (e.g., the cross-section cut in the direction from the z-axis to the −z-axis). Accordingly, when the first rotating shaft 231 rotates in one direction, the first support ring 292_1 may rotate in the same direction as the first rotating shaft 231.

According to various embodiments of the disclosure, the second support ring 292_2 may include a second ring hole 292_2b into which the second rotating shaft 232 is inserted, and a second ring body 292_2a forming the second ring hole 292_2b. A second support protrusion 292_2c may be disposed on one side of the second ring body 292_2a. The second ring hole 292_2b may be provided to have a shape the same as or similar to the first ring hole 292_1b. Alternatively, the second ring hole 292_2b may be provided in a shape the same as or similar to the z-axis cross-section of the second rotating shaft 232 (e.g., the cross-section cut in the direction from the z-axis to the −z-axis). The second ring body 292_2a may have a shape the same as or similar to the first ring body 292_1a. The second support protrusion 292_2c may be disposed to protrude from one side of the second ring body 292_2a in the y-axis direction. Similar to the first support protrusion 292_1c, the second support protrusion 292_2c may be provided in a shape in which at least a portion of the cross-section (e.g., the cross-section cut in the direction from the z-axis to the −z-axis) gradually decreases in size (e.g., triangular shape). In the state in which the first arm part 221 and the second arm part 222 are parallel to the y-axis (e.g., the display of the electronic device is in the unfolded state), the protruding tip of the second support protrusion 292_2c may be disposed to face the protruding tip of the first support protrusion 292_1c. Accordingly, when the electronic device is in the unfolded state, the second support protrusion 292_2c may support one side of the center bar 243c similar to the first support protrusion 292_1c.

Figure 14:
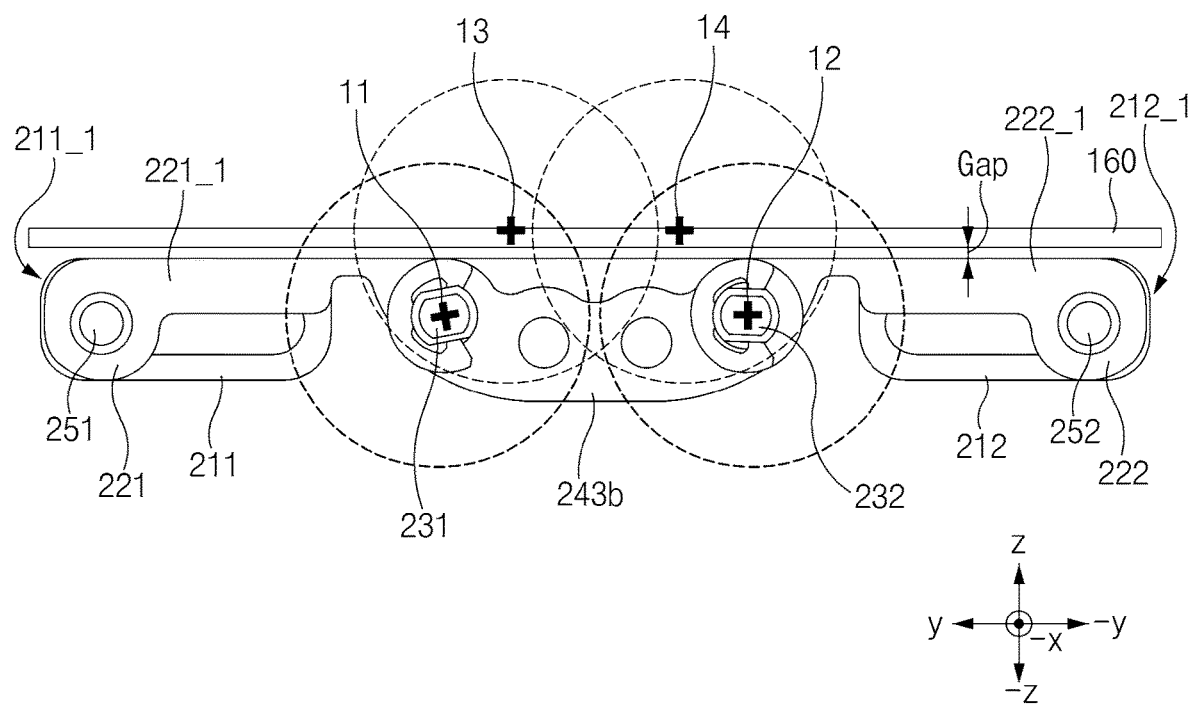
FIG. 14 is a diagram illustrating a first state of some components of an electronic device according to an embodiment of the disclosure.

FIG. 14 is a diagram illustrating a first state of some components of an electronic device according to an embodiment of the disclosure.

Referring to FIGS. 1A to 1C, 3, and 14, some components of the electronic device 100 may include the first hinge structure 200a and the display 160, and the first hinge structure 200a and the display 160 may have a first state (e.g., the unfolded state). Before description, the drawing illustrated in FIG. 14 may correspond to the shape of the second hinge structure 200b and the display 160 depending on the viewing angle.

According to various embodiments of the disclosure, the first hinge structure 200a may include the first rotating part 211, the second rotating part 212, the fixing bracket 213, the first arm part 221, the second arm part 222, the first rotating shaft 231, the second rotating shaft 232, the idle gears 233 and 234, the first cam member 241a, the second cam member 241b, the first elastic body 242a, the second elastic body 242b, the third elastic body 242c, the fourth elastic body 242d, the center bracket 243a, and the shaft bracket 243b. The first rotating part 211 may be connected to the first arm part 221 via the first fastening part 251. The second rotating part 212 may be connected to the second arm part 222 via the second fastening part 252.

According to various embodiments of the disclosure, while the first rotating part 211 and the second rotating part 212 maintain the unfolded state, the display 160 may maintain the unfolded state. The first arm part 221 may rotate within a specified angular range (e.g., a range of 0 degrees to 100 degrees or 0 degrees to 95 degrees) about the first rotating shaft 231. The second arm part 222 may rotate within a specified angular range about the second rotating shaft 232. The first rotating part 211 may rotate within the same or similar angular range as the first arm part 221 about the third axis 13. The second rotating part 212 may rotate within the range the same as or similar to that of the second arm part 222 about the fourth axis 14. The third axis 13 may be formed higher in a direction toward the display 160 (e.g., z-axis direction) than the first rotating shaft 231. The fourth axis 14 may be formed higher in the direction toward the display 160 (e.g., z-axis direction) than the second rotating shaft 232. The distance between the third axis 13 and the fourth axis 14 may be shorter than the distance between the first rotating shaft 231 and the second rotating shaft 232.

According to various embodiments of the disclosure, the third axis 13 and the fourth axis 14 may be formed side-by-side on a horizontal axis (e.g., the y-axis). According to an embodiment of the disclosure, the third axis 13 and the fourth axis 14 may be formed on the same layer as the display 160, or above the display 160 (e.g., the air above the display 160). For example, the third axis 13 and the fourth axis 14 may be virtual axes.

According to various embodiments of the disclosure, while the first rotating part 211 and the second rotating part 212 maintain the unfolded state, a first bracket body 211_1 of the first rotating part 211 and the second bracket body 212_1 of the second rotating part 212 may be arranged side-by-side. According to an embodiment of the disclosure, the upper surface of the first bracket body 211_1 and the upper surface of the second bracket body 212_1 may be arranged in the same way so as to face upward (e.g., the z-axis direction) based on the illustrated drawing. According to an embodiment of the disclosure, while the first rotating part 211 and the second rotating part 212 maintain the unfolded state, the first arm part 221 and the second arm part 222 may be arranged side-by-side as well, and accordingly, a first basic body 221_1 of the first arm part 221 and a second basic body 222_1 of the second arm part 222 may be arranged to face in the same direction (e.g., the z-axis direction based on the illustrated drawing). Accordingly, the first bracket body 211_1, the second bracket body 212_1, the first basic body 221_1, and the second basic body 222_1 may be all arranged side-by-side based on the horizontal axis, and arranged to face upward based on the illustrated drawing. The first bracket body 211_1, the second bracket body 212_1, the first basic body 221_1, and the second basic body 222_1 may support the back surface of the display 160 without a difference in height.

According to various embodiments of the disclosure, at the center portion where the display 160 is bent, there may be formed a predetermined gap "Gap" with the hinge structures 200a and 200b. An adhesive layer may be disposed between a peripheral region (e.g., the first portion 161 or the second portion 162) other than the center portion 163 of the display 160 and the hinge structures 200a and 200b.

According to various embodiments of the disclosure, in the first state (e.g., state in which the display 160 is unfolded), the peaks and valleys of the first cam 241a_1a of the first cam member 241a may be arranged to engage with the valleys and peaks of the first cam structure 221_4a, respectively, the peaks and valleys of the second cam 241a_1b of the first cam member 241a may be arranged to engage with the valleys and peaks of the third cam structure 222_4a, respectively, the peaks and valleys of the third cams 241b_1a of the second cam member 241b may be arranged to engage with the valleys and peaks of the second cam structure 221_4b, and the peaks and valleys of the fourth cam 241b_1b of the second cam member 241b may be disposed to engage with the valleys and peaks of the fourth cam structure 222-4b, respectively.

Figure 15:
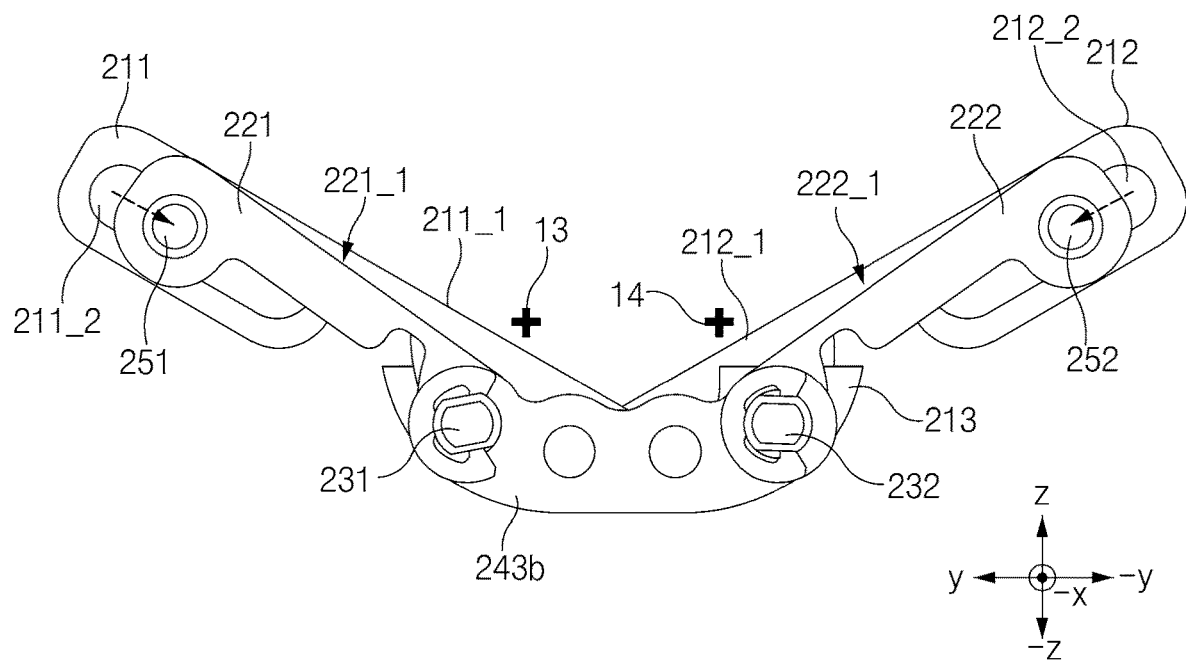
FIG. 15 is a diagram illustrating a first angular state of a partial structure of an electronic device according to an embodiment of the disclosure.

FIG. 15 is a diagram illustrating a first angular state of a partial structure of an electronic device according to an embodiment of the disclosure.

Referring to FIGS. 1A to 1C, 3, and 15, the first hinge structure 200a (or the second hinge structure 200b) may include a first angular state (e.g., a state in which the upper surfaces of the first rotating part 211 and the second rotating part 212 (surfaces in the z-axis direction) is inclined at an angle of 30 degrees to the horizontal axis (the y-axis)). As described above, the first hinge structure 200a may include the first rotating part 211, the second rotating part 212, the fixing bracket 213, the first arm part 221, the second arm part 222, the first cam member 241a, the second cam member 241b, the first elastic body 242a, the second elastic body 242b, the third elastic body 242c, the fourth elastic body 242d, the first rotating shaft 231, the second rotating shaft 232, the center bracket 243a, and the shaft bracket 243b. The first rotating part 211 may be connected to the first arm part 221 via the first fastening part 251. The second rotating part 212 may be connected to the second arm part 222 via the second fastening part 252.

According to various embodiments of the disclosure, a first housing (e.g., the first housing 110 in FIGS. 1A to 1C) to which the first rotating part 211 is fixed or a second housing (e.g., the second housing 120 in FIGS. 1A to 1C) to which the second rotating part 212 is fixed may rotate at a point on the horizontal axis (e.g., the y-axis) by a certain angle (e.g., a certain unit angle such as 5 degrees, 10 degrees, or 15 degrees) in a direction toward the vertical axis (e.g., the z-axis) based on the illustrated drawing, due to external pressure. For example, the first rotating part 211 connected to the first housing 110 may rotate by a first angle (e.g., 30 degrees) at one point on the horizontal axis (e.g., the y-axis) about the third axis 13 in the direction toward the vertical axis (e.g., the z-axis). If the first rotating part 211 rotates by the first angle due to external pressure, the pressure may be transmitted to the first arm part 221 via the first fastening part 251. Accordingly, the first arm part 221 may rotate on the horizontal axis (e.g., the y-axis) by the first angle about the first rotating shaft 231 in the direction toward the vertical axis (e.g., the z-axis). In this operation, the first cam structure 221_4a and the second cam structure 221_4b may rotate with the rotational operation of the first arm part 221. The first rotating shaft 231 inserted into the first cam structure 221_4a and the second cam structure 221_4b may rotate by the force transmitted with the rotation of the first cam structure 221_4a and the second cam structure 221_4b, and as the first rotating shaft 231 rotates, a first shaft gear (e.g., 231_2 in FIG. 3) of the first rotating shaft 231 may rotate. With the rotation of the first shaft gear, the first idle gear 233 and the second idle gear 234 gear-coupled to the first shaft gear may rotate, and as a result, the second shaft gear 232_2 connected to the second idle gear 234 rotates, resulting in the rotation of the second rotating shaft 232. The third cam structure 222_4a and the fourth cam structure 242_4b may rotate with the rotation of the second rotating shaft 232, the second arm part 222 may rotate with the rotation of the third cam structure 222_4a and the fourth cam structure 222_4b, and the second rotating part 212 connected via the second fastening part 252 may rotate with the rotation of the second arm part 222. In the above description, the operation of simultaneously rotating the second rotating part 212 while the external pressure is applied to the first rotating part 211 has been described; however, the disclosure is not limited thereto. For example, if an external pressure is applied to the second rotating part 212, the second arm part 222 connected via the second fastening part 252 may rotate, and the second rotating shaft 232 connected to the second arm part 222, the second idle gear 234 connected to the second rotating shaft 232, the first idle gear 233 connected to the second idle gear 234, the first rotating shaft 231 connected to the first idle gear 233, the first arm part 221 having the first cam structure 221_4a and the second cam structure 221_4b connected to the first rotating shaft 231, and the first rotating part 211 connected to the first arm part 221 via the first fastening part 251 may rotate. Alternatively, when pressure is applied to the first rotating part 211 and the second rotating part 212 from the outside at the same time, the first arm part 221 and the second arm part 222 may rotate at a certain angle at the same time.

As described above, the first hinge structure 200a may have a structure in which the first rotating part 211 and the second rotating part 212 rotate at the same time with the pressure (or force) applied from the outside. Accordingly, even if external pressure occurs in the second housing 120 to which the second rotating part 212 is connected, or simultaneously occurs in the first housing 110 and the second housing 120, the first rotating part 211 and the second rotating part 212 may rotate at the same time. In the electronic device 100 according to an embodiment of the disclosure, with the simultaneous rotation, torsion of the first housing 110 and the second housing 120 may be suppressed, and a stable hinge operation may be performed.

According to an embodiment of the disclosure, the axes 13 and 14 of the first rotating part 211 and the second rotating part 212 may be disposed between the first rotating shaft 231 and the second rotating shaft 232 of the first arm part 221 and the second arm part 222, and thus the rotation amount of the first rotating part 211 and the rotation amount of the first arm part 221 may be different for each point of rotation time. Accordingly, the upper surface of the first bracket body 211_1 of the first rotating part 211 may be rotated more about the vertical axis (e.g., the z-axis) than the upper surface of the basic body 221_1 of the first arm part 221. As the first rotating part 211 and the first arm part 221 are connected via the first fastening part 251, the first fastening part 251 may slide along a first slide hole 211_2 of the first rotating part 211 by a predetermined distance while the first rotating part 211 is rotating. Similarly, the upper surface of the second bracket body 212_1 may be rotated more about the vertical axis (e.g., the z-axis) than the second basic body 222_1. Furthermore, as the second rotating part 212 and the second arm part 222 are connected via the second fastening part 252, the second fastening part 252 may slide along a second slide hole 212_2 of the second rotating part 212 by a predetermined distance while the second rotating part 212 is rotating.

As described above, in a state in which the display 160 of the electronic device 100 is in the folded state at a specific angle (e.g., the angle between the upper surface of the display 160 and the horizontal axis is 30 degrees or −30 degrees), as the first arm part 221 rotates, the slope close to the peak among the slopes between the peak and the valley of the first cam structure 221_4a may be in contact with the slope close to the peak among the slopes between the peak and valley of the first cam 241a_1a of the first cam member 241a, and the slope close to the peak among the slopes between the peak and valley of the second cam structure 221_4b may be in contact with the slope close to the peak among the slopes between the peak and valley of the third cam 241b_1a of the second cam member 241b. Similarly, as the second arm part 222 rotates, the slope close to the peak among the slopes between the peak and the valley of the third cam structure 222_4a may be in contact with the slope close to the peak among the slopes between the peak and valley of the second cam 241a_1b of the first cam member 241a, and the slope close to the peak among the slopes between the peak and valley of the fourth cam structure 222_4b may be in contact with the slope close to the peak among the slopes between the peak and valley of the fourth cam 241b_1b of the second cam member 241b.

Figure 16:
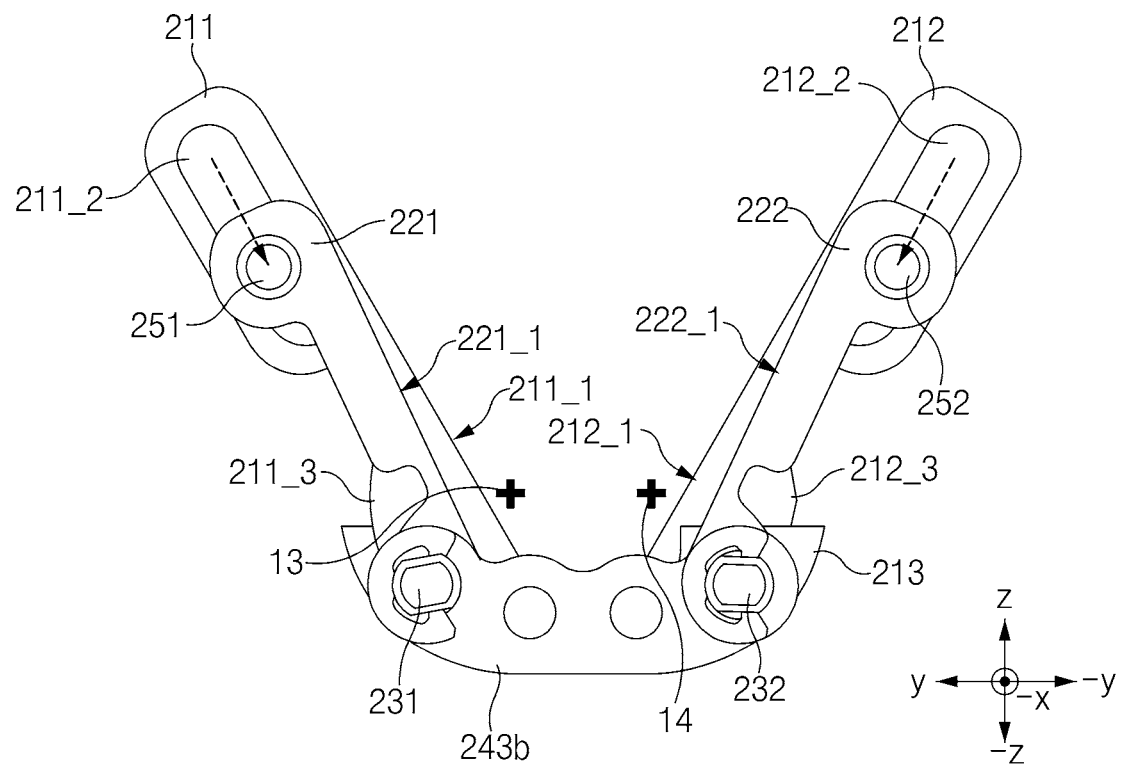
FIG. 16 is a diagram illustrating a second angular state of a first hinge structure according to an embodiment of the disclosure.

FIG. 16 is a diagram illustrating a second angular state of a first hinge structure according to an embodiment of the disclosure.

Referring to FIGS. 1A to 1C, 3, and 16, the first hinge structure 200a may include a second angular state. The first hinge structure 200a may, for example, include the first rotating part 211, the second rotating part 212, the fixing bracket 213, the first arm part 221, the second arm part 222, a gear structure 230, the first cam member 241a, the second cam member 241b, the first elastic body 242a, the second elastic body 242b, the third elastic body 242c, the fourth elastic body 242d, the first rotating shaft 231, the second rotating shaft 232, the center bracket 243a, and the shaft bracket 243b. The first rotating part 211 may be connected to the first arm part 221 via the first fastening part 251, and the second rotating part 212 may be connected to the second arm part 222 via the second fastening part 252.

According to various embodiments of the disclosure, a first housing (e.g., the first housing 110 in FIGS. 1A to 1C) or a second housing (e.g., the second housing 120 in FIGS. 1A to 1C) may rotate at a point on the horizontal axis (e.g., the y-axis) by a second angle (e.g., 60 degrees) in the direction toward the vertical axis (e.g., the z-axis) based on the illustrated drawing, due to external pressure (or force). For example, when external pressure or force is transmitted to the first housing 110 or the second housing 120, the first rotating part 211 or the second rotating part 212 may rotate by the second angle (e.g., 60 degrees) at one point on the horizontal axis (e.g., the y-axis) about the third axis 13 or the fourth axis 14 in the direction toward the vertical axis (e.g., the z-axis). In the process of performing the above-described operation, the applied force may be mutually transmitted through the first arm part 221 or the second arm part 222, the first rotating shaft 231 and the second rotating shaft 232, and idle gears 233 and 234, so that the first rotating part 211, the second rotating part 212, the first arm part 221, and the second arm part 222 may rotate at the same time.

According to various embodiments of the disclosure, as the first rotating part 211 and the second rotating part 212 rotate at a second angle, the first fastening part 251 and the second fastening part 252 may slide in the first slide hole 211_2 and the second slide hole 212_2; in this case, the first fastening part 251 and the second fastening part 252 may be positioned closer to the vertical axis (e.g., the z-axis) than in the case when they are rotated at the first angle. In the process of the above-described operation, based on the illustrated drawing, the first rail 211_3 of the first rotating part 211 may rotate in a left-outward direction from the center of the fixing bracket 213, and the second rail 212_3 of the second rotating part 212 may rotate in a right-outward direction from the center of the fixing bracket 213. As the axes about which the first rotating part 211 and the first arm part 221 rotate are different from each other and the axes about which the second rotating part 212 and the second arm part 222 rotate are different from each other, the distance between the upper surface of the first bracket body 211_1 and the upper surface of the second bracket body 212_1 may be disposed closer to the vertical axis (e.g., the z-axis) than the distance between the upper surface of the first basic body 221_1 and the upper surface of the second basic body 222_1.

As described above, in a state in which the display 160 of the electronic device 100 is in the folded state at a specific angle (e.g., the angle between the upper surface of the display 160 and the horizontal axis is 60 degrees or −60 degrees), as the first arm part 221 rotates, at least a portion of the peak of the first cam structure 221_4a may be in contact with at least a portion of the peak of the first cam 241a_1a of the first cam member 241a, and at least a portion of the peak of the second cam structure 221_4b may be in contact with the peak of the third cam 241b_1a of the second cam member 241b. Similarly, as the second arm part 222 rotates, at least a portion of the peak of the third cam structure 222_4a may be in contact with the peak of the second cam 241a_1b of the first cam member 241a, and at least a portion of the peak of the fourth cam structure 222_4b may be in contact with the peak of the fourth cam 241b_1b of the second cam member 241b.

In the above description, in the first angular state, the slope adjacent to the peak of the cam structure has been described as being in contact with the slope adjacent to the peak of the cam, and in the second angular state, at least a portion of the peak of the cam structure has been described as being in contact with the peak of the cam; however, the disclosure is not limited thereto. For example, the electronic device 100 may have a more various angular states (e.g., the angle between the upper surface of one side of the display and the horizontal axis is a free stop due to friction between the cam structure and the cam, or varies, such as a one-degree unit, a five-degree unit, or 15 degrees, 30 degrees, 45 degrees, 60 degrees, or the like), and for each angular state, a portion where the slope between the peak and valley of the cam structure and the slope between the peak and the valley of the cam are brought into contact with each other may be different. Alternatively, for each angular state, the size of the area in which the peak of the cam structure and the peak of the cam are brought into contact with each other may be different.

Figure 17:
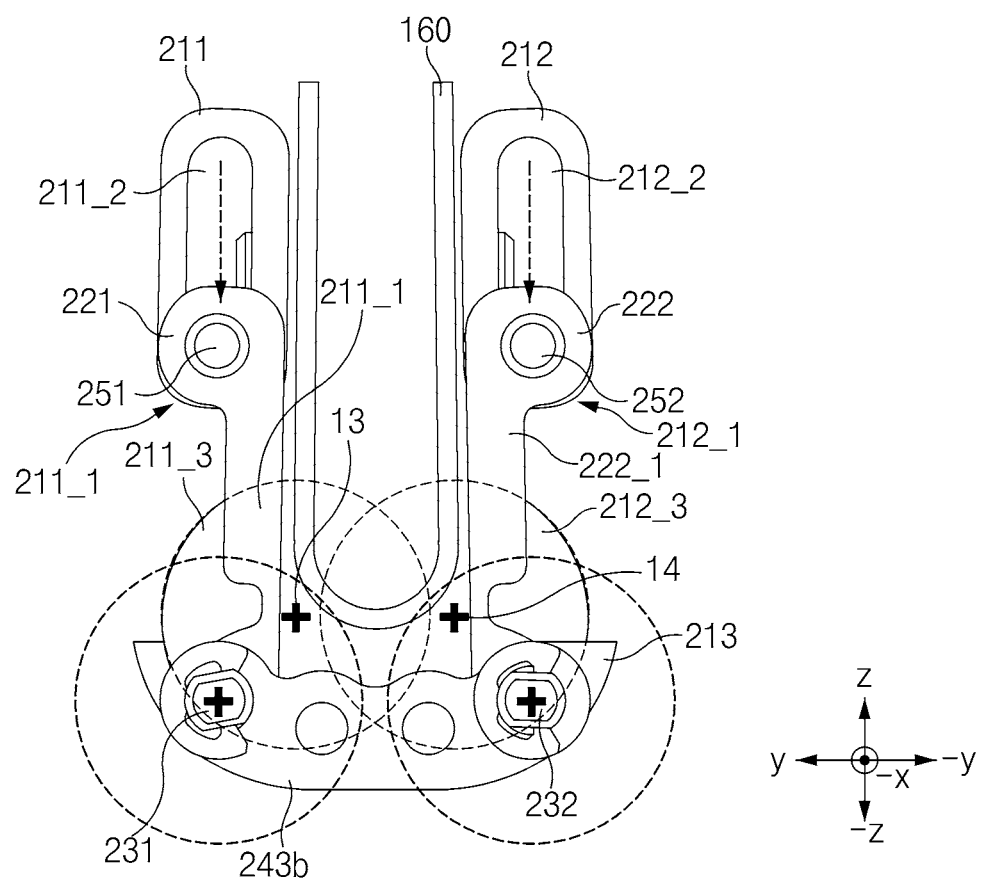
FIG. 17 is a diagram illustrating a second state of some parts of an electronic device according to an embodiment of the disclosure.

FIG. 17 is a diagram illustrating a second state of some parts of an electronic device according to an embodiment of the disclosure.

Referring to FIGS. 1A to 1C, 3, and 17, the electronic device 100 may include the first hinge structure 200a and the display 160. The second state of the first hinge structure 200a may include the folded state. The first hinge structure 200a may include, for example, the fixing bracket 213, the first rotating part 211, the second rotating part 212, the first arm part 221, the second arm part 222, the first fastening part 251, the second fastening part 252, the first rotating shaft 231, the second rotating shaft 232, shaft gears of the first rotating shaft 231 and the second rotating shaft 232, idle gears 233 and 234, the first cam member 241a, the second cam member 241b, the first elastic body 242a, the second elastic body 242b, the third elastic body 242c, the fourth elastic body 242d, the center bracket 243a, and the shaft bracket 243b.

According to an embodiment of the disclosure, the first rotating part 211 and the second rotating part 212 may be disposed to face each other. As the edge ends of the first housing 110 and the second housing 120 (e.g., the end in the z-axis direction based on FIG. 17) are disposed adjacent to each other based on the illustrated drawing, the first rotating part 211 may be disposed to be parallel to a vertical axis (e.g., z-axis), or may be disposed to rotate about the third axis 13 and be disposed to be further tilted by a specified angle from the vertical axis (e.g., the z-axis) toward the −y-axis direction, in the illustrated drawing. According to various embodiments of the disclosure, similar to the first rotating part 211, the second rotating part 212 may be disposed to be parallel to the vertical axis (e.g., the z-axis) or to rotate about the fourth axis 14, but may be disposed to be further tilted by a specified angle from the vertical axis (e.g., the z-axis) toward the y-axis direction. The third axis 13 may be, for example, a rotational central axis of the first rail 211_3, and the fourth axis 14 may be a rotational central axis of the second rail 212_3. The first arm part 221 may rotate about the first rotating shaft 231 to be disposed in parallel with the first rotating part 211, and the second arm part 222 may rotate about the second rotating shaft 232 to be disposed in parallel with the rotating part 212. Accordingly, the display 160 may be bent in a "U" shape in the center portion 163, and the remaining region of the display 160 may maintain a flat state.

According to various embodiments of the disclosure, the upper surface of the first bracket body 211_1 of the first rotating part 211 and the upper surface of the basic body 221_1 of the first arm part 221 may be arranged side-by-side without a difference in height by arranging the first rotating part 211 and the first arm part 221 vertically (tilted by a specified angle from a vertical axis (e.g., z-axis) toward the −y-axis direction). Due to the difference in length between the first rotating part 211 and the first arm part 221, the first fastening part 251 may be positioned under the first slide hole 211_2 of the first rotating part 211 (e.g., the edge in the −z-axis direction with respect to FIG. 17). According to various embodiments of the disclosure, when the electronic device 100 is in the unfolded state, the first fastening part 251 may be positioned at an upper edge of the first slide hole 211_2 of the first rotating part 211. Similarly, when the electronic device 100 is in the folded state, the second fastening part 252 may be positioned at a lower edge of the second slide hole 212_2.

According to various embodiments of the disclosure, in a state in which the display 160 of the electronic device 100 is folded (e.g., a state in which the center portion of the display 160 is transformed into a U-shape), an arrangement may be provided in which, as the first arm part 221 rotates, the peaks and valleys of the first cam structure 221_4a engage with the valleys and peaks of the first cam 241a_1a of the first cam member 241a, and the peaks and valleys of the second cam structure 221_4b engage with the valleys and peaks of the third cam 241b_1a of the second cam member 241b. Similarly, an arrangement may be provided in which, as the second arm part 222 rotates, the peaks and valleys of the third cam structure 222_4a engage with the valleys and the peaks of the second cams 241a_1b of the first cam member 241a, and the peaks and valleys of the fourth cam structure 222_4b engage with the valleys and peaks of the fourth cam 241b_1b of the second cam member 241b.

The electronic device 100 according to the various embodiments of the disclosure described above may increase the detent load of the hinge by implementing a plurality of cam structures without increasing the thickness of the hinge structure. The electronic device 100 may improve the issue in the folded or unfolded state of the terminal in a room temperature or low temperature environment (e.g., an issue in which the ends of the housings 110 and 120 get opened in the folded state) by using the increased detent load of the hinge structure even if the reaction force (or the repulsive force, or the force to unfold the folded display) of the display 160 (or the flexible display) is increased. The electronic device 100 may allow an increase in the reaction force of the display 160 through the improved detent load, thereby increasing the rigidity of the display 160 (e.g., applicable to manufacture the display 160 to be thicker than before), and accordingly, it is possible to reduce the occurrence of cracks or surface damage in the portion where the load caused by the folding is concentrated in the folded state (e.g., the center portion 163 of the display 160).

Figure 18:
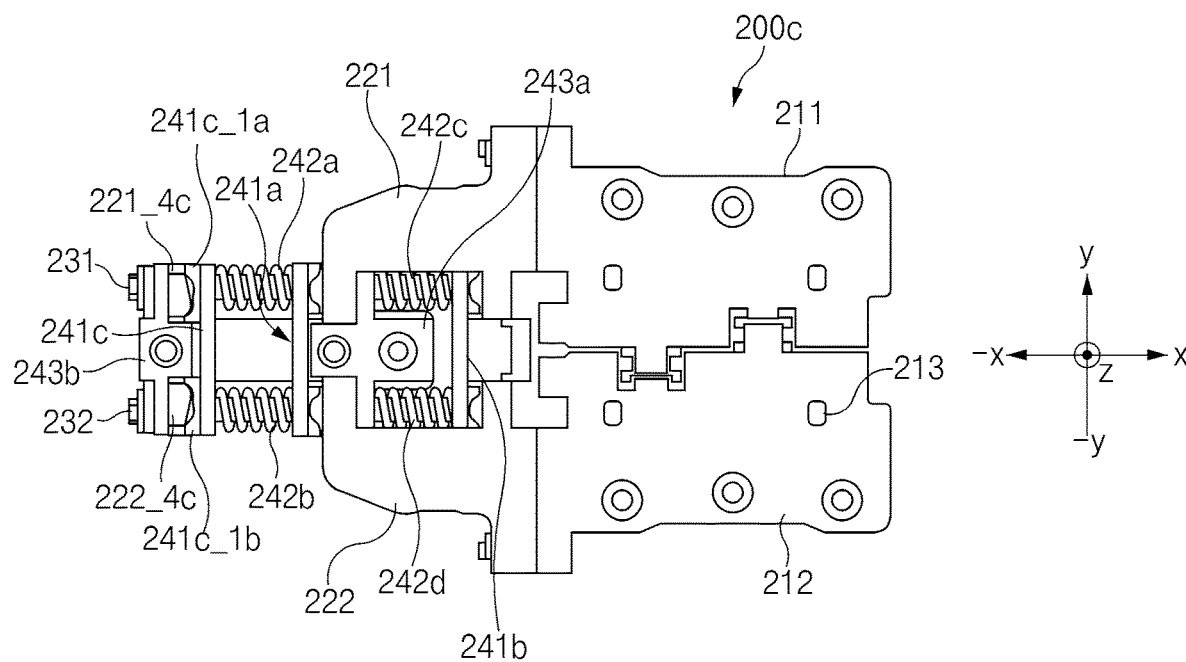
FIG. 18 is a diagram illustrating an example of another type of a third hinge structure according to an embodiment of the disclosure.
Figure 19:
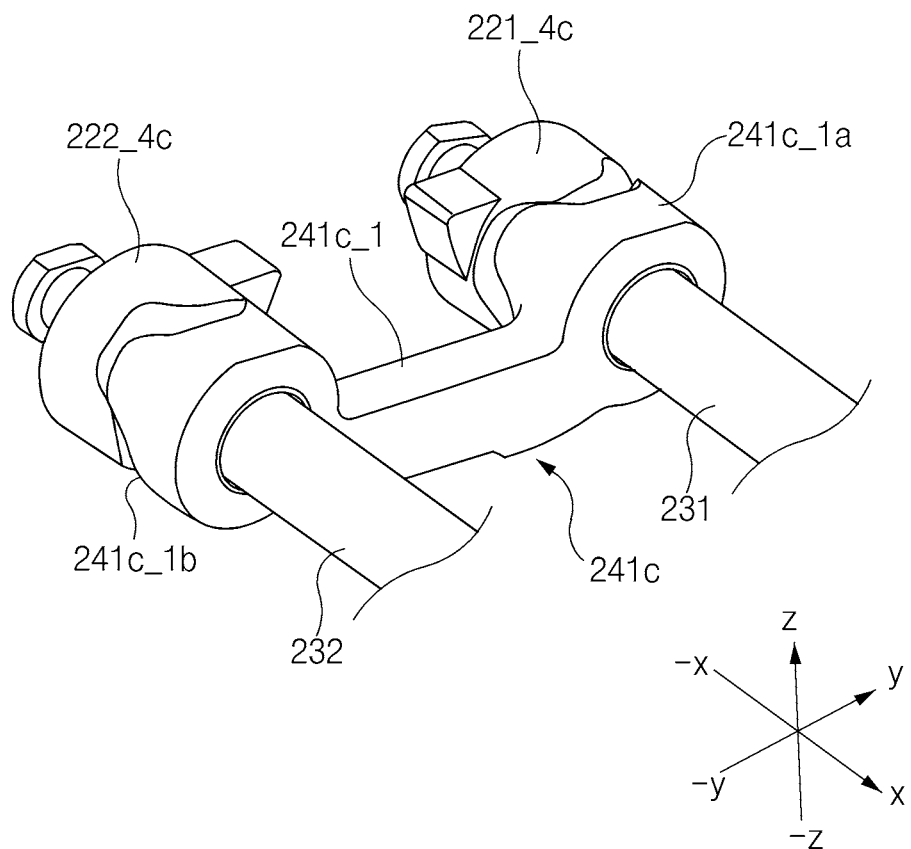
FIG. 19 is a perspective view in a first direction illustrating an example of a coupled state of a third cam member, a fifth cam structure, and a sixth cam structure according to an embodiment of the disclosure.

FIG. 18 is a diagram illustrating an example of another type of a third hinge structure according to an embodiment of the disclosure, FIG. 19 is a perspective view in a first direction illustrating an example of a coupled state of a third cam member, a fifth cam structure, and a sixth cam structure according to an embodiment of the disclosure.

Figure 20:
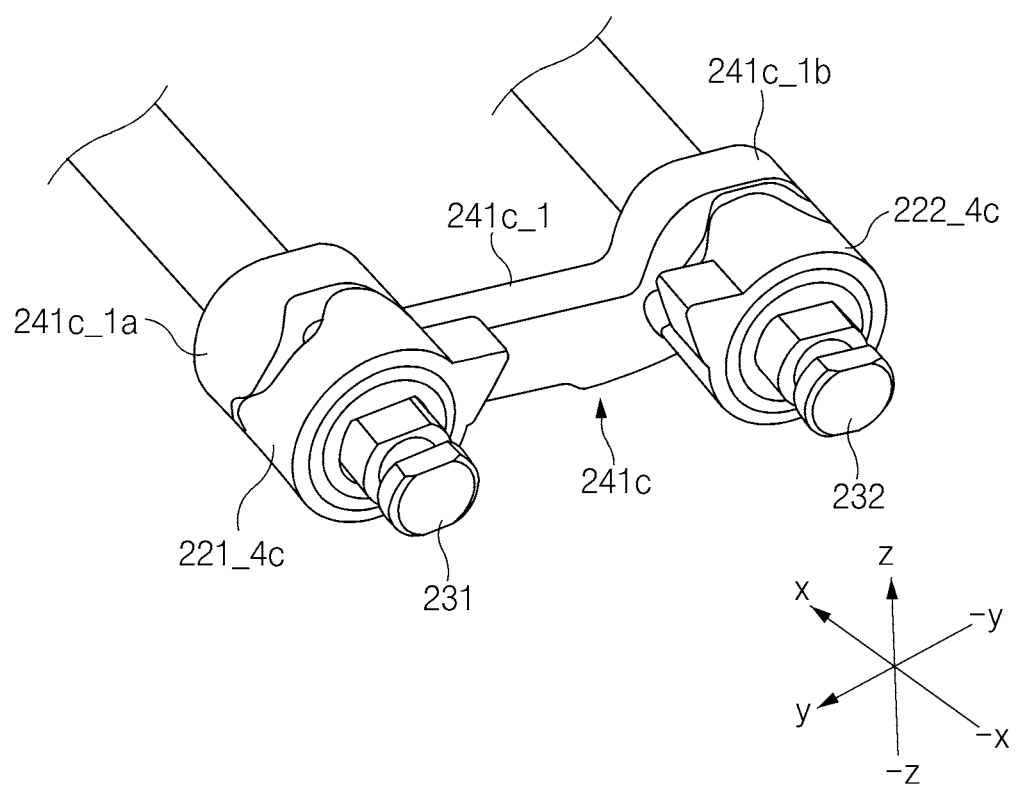
FIG. 20 is a perspective view in a second direction illustrating an example of a coupled state of the third cam member, the fifth cam structure, and the sixth cam structure according to an embodiment of the disclosure.

FIG. 20 is a perspective view in a second direction illustrating an example of a coupled state of the third cam member, the fifth cam structure, and the sixth cam structure according to an embodiment of the disclosure.

Figure 21:
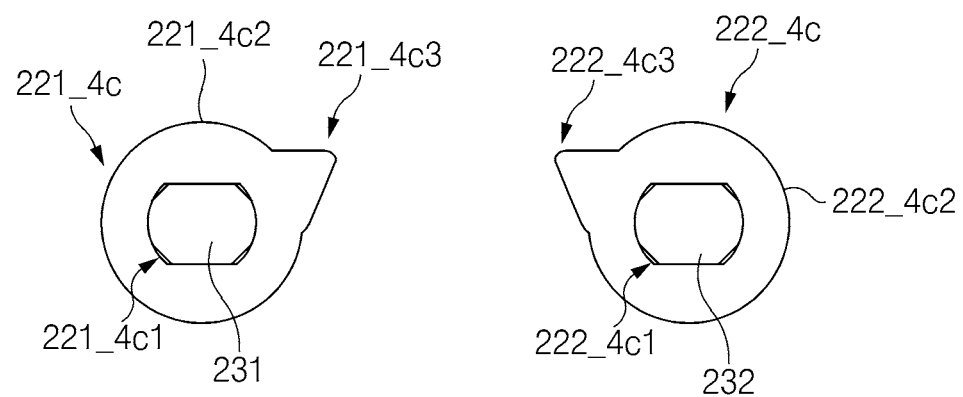
FIG. 21 is a diagram illustrating coupled states of the fifth cam structure and a first rotating shaft, and the sixth cam structure and a second rotating shaft according to an embodiment of the disclosure.

FIG. 21 is a diagram illustrating coupled states of the fifth cam structure and a first rotating shaft, and the sixth cam structure and a second rotating shaft according to an embodiment of the disclosure.

Before description, the third hinge structure may be disposed as a replacement for at least one of the first hinge structure 200a and the second hinge structure 200b described above with reference to FIG. 1A. Alternatively, the third hinge structure may be additionally disposed in the electronic device employing the first hinge structure 200a and the second hinge structure 200b. For example, based on FIG. 1A, a third hinge structure 200c may be further disposed between the first hinge structure 200a and the second hinge structure 200b.

Referring to FIGS. 1A to 1C, 3, 18, and 21, the third hinge structure 200c according to an embodiment of the disclosure may include the rotating parts 211 and 212, the fixing bracket 213, the arm parts 221 and 222, the first rotating shaft 231, the second rotating shaft 232, the first cam member 241a, the second cam member 241b, a third cam member 241c, the first elastic body 242a, the second elastic body 242b, the third elastic body 242c, the fourth elastic body 242d, a fifth cam structure 221_4c, a sixth cam structure 222_4c, the center bracket 243a, and the shaft bracket 243b. Additionally, the third hinge structure 200c may include the stopper 236, the rotating shaft support member 235, the idle gears 233 and 234, and the fastening parts (e.g., 251 and 252 in FIG. 3) connecting the arm parts 221 and 222 and the rotating parts 211 and 212, which are described in FIG. 3. In addition, fixing clips may be respectively inserted into an end of the first rotating shaft 231 in the −x-axis direction and an end of the second rotating shaft 232 in the −x-axis direction to fix the shaft bracket 243b such that the first rotating shaft 231 and the second rotating shaft 232 do not deviate in the −x-axis direction.

According to various embodiments of the disclosure, the third hinge structure 200c may have configurations as the same as or similar to those described with reference to FIG. 3, except for the fifth cam structure 221_4c, the sixth cam structure 222_4c, and the third cam member 241c. Accordingly, in the following, the third hinge structure 200c will be described based on the third cam member 241c, the fifth cam structure 221_4c, and the sixth cam structure 222_4c.

According to various embodiments of the disclosure, the third cam member 241c may include a cam body 241c_1, a fifth cam 241c_1a, and a sixth cam 241c_1b. The third cam member 241c may have the same shape and size as the first cam member 241a or the second cam member 241b described above, except for a disposition direction. The fifth cam 241c_1a and the sixth cam 241c_1b may have structures the same as or similar to those of the first cam 241a_1a and the second cam 241a_1b described in FIG. 12. For example, the fifth cam 241c_1a and the sixth cam 241c_1b may have holes in the center portions into which the first rotating shaft 231 and the second rotating shaft 232 are inserted, and a protruding structure including peaks and valleys in the −x-axis direction. The fifth cam 241c_1a may be disposed such that its peaks and valleys engage with the peaks and valleys of the fifth cam structure 221_4c faced therewith. Similarly, the sixth cam 241c_1b may be disposed such that its peaks and valleys engage with the peaks and valleys of the sixth cam structure 222_4c faced therewith. Holes formed in the center portions of the fifth cam 241c_1a and the sixth cam 241c_1b may be provided in a circular shape to maintain the disposed state regardless of the rotation of the first rotating shaft 231 and the second rotating shaft 232.

According to various embodiments of the disclosure, the fifth cam structure 221_4c may be disposed between the shaft bracket 243b and the fifth cam 241c_1a. The fifth cam structure 221_4c may include a first cam structure body 221_4c2, a third cam hole 221_4c1 that is formed in the center portion of the first cam structure body 221_4c2 and into which the first rotating shaft 231 is to be inserted, and a first support part 221_4c3 disposed on one side of the first cam structure body 221_4c2. The first cam structure body 221_4c2 may have an overall ring shape having a predetermined thickness. Peaks and valleys may be continuously arranged on one surface of the first cam structure body 221_4c2 in the x-axis direction, and one surface in the −x-axis direction may include at least partially a flat surface. The size of the z-axis cross-section of the first cam structure body 221_4c2 (e.g., a cross-section cut in the direction from the z-axis to the −z-axis) may be similar to that of the z-axis cross-section (e.g., a cross-section cut in the direction from the z-axis to the −z-axis) of the third cam 241b_1a. The third cam hole 221_4c1 may be formed to be the same as or similar to at least a portion of a z-axis cross-section (e.g., a cross-section cut in the direction from the z-axis to the −z-axis) of the first rotating shaft 231. For example, the third cam hole 221_4c1 may include sections corresponding to the curved section and the straight section of the first rotating shaft 231. Accordingly, when the first rotating shaft 231 rotates, the fifth cam structure 221_4c may rotate in response to the rotation of the first rotating shaft 231. The fifth cam structure 221_4c may perform the detent operation based on the elastic force applied from the first elastic body 242a and the fifth cam 241c_1a in a state of being engaged with the fifth cam 241c_1a while the first rotating shaft 231 is rotating. For example, the first elastic body 242a may exert an elastic force in the −x-axis direction, and the elastic force may be used to press the fifth cam 241c_1a and the fifth cam structure 221_4c in the coupled state. In this operation, if the rotation of the first rotating shaft 231 occurs, the fifth cam structure 221_4c may rotate with the rotation of the first rotating shaft 231, and the detent operation may be performed while the peaks and valleys of the fifth cam structure 221_4c move out of alignment with the peaks and valleys of the fifth cam 241c_1a. The first support part 221_4c3 may protrude from one side of the first cam structure body 221_4c2 in the −y-axis direction and may have a shape (e.g., a triangular or cone-shaped cross-section) in which the size of a cross-section (e.g., m a cross-section cut in the direction from the z-axis to the −z-axis) gradually decreases as the distance from the first cam structure body 221_4c2 increases. At least a portion of the upper surface of the first support part 221_4c3 with respect to the z-axis may be formed to be flat. The first support part 221_4c3 may support, for example, the center bar 243c described in FIG. 3. If the fifth cam structure 221_4c is applied, the support rings described in FIG. 3 may be omitted.

According to various embodiments of the disclosure, like the fifth cam structure 221_4c, the sixth cam structure 222_4c may include a second cam structure body 222_4c2, a fourth cam hole 222_4c1 into which the second rotating shaft 232 is to be inserted, and a second support part 222_4c3. The second cam structure body 222_4c2 may have a configuration the same as or similar to that of the first cam structure body 221_4c2 of the fifth cam structure 221_4c described above, where the fourth cam hole 222_4c1 may correspond to the third cam hole 221_4c1, and the second support part 222_4c3 may correspond to the first support part 221_4c3 described above. The sixth cam structure 222_4c described above may rotate in response to the rotation of the second rotating shaft 232.

According to various embodiments of the disclosure, the third hinge structure 200c having the above-described structure may provide the hinge force (or detent feeling) due to the elasticity by the first elastic body 242a while rotating such that the peaks and valleys of the fifth cam 241c_1a engage with or deviate from the peaks and valleys of the fifth cam structure 221_4c in response to the rotation of at least one of the first rotating part 211 and the second rotating part 212. In addition, the third hinge structure 200c having the above-described structure may provide the detent feeling due to the elasticity by the second elastic body 242b while rotating such that the peaks and valleys of the sixth cam 241c_1b engage with or deviate from the peaks and valleys of the sixth cam structure 222_4c in response to the rotation of at least one of the first rotating part 211 and the second rotating part 212. Additionally, in a state in which the first cam structure 221_4a disposed on the first arm part 221 is disposed to engage with the first cam 241a_1a of the first cam member 241a, the third hinge structure 200c performs the cam motion with the rotation of the first rotating shaft 231, and in a state in which the second cam structure 221_4b disposed on the first arm part 221 is disposed to engage with the third cam 241b_1a of the second cam member 241b, the third hinge structure 200c performs the cam motion with the rotation of the first rotating shaft 231. Additionally, in a state in which the third cam structure 222_4a disposed on the second arm part 222 is disposed to engage with the second cam 241a_1b of the first cam member 241a, the third hinge structure 200c performs the cam motion with the rotation of the second rotating shaft 232, and in a state in which the fourth cam structure 222_4b disposed on the second arm part 222 is disposed to engage with the fourth cam 241b_1b of the second cam member 241b, the third hinge structure 200c performs the cam motion with the rotation of the second rotating shaft 232. As described above, in the third hinge structure 200c according to an embodiment of the disclosure, a plurality of (e.g., six) cams disposed on the third cam member engage with the cam structures, distributing pressure as well as providing a more robust detent operation, thereby making it possible to reduce wear of the cams and cam structures.

Figure 22:
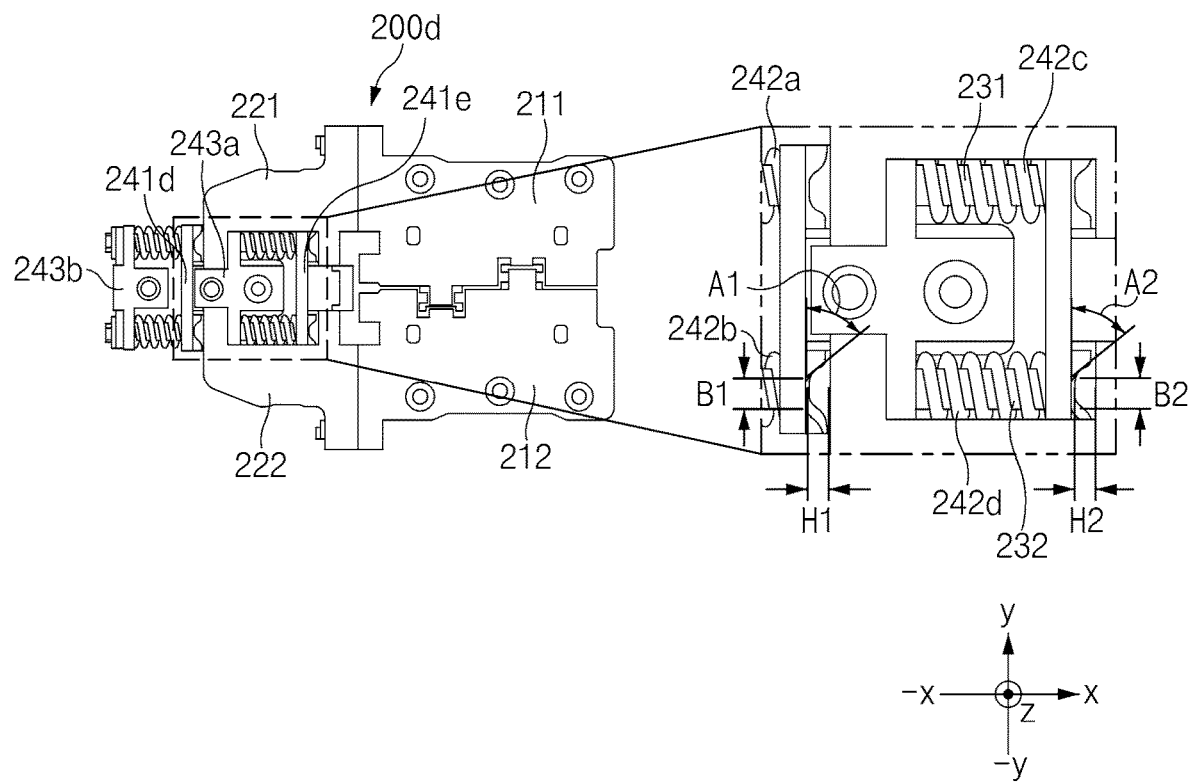
FIG. 22 is a diagram illustrating an example of a fourth hinge structure according to an embodiment of the disclosure.

FIG. 22 is a diagram illustrating an example of a fourth hinge structure according to an embodiment of the disclosure.

Figure 23:
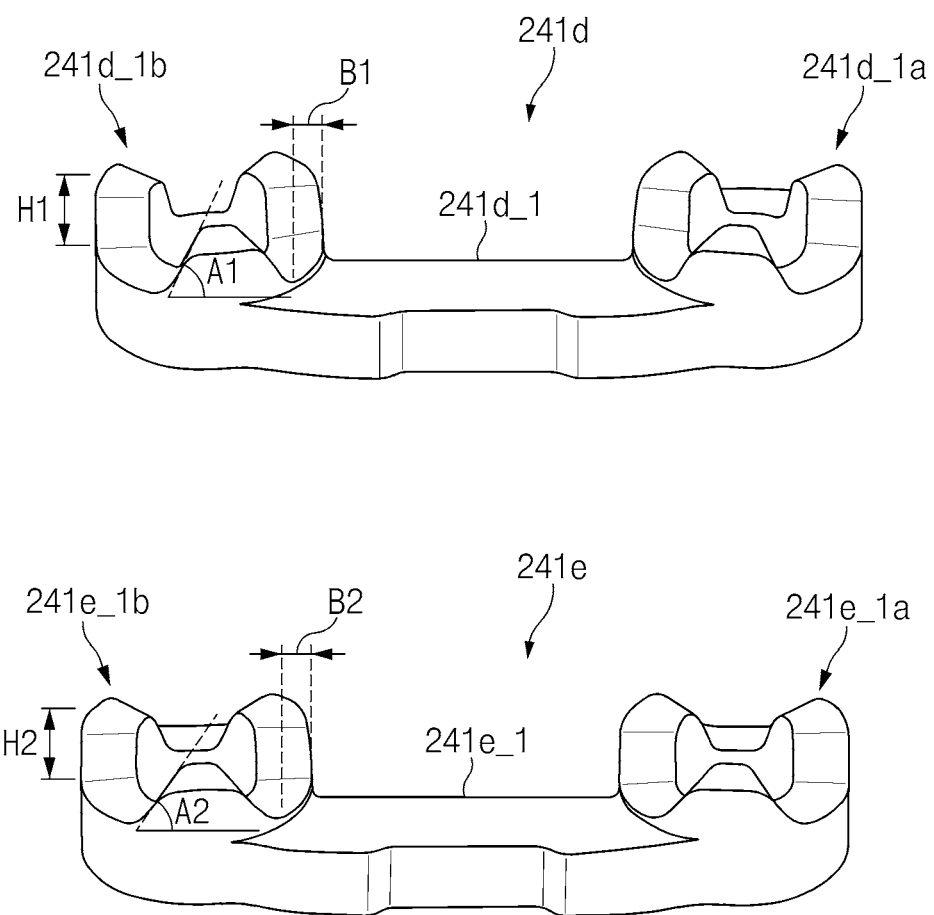
FIG. 23 is a diagram illustrating in more detail a fourth cam member and a fifth cam member illustrated in FIG. 22 according to an embodiment of the disclosure.

FIG. 23 is a diagram illustrating in more detail the fourth cam member and the fifth cam member illustrated in FIG. 22 according to an embodiment of the disclosure.

Figure 24:
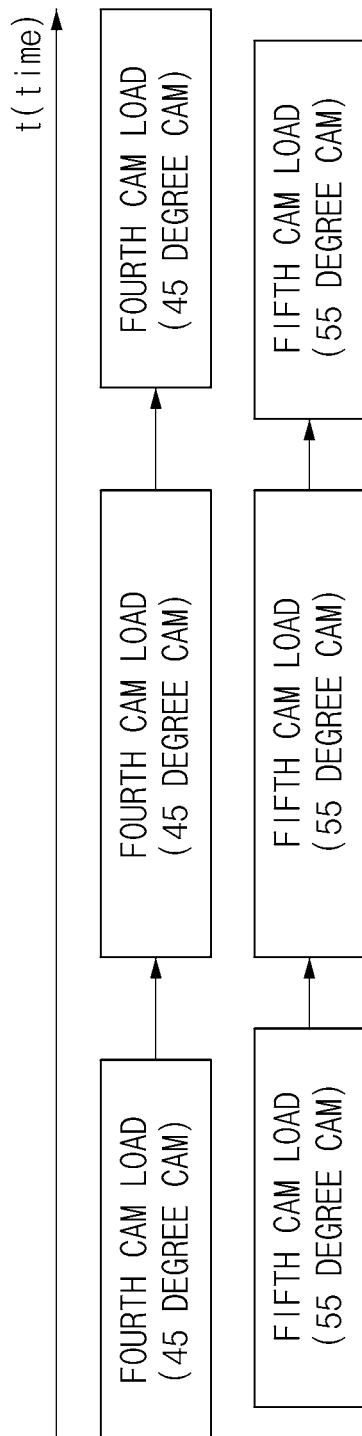
FIG. 24 is a diagram illustrating a point of time of cam motion of the fourth cam member and the fifth cam member according to an embodiment of the disclosure.

FIG. 24 is a diagram illustrating a point of time of cam motion of the fourth cam member and the fifth cam member according to an embodiment of the disclosure.

Referring to FIGS. 1A to 1C, 3, 22, and 23, a fourth hinge structure 200d according to an embodiment of the disclosure may include the first rotating part 211, the second rotating part 212, the first arm part 221, the second arm part 222, a fourth cam member 241d, a fifth cam member 241e, the center bracket 243a, the shaft bracket 243b, the first rotating shaft 231, the second rotating shaft 232, the first elastic body 242a, the second elastic body 242b, the third elastic body 242c, and the fourth elastic body 242d. In the above-described structure, except for the fourth cam member 241d and the fifth cam member 241e, the remaining configurations may be the same as or similar to the configurations described in FIG. 3 above.

According to various embodiments of the disclosure, the fourth cam member 241d may include a cam body 241d_1, a seventh cam 241d_1a, and an eighth cam 241d_1b. In the seventh cam 241d_1a, for example, three peaks and three valleys may be alternately arranged with each other, and similarly, in the eighth cam 241d_1b, three peaks and three valleys may be alternately arranged with each other. A cam hole into which the first rotating shaft 231 is to be inserted may be formed in the center portion of the seventh cam 241d_1a, and a cam hole into which the second rotating shaft 232 is to be inserted may also be formed in the center portion of the eighth cam. The slope of the peaks in the seventh cam 241d_1a and the eighth cam 241d_1b may form a first angle A1 to a horizontal axis (e.g., the y-axis), and the height of the peaks may be a first height H1. According to various embodiments of the disclosure, a flat width of the valleys (or a flat width of the peaks) of the seventh cams 241d_1a and the eighth cams 241d_1b may be a first width B1.

According to various embodiments of the disclosure, the fifth cam member 241e may include a cam body 241e_1, a ninth cam 241e_1a, and a tenth cam 241e_1b. In the ninth cam 241e_1a, for example, three peaks and three valleys may be alternately arranged with each other, and similarly, in the tenth cam 241e_1b, three peaks and three valleys may be alternately arranged with each other. A cam hole into which the first rotating shaft 231 is to be inserted may be formed in the center portion of the ninth cam 241e_1a, and a cam hole into which the second rotating shaft 232 is to be inserted may also be formed in the center portion of the tenth cam 241e_1b. The slope of the peaks in the ninth cam 241e_1a and the tenth cam 241e_1b may form a second angle A2 to a horizontal axis (e.g., the y-axis), and the height of the peaks may be a second height H2. According to various embodiments of the disclosure, a flat width of the valleys (or a flat width of the peaks) of the ninth cams 241e_1a and the tenth cams 241e_1b may be a second width B2. According to an embodiment of the disclosure, at least one of the first height H1 and the second height H2, the first angle A1 and the second angle A2, and the first width B1 and the second width B2 may be designed differently. For example, a design may be produced such that the first height H1 is different from the second height H2 and the first angle A1 and the second angle A2 and the first width B1 and the second width B2 are the same. Alternatively, a design may be produced such that the first angle A1 (e.g., 45 degrees) is different from the second angle A2 (e.g., 55 degrees) and the first height H1 and the second height H2 and the first width B1 and the second width B2 are the same.

Referring to FIG. 24, in the fourth hinge structure 200d having the structure described above, the fourth cam member 241d and the fifth cam member 241e are formed differently, and thus while the first rotating part 211 and the second rotating part 212 are rotating, a point of time at which the fourth cam member 241d and the cam structures reach the apex (e.g., peak point) or the size of the contact area of the peaks (e.g., the point of time at which a peak contact a peak, or the size of the surface where the peak of the fourth cam member 241d contacts the peak of the cam structure) may be different from a point of time at which the fifth cam member 241e and the cam structures reach the apex or the size of the contact area of the peaks. For example, the slopes of the peaks formed on the fourth cam member 241d may be brought into contact with the slopes of the peaks of the cam structures (e.g., the cam structures of the first arm part 221 and the second arm part 222) relatively earlier compared to the fifth cam member 241e, and then the slopes of the peaks of the fifth cam member 241e may be brought into contact with the slopes of the peaks of other cam structures of the first arm part 221 and the second arm part 222. If the start of peak points of the fourth cam member 241d and the fifth cam member 241e is the same and the flat regions of the peaks of the fourth cam member 241d and the fifth cam member 241e are the same, the sections in which the peak points are formed may be the same. If the first rotating part 211 and the second rotating part 212 continue to rotate, the departure of the peak point of the fifth cam member 241e may start first, and then the departure of the peak point of the fourth cam member 241d may begin.

According to various embodiments of the disclosure, in the fourth cam member 241d, the angle A1 of the seventh cam 241d_1a and the eighth cam 241d_1b may be set to be 45 degrees and the height H1 of the seventh cam 241d_1a and the eighth cam 241d_1b may be set to be 0.8 mm, and in the fifth cam member 241e, the angle A2 of the ninth cam 241e_1a and the tenth cam 241e_1b may be set to be 55 degrees and the height H2 of the ninth cam 241e_1a and the tenth cam 241e_1b may be set to be 0.8 mm. Since the height H1 of the seventh cam 241d_1a and the eighth cam 241d_1b and the height H2 of the ninth cam 241e_1a and the tenth cam 241e_1b are the same and the angle A1 of the seventh cam 241d_1a and the eighth cam 241d_1b and the angle A2 of the ninth cam 241e_1a and the tenth cam 241e_1b are different, a length difference may occur between a plane length B1 of the seventh cam 241d_1a and the eighth cam 241d_1b and a plane length B2 of the ninth cam 241e_1a and the tenth cam 241e_1b. At the starting point of the cam operation of the electronic device 100, a difference between points of time when the cam operations of the fourth cam member 241d and the fifth cam member 241e start may occur, which may be caused by the difference in the plane lengths of the cams 241d_1a, 241d_1b, 241e_1a, and the 241e_1b. Accordingly, springs of the ninth cam 241e_1a and the tenth cam 241e_1b are released from the maximum compression state, and then springs of the seventh cam 241d_1a and the eighth cam 241d_1b are released from the maximum compression state. In addition, since the heights H1 and H2 are the same at the cam operation completion point of the fourth cam member 241d and the fifth cam member 241e, the springs of the seventh cam 241d_1a, the eighth cam 241d_1b, the ninth cam 241e_1a, and the tenth cam 241e_1b are operated in the same compression state. Through the operation of this process, the hinge force (or detent load) is increased and the load at the starting point of the operation is distributed, and thus it is possible to give a smooth feeling of operation.

As described above, in the fourth hinge structure 200d according to an embodiment of the disclosure, the peak points of cam motions occurring while the first rotating part 211 and the second rotating part 212 are rotating are formed differently from each other, and thus it is possible to provide a softer hinge force (or detent feeling).

Figure 25:
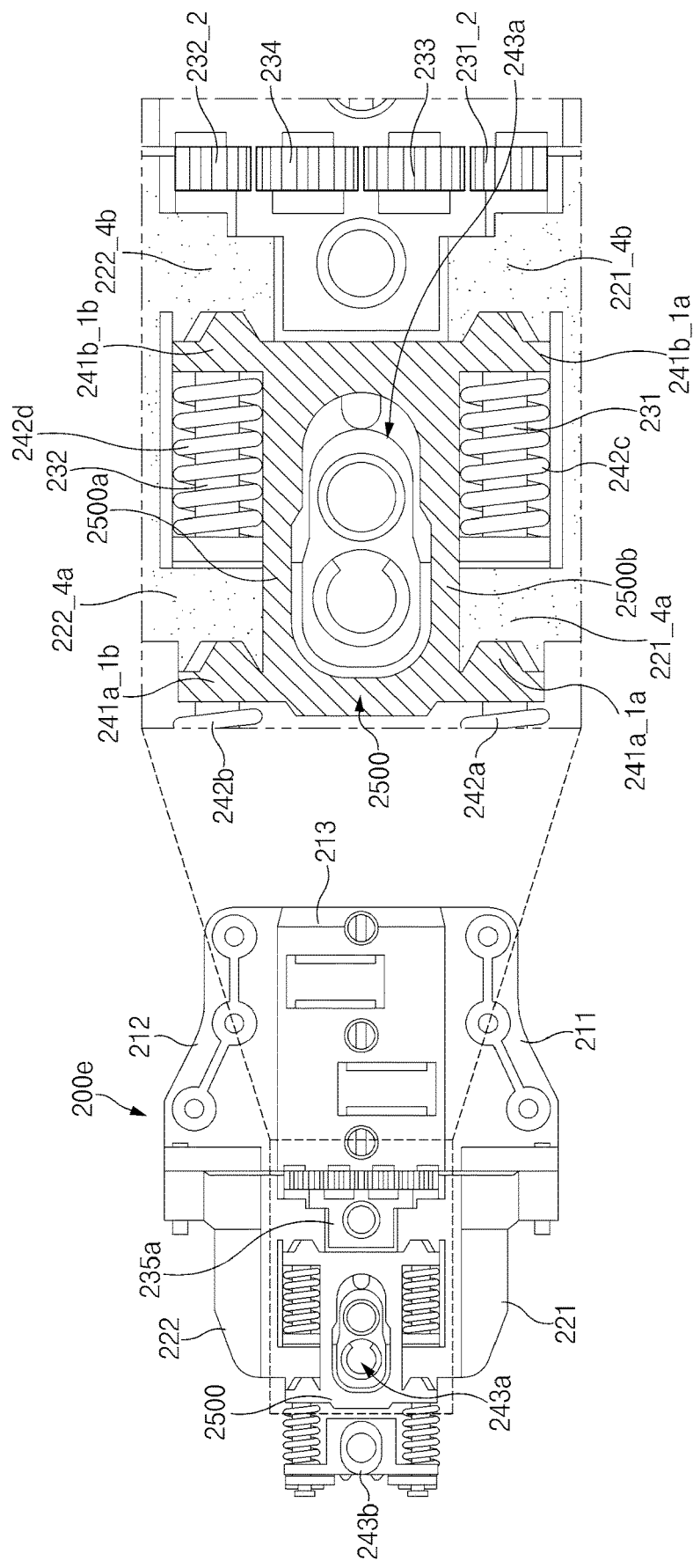
FIG. 25 is a diagram illustrating an example of a fifth hinge structure according to an embodiment of the disclosure.

FIG. 25 is a diagram illustrating an example of a fifth hinge structure according to an embodiment of the disclosure.

Referring to FIGS. 3, 4, and 25, a fifth hinge structure 200e may include the rotating parts 211 and 212, the fixing bracket 213, the arm parts 221 and 222, the idle gears 233 and 234, the first rotating shaft 231, the second rotating shaft 232, a rotating shaft support member 235a, an integrated cam member 2500, the center bracket 243a, the shaft bracket 243b, a plurality of elastic bodies 242a, 242b, 242c, and 242d. In addition, as described above in FIG. 3, the fifth hinge structure 200e may further include fastening parts connecting the arm parts 221 and 222 and the rotating parts 211 and 212, and a plurality of fixing clips for fixing the fastening parts and the first rotating shaft 231 and the second rotating shaft 232. In the above-described structure, except for the integrated cam member 2500, the remaining configurations may be the same as or similar to the configurations described in FIGS. 3 and 4 above.

According to various embodiments of the disclosure, the integrated cam member 2500 may further include the first cam 241a_1a disposed to engage with the first cam structure 221_4a formed on the first arm part 221, the second cam 241a_1b disposed to engage with the third cam structure 222_4a formed on the second arm part 222, the third cam 241b_1a disposed to engage with the second cam structure 221_4b formed on the first arm part 221, the fourth cam 241b_1b disposed to engage with the fourth cam structure 222_4b formed on the second arm part 222, and bridges 2500a and 2500b for connecting the first cam 241a_1a, the second cam 241a_1b, the third cam 241b_1a, and the fourth cam 241b_1b. The integrated cam member 2500 may be described as a configuration in which the first cam member 241a and the second cam member 241b, which have been described above in FIG. 3, and bridges 2500a and 2500b for connecting one side of the first cam member 241a and one side of the second cam member 241b are further included. The bridges 2500a and 2500b may include a first portion 2500b for connecting one side of the first cam 241a_1a and one side of the third cam 241b_1a, and a second portion 2500a for connecting one side of the second cam 241a_1b and one side of the fourth cam 241b_1b. Holes may be formed in the center portion of the bridges 2500a and 2500b such that the center bracket 243a may be exposed to the outside. The hole formed in the center bracket 243a and the boss disposed in the hinge housing 150 may be coupled through the holes formed in the center portion of the bridges 2500a and 2500b.

According to various embodiments of the disclosure, the four cams 241a_1b, 241a_1a, 241b_1b, and 241b_1a are fixed by the bridges 2500a and 2500b (or the first portion 2500a and the second portion 2500b and cam bodies), the fifth hinge structure 200e having the structure as described above may be more rigidly fixed while the first rotating shaft 231 and the second rotating shaft 232 are rotating. Accordingly, the cam structures 221_4a, 221_4b, 222_4a, and 222_4b disposed on the first arm part 221 and the second arm part 222 may perform the cam motion more stably without distortion (distortion due to cam motions between cams and cam structures occurring differently for each position), through the integrated cam member 2500 fixed more rigidly. For example, the electronic device 100 described above may increase the detent load only by adding the spring without increasing the number of cam components, which makes it possible to reduce the number of components, reduce management items related to cams, and reduce the cost of components related to cams.

Figure 26:
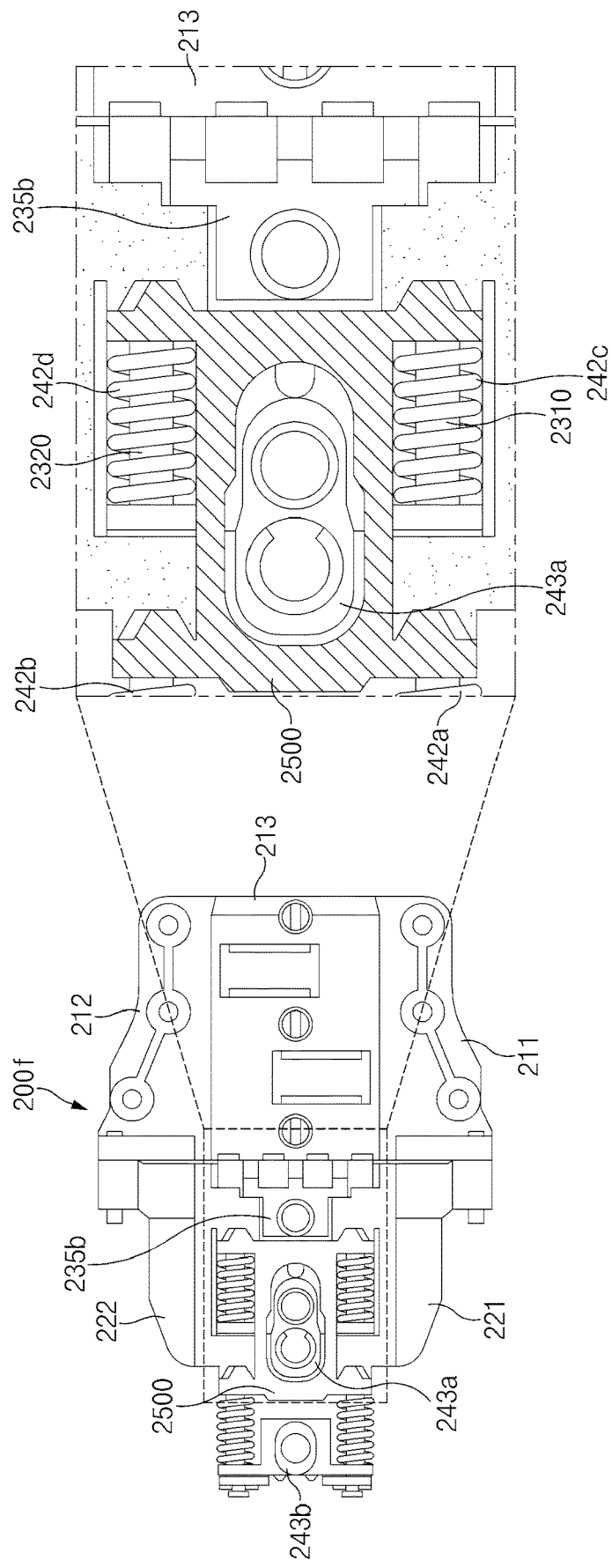
FIG. 26 is a diagram illustrating an example of a sixth hinge structure according to an embodiment of the disclosure.

FIG. 26 is a diagram illustrating an example of a sixth hinge structure according to an embodiment of the disclosure.

Referring to FIGS. 25 and 26, a sixth hinge structure 200f may include the rotating parts 211 and 212, the fixing bracket 213, the arm parts 221 and 222, a first rotating shaft 2310, a second rotating shaft 2320, a rotating shaft support member 235b, the integrated cam member 2500, the center bracket 243a, the shaft bracket 243b, and a plurality of elastic bodies 242a, 242b, 242c, and 242d. In addition, as described above in FIG. 25, the sixth hinge structure 200f may further include fastening parts connecting the arm parts 221 and 222 and the rotating parts 211 and 212, and a plurality of fixing clips for fixing the fastening parts and the first rotating shaft 2310 and the second rotating shaft 2320. The sixth hinge structure 200f may have the same or similar shape compared with the fifth hinge structure 200e of FIG. 25, except for the gear structure. For example, in the sixth hinge structure 200f, the idle gears 233 and 234 and the shaft gear, which have been disposed on the fifth hinge structure 200e, may be removed. According to various embodiments of the disclosure, in the sixth hinge structure 200f, the first rotating shaft 2310 and the second rotating shaft 2320 may have a shape in which the shaft gear 232_2 described in FIG. 8 is removed. The rotating shaft support member 235b may serve to support the first rotating shaft 2310 and the second rotating shaft 2320 so as not to deviate from the fixing bracket 213.

According to various embodiments of the disclosure, the sixth hinge structure 200f having the structure as described above may provide a stable folded or unfolded state of the electronic device 100 even without employing the separate gear structure (e.g., idle gears and a gear unit disposed on the rotating shaft). For example, in the sixth hinge structure 200f based on the integrated cam member 2500, distortion (e.g., distortion between the first rotating part 211 and the first arm part 221 and the second rotating part 212 and the second arm part 222) does not occur even if the first rotating part 211 and the first arm part 221 and the second rotating part 212 and the second arm part 222 rotate separately, which makes it possible to stably provide folding, unfolding at a specified angle, and an unfolded state. When the cam in contact with the arm part to rotate moves, it moves all the cams backwards, and the cam in contact with the fixed arm is also moved to the rear without distortion, accordingly.

Figure 27A:
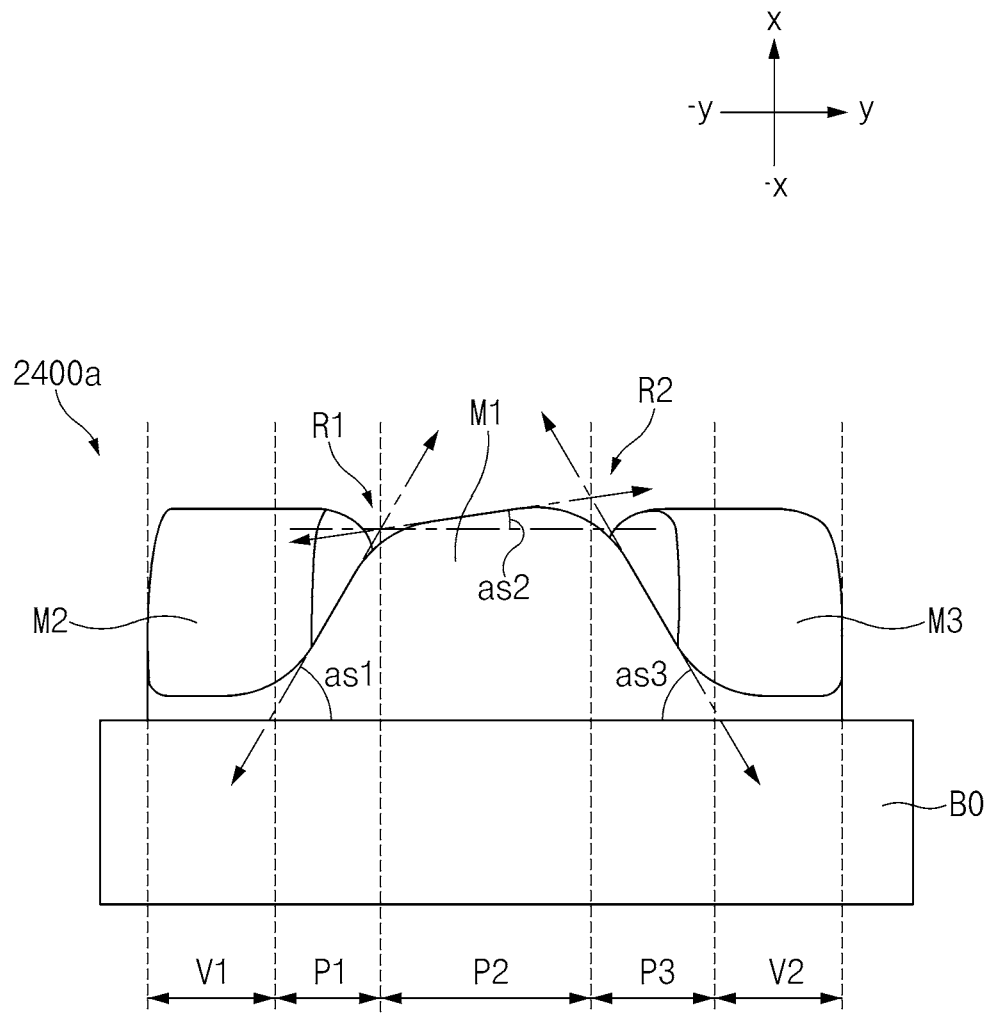
FIG. 27A is a diagram illustrating another example of a cam shape according to an embodiment of the disclosure.

FIG. 27A is a diagram illustrating another example of a cam shape according to an embodiment of the disclosure.

Figure 27B:
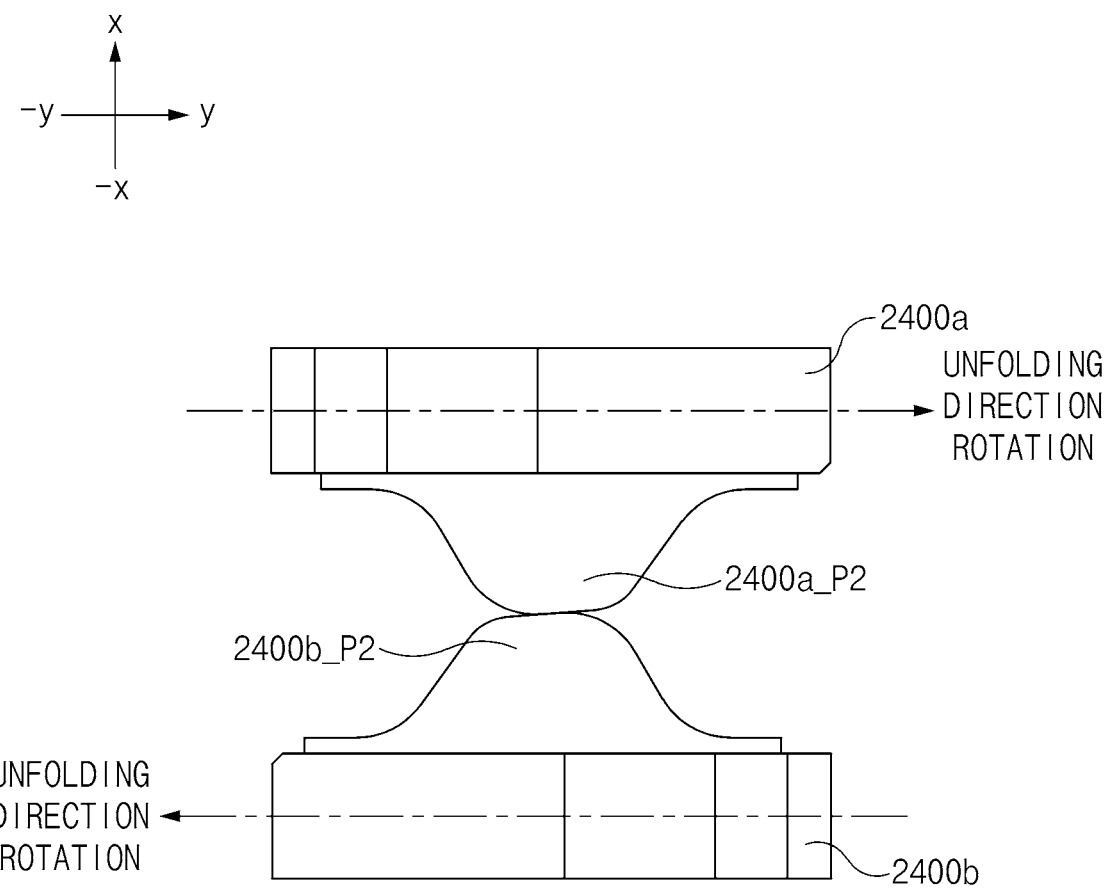
FIG. 27B is a diagram illustrating an example of a contact state of some peaks of a cam and a cam structure according to an embodiment of the disclosure.

FIG. 27B is a diagram illustrating an example of a contact state of some peaks of a cam and a cam structure according to an embodiment of the disclosure.

Before description, a cam 2400a according to an embodiment of the disclosure may be applied to at least one of the cams or cam structures described with reference to FIGS. 2 to 26.

Referring to FIG. 27A, the cam 2400a (or cam structure) according to an embodiment of the disclosure may include a cam support part B0, a plurality of peaks M1, M2, and M3, and a plurality of valleys V1 and V2. In the illustrated drawing, the cam 2400a including three peaks M1, M2, and M3 and three valleys V1 and V2 (a valley covered by the first peak M1 not shown) is presented; however, the disclosure is not limited thereto. For example, the cam 2400a may have a structure including two or more peaks and valleys. All of the plurality of peaks M1, M2, and M3 may have the same structure. Alternatively, at least one of the plurality of peaks M1, M2, and M3 may have a different shape from other peaks. For example, at least one peak may have a structure in which a second portion P2 corresponding to the center of the peak has a certain inclination angle (inclination angle greater than 0 degrees, for example, about 5 degrees), as illustrated, and at least one of the remaining peaks may have a structure in which the central part of the peak is flat.

According to an embodiment of the disclosure, as illustrated, at least one of the plurality of peaks M1, M2, and M3, for example, the first peak M1 may include a first portion P1 having a first inclination angle as1, the second portion P2 having a second inclination angle as2, and a third portion P3 having a third inclination angle as3. One side of the first portion P1 (e.g., the end of the −y-axis) may be disposed to be connected to one side of the first valley V1 (e.g., the end of the y-axis), and the other side of the first portion P1 (e.g., the end of the y-axis) may be disposed to be connected to one side (e.g., the end of the −y-axis) of the second portion P2. The first portion P1 may be a ridge having the first inclination angle as1 with respect to the y-axis. The first inclination angle as1 may include an acute angle smaller than 90 degrees in a direction from the −y-axis to the y axis, with respect to the x-axis.

One side of the second portion P2 (e.g., the end of the −y-axis) may be disposed to be connected to the other side of the first portion P1 (e.g., the end of the y-axis), and the other side of the second portion P2 (e.g., the end of the y-axis) may be disposed to be connected to one side (e.g., the end of the −y-axis) of the third portion P3. The second portion P2 may be disposed to protrude further along the x-axis than the first portion P1 and the third portion P3. A boundary region between the first portion P1 and the second portion P2 may be rounded at a designated first curvature R1. The second portion P2 may have the second inclination angle as2 with respect to the y-axis. The second inclination angle as2 may include an acute angle smaller than 90 degrees in the direction from the −y-axis to the y-axis with respect to the x-axis, and the absolute value of the second inclination angle as2 may be smaller than the absolute value of the first inclination angle as1.

One side of the third portion P3 (e.g., the end of the −y-axis) may be disposed to be connected to the other side of the second portion P2 (e.g., the end of the y-axis), and the other side of the third portion P3 (e.g., the end of the y-axis) may be disposed to be connected to one side (e.g., the end of the −y-axis) of the second valley V2. The third portion P3 may be formed to have a predetermined inclination inclined toward the y-axis in the second portion P2. A boundary region between the second portion P2 and the third portion P3 may be rounded at a designated second curvature R2. The second curvature R2 may have a value smaller than the first curvature R1 (e.g., the first curvature R1 is smoother than the second curvature R2). The third portion P3 may have the third inclination angle as3 with respect to the −y-axis. The third inclination angle as3 may include an acute angle smaller than 90 degrees in a direction from the y-axis to the −y-axis with respect to the x-axis, and the absolute value of the third inclination angle as3 may be greater than the absolute value of the second inclination angle as2. According to various embodiments of the disclosure, the absolute value of the third inclination angle as3 may be equal to or greater than the absolute value of the first inclination angle as1.

Referring to FIG. 27B, the cam shape described in FIG. 27A may be applied to at least one cam or at least one cam structure described above in FIGS. 2 to 26. For example, in the illustrated drawing, the protrusion of the cam 2400a may be disposed to protrude in a direction from the x-axis to the −x-axis, and the protrusion of the cam structure 2400b may be disposed to protrude in a direction from the −x-axis to the x-axis. Alternatively, the uneven portion of the cam 2400a and the uneven portion of the cam structure 2400b may be disposed to face each other. At least a portion of a second portion 2400a_P2 of the cam 2400a and at least a portion of a second portion 2400b_P2 of the cam structure 2400b may be brought into contact with each other as illustrated during a free-stop section (a section of getting held in a specified angular range by friction between the cam 2400a and the cam structure 2400b) of an electronic device (e.g., electronic device 100 of FIG. 2). According to an embodiment of the disclosure, when the electronic device has the free-stop state described in FIG. 15 or FIG. 16, a display (display 160 of FIG. 1A or FIG. 2) may exert a repulsive force for restoring the electronic device to the unfolded state (the state of FIG. 14).

According to one embodiment of the disclosure, the cam 2400a may be pushed in the y-axis direction by the restoring force of the display (e.g., the repulsive force of the display acts in the counterclockwise direction), and the cam structure 2400b may be pushed in the −y-axis direction by the restoring force of the display (e.g., the repulsive force of the display acts in the clockwise direction). In this process, since the second portion 2400a_P2 of the cam 2400a and the second portion 2400b_P2 of the cam structure 2400b come into contact with each other at the second inclination angle as2 described above, the cam 2400a and the cam structure 2400b according to the disclosure at least partially cancels the repulsive force (or restoring force) generated in the unfolding direction of the display, which makes it possible to suppress the push in the free-stop state that may occur regardless of the intention of the user (e.g., the angle between the first housing (e.g., the first housing 110 in FIGS. 1A to 1C or FIG. 2) and the second housing (e.g., the second housing 120 in FIGS. 1A to 1C or FIG. 2) is changed). According to various embodiments of the disclosure, as illustrated in FIG. 15 or FIG. 16, the electronic device may have a holding state (or a free-stop state) at a specific angle. In this case, in the electronic device, the cam 2400a and the cam structure 2400b may be arranged to engage with each other as illustrated, which makes it to cancel a force acting for the unfolded state as illustrated in FIG. 14, such as the repulsive force or the restoring force of the display. In FIG. 27B, both the cam 2400a and the cam structure 2400b are illustrated as having a structure in which the top portion of the peak has the second inclination angle as2; however, the disclosure is not limited thereto. For example, the second portion P2 having the second inclination angle as2 may be formed only on either the cam 2400a or the cam structure 2400b.

With respect to the unfolding direction rotation, in FIG. 27B, the cam 2400a has been described based on the direction in which the cam 2400a rotates from the −y-axis (or left) to the y-axis (or right); however, the disclosure is limited thereto. For example, the direction in which the cam 2400a rotates from the direction from the y-axis to the −y-axis according to the design style of the electronic device may be a direction in which the display is operated from the folded state to the unfolded state.

According to various embodiments of the disclosure, an electronic device (or portable electronic device, portable communication device, foldable electronic device, foldable electronic device having a communication function, or the like) may include a housing including a first housing 110 and a second housing 120, hinge structures 200a and 200b accommodated in the housing and connected to the first housing and the second housing; and a flexible display 160 disposed over the first housing, the hinge structure (or hinge part, hinge unit, hinge module, hinge device, or the like) and the second housing. The hinge structure 200a may include a first rotating shaft 231 rotating about a first axis 11, a second rotating shaft 232 rotating about a second axis 12, a first arm part 221 including a first cam structure 221_4a and a second cam structure 221_4b connected to the first rotating shaft, a second arm part 222 including a third cam structure 222_4a and a fourth cam structure 222_4b connected to the second rotating shaft; a first rotating part 211 connected to the first arm part and rotating about a third axis 13, a second rotating part 212 connected to the second arm part and rotating about a fourth axis 14, a first cam member 241*a* including a first cam 241*a*_1*a* engaged with the first cam structure and a second cam 241*a*_1*b* engaged with the third cam structure, a second cam member 241*b* including a third cam 241*b*_1*a* engaged with the second cam structure and a fourth cam 241*b*_1*b* engaged with the fourth cam structure, a first elastic body 242*a* connected to the first rotating shaft to provide an elastic force to the first cam, a second elastic body 242*b* connected to the second rotating shaft to provide an elastic force to the second cam, a third elastic body 242*c* connected to the first rotating shaft to provide an elastic force to the third cam; and a fourth elastic body 242*d* connected to the second rotating shaft to provide an elastic force to the fourth cam.

According to various embodiments of the disclosure, the electronic device may further include a first fastening part 251 for fastening the first slide hole 211_2 formed in the first rotating part and the first arm part and a second fastening part 252 for fastening a second slide hole 212-2 formed in the second rotating part and the second arm part, and the first fastening part may slidably move within the first slide hole in response to rotation of the first arm part, and the second fastening part may slidably move within the second slide hole in response to rotation of the second arm part.

According to various embodiments of the disclosure, the third elastic body may be disposed between the first cam structure and the second cam structure, the fourth elastic body may be disposed between the third cam structure and the fourth cam structure, the first elastic body, the first cam, the first cam structure, the third elastic body, the third cam, and the second cam structure may be put on the first rotating shaft in this order, and the second elastic body, the second cam, the third cam structure, the fourth elastic body, the fourth cam, and the fourth cam structure may be put on the second rotating shaft in this order.

According to various embodiments of the disclosure, cross-sections of a hole of the first cam, a hole of the second cam, a hole of the third cam, and a hole of the fourth cam may be formed in a circular shape, and cross-sections of a hole of the first cam structure, a hole of the second cam structure, a hole of the third cam structure, and a hole of the fourth cam structure may at least partially have a straight section.

According to various embodiments of the disclosure, the electronic device may further include at least one of a shaft bracket put on the first rotating shaft and the second rotating shaft and supporting the first elastic body and the second elastic body, and a center bar disposed between the hinge structure and the display and supporting the display while moving up and down in a direction facing or opposite to the display in the hinge structure with an operation of the hinge structure.

According to various embodiments of the disclosure, a separation distance between the first axis and the second axis may be shorter than a separation distance between the third axis and the fourth axis.

According to various embodiments of the disclosure, the third axis and the fourth axis may be positioned below the first axis and the second axis in an upward direction facing the display in the hinge structure.

According to various embodiments of the disclosure, the first rotating part may include a first rail rotating along the third axis, the second rotating part may include a second rail rotating along the fourth axis, and the electronic device may further include at least one of a fixing bracket having a first guide groove corresponding to the first rail and a second guide groove corresponding to the second rail and a bracket cover covering one surface of the fixing bracket.

According to various embodiments of the disclosure, the electronic device may further include a fifth cam structure 221-4*c* fastened on the first rotating shaft, a sixth cam structure 222-4*c* fastened on the second rotating shaft, and a third cam member 241*c* including a fifth cam 241*c*_1*a* engaged with the fifth cam structure and receiving an elastic force by the first elastic body and a sixth cam 241*c*_b1 engaged with the sixth cam structure and receiving an elastic force by the second elastic body.

According to various embodiments of the disclosure, the fifth cam structure and the sixth cam structure may be separated and fastened to the first rotating shaft and the second rotating shaft, respectively.

According to various embodiments of the disclosure, at least a portion of a cross-section of a hole of the fifth cam structure and at least a portion of a cross-section of a hole of the sixth cam structure may include a straight section.

According to various embodiments of the disclosure, the fifth cam structure and the sixth cam structure may rotate with rotation of the first arm part and the second arm part.

According to various embodiments of the disclosure, the first elastic body may be disposed between the fifth cam structure and the first cam structure, and the second elastic body may be disposed between the sixth cam structure and the third cam structure.

According to various embodiments of the disclosure, a first angle of a peak formed on the first cam and a second angle of a peak formed on the third cam may be different from each other.

According to various embodiments of the disclosure, an angle of the peak formed on the first cam may be the same as an angle of a peak formed on the second cam, and an angle of the peak formed on the third cam may be the same as an angle of the peak formed on a fourth cam.

According to various embodiments of the disclosure, a first width of a valley formed on the first cam and a second width of a valley formed on the third cam may be different from each other, or a first height of a peak formed on the first cam and a second height of a peak formed on the third cam may be different from each other.

According to various embodiments of the disclosure, the electronic device may further include a bridge connecting the first cam member and the second cam member.

According to various embodiments of the disclosure, the bridge may include a first portion connecting the first cam and the third cam and a second portion connecting the second cam and the fourth cam.

According to various embodiments of the disclosure, a hinge structure used for a foldable electronic device may include a first rotating part 211 connected to a first housing of the foldable electronic device and rotating within a predetermined angular range, a second rotating part 212 connected to a second housing of the foldable electronic device and rotating with rotation of the first rotating part, a first arm part 221 connected to the first rotating part and including a first cam structure 221_4*a* and a second cam structure 221_4*b* spaced apart from each other by a predetermined interval, a second arm part 222 connected to the second rotating part and including a third cam structure 222_4*a* and a fourth cam structure 222_4*b* spaced apart from each other by a predetermined interval, a first rotating shaft 231 rotating about a first axis 11 with at least a portion thereof being inserted into the first cam structure and the second cam structure, a second rotating shaft 232 rotating about a second axis 12 with at least a portion thereof being inserted into the third cam structure and the fourth cam structure, a first cam member 241a put on the first rotating shaft and including a first cam 241a_1a engaged with the first cam structure and a second cam 241a_1b engaged with the third cam structure, a second cam member 241b put on the second rotating shaft and including a third cam 241b_1a engaged with the second cam structure and a fourth cam 241b_1b engaged with the fourth cam structure, a first elastic body 242a connected to the first rotating shaft to provide an elastic force to the first cam, a second elastic body 242b connected to the second rotating shaft to provide an elastic force to the second cam, a third elastic body 242c connected to the first rotating shaft to provide an elastic force to the third cam, and a fourth elastic body 242d connected to the second rotating shaft to provide an elastic force to the fourth cam, in which the first rotating part may rotate about a third axis 13 and the second rotating part may rotate about the fourth axis 14.

According to various embodiments of the disclosure, an arm body, an arm structure used for a foldable electronic device may include a first cam disposed on one side of the arm body and including a first hole into which at least a portion of a rotating shaft used for a folding operation of the foldable electronic device is inserted, a peak and a valley being formed around the first hole, a second cam arranged side-by-side on the same axis as the one side of the arm body, spaced apart from the first cam, and including a second hole into which at least a portion of the rotating shaft is inserted, a peak and a valley being formed around the second hole, and a connecting part disposed on the other side of the arm body and fastened with a rotating part used for rotation of the foldable electronic device.

According to various embodiments of the disclosure, at least one of the first cam or the second cam may include at least one peak and valley, and the peak may include a first portion having a first inclination angle, a second portion having a second inclination angle different from the first inclination angle and being greater than 0 degrees, and a third portion having a third inclination angle.

According to various embodiments of the disclosure, an absolute value of the first inclination angle of the first portion may be greater than an absolute value of the second inclination angle of the second portion.

According to various embodiments of the disclosure, a first curvature of a boundary region between the first portion and the second portion may be smaller than a second curvature of a boundary region between the second portion and the third portion.

According to various embodiments of the disclosure, an absolute value of the third inclination angle may be equal to or greater than the absolute value of the first inclination angle.

According to various embodiments of the disclosure, in the arm structure, a height of the peak and a flat width of the peak are based on the first inclination angle, the second inclination angle, and the third inclination angle.

According to various embodiments of the disclosure, in the arm structure, a height of the peak, a flat width of the peak, the first inclination angle, the second inclination angle, and the third inclination angle are configured to provide a detent load of the foldable electronic device.

Each component (e.g., module or program) according to various embodiments may be made up of a singular or a plurality of entities, and some of the aforementioned sub-components may be omitted, or other sub-components may be further included in various embodiments. Alternatively or additionally, some components (e.g., modules or programs) may be integrated into one entity, performing the same or similar functions performed by respective corresponding components before integration. According to various embodiments, operations performed by a module, program, or another component may be sequentially, parallelly, repeatedly, or heuristically executed, at least some operations may be executed in a different order, omitted, or other operations may be added.

With the arm structure, the hinge structure, and the electronic device including the same according to various embodiments of the disclosure, by providing a detent load of a specified size without increasing the size (e.g., thickness) of the electronic device or while suppressing an increase in size (e.g., thickness), it is possible to support the foldable electronic device such that it maintains the folded state or perform the folding operation more rigidly.

In addition, with the arm structure, the hinge structure, and the electronic device including the same according to various embodiments of the disclosure, by resisting the repulsive force of the display in the folded state by using the increased detent load, it is possible to stably support the folded state of the electronic device, even if the stiffness, reaction force, or thickness of the display increases. Accordingly, with the hinge structure and the electronic device according to various embodiments of the disclosure, it is possible to provide an opportunity to apply, to the electronic device, a display having strong resistance to dents or wrinkles caused by external pressure or impact.

In addition, with the arm structure, the hinge structure, and the electronic device including the same according to various embodiments of the disclosure, it is possible to provide an opportunity to apply a flexible display of various materials or various shapes to a foldable electronic device with the increase in detent load.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a housing including a first housing part and a second housing part;
   a hinge structure connected to the first housing part and the second housing part,
   wherein the hinge structure includes:
      a first rotating shaft configured to rotate about a first axis;
      a second rotating shaft configured to rotate about a second axis;
      a first cam connected to the first rotating shaft and including at least two peaks;
      a second cam connected to the second rotating shaft and including at least two peaks;
      a third cam engaged with the first cam and including at least two peaks; and
      a fourth cam engaged with the second cam and including at least two peaks; and
   a flexible display disposed on the first housing part, the hinge structure, and the second housing part,
   wherein the display is configured to exert a restoring force from a folded state to an unfolded state when the housing is in an at least partially folded state, wherein the first cam is configured to rotate in a first direction and the second cam is configured to rotate in a second direction, the second direction being opposite with respect to the first direction, as the restoring force is applied to the hinge structure, wherein central portions of the peaks of the first cam and the fourth cam are inclined such that second sides thereof that face the second direction are higher than first sides thereof that face the first direction, and wherein central portions of the peaks of the second cam and the third cam are inclined such that second sides thereof that face the second direction are lower than first sides thereof that face the first direction.

2. The foldable electronic device of claim 1, further comprising:
a first arm part including the first cam, and a fifth cam connected to the first rotating shaft and located to be parallel to the first cam;
a second arm part including the second cam, and a sixth cam connected to the second rotating shaft and located to be parallel to the second cam;
a seventh cam engaged with the fifth cam; and
an eighth cam engaged with the sixth cam.

3. The foldable electronic device of claim 2, wherein the fifth cam is configured to rotate in the first direction and the sixth cam is configured to rotate in the second direction as the restoring force is applied to the hinge structure.

4. The foldable electronic device of claim 3,
wherein central portions of peaks of the fifth cam and the eighth cam are inclined such that second sides thereof that face the second direction is higher than first sides thereof that faces the first direction, and
wherein central portions of peaks of the sixth cam and the seventh cam are inclined such that second sides thereof that face the second direction is lower than first sides thereof that faces the first direction.

5. The foldable electronic device of claim 1, further comprising:
a cam member including the third cam in a first area corresponding to the first rotating shaft and the fourth cam in a second area corresponding to the second rotating shaft.

6. The foldable electronic device of claim 5, wherein the cam member further includes:
a cam body connecting the third cam and the fourth cam.

7. The foldable electronic device of claim 1, further comprising:
a first arm part, in which the first cam is disposed, and into which a portion of the first rotating part is connected; and
a second arm part, in which the second cam is disposed, and into which a portion of the second rotating part is connected.

8. The foldable electronic device of claim 7, further comprising:
wherein the first rotating part is configured to rotate about a third axis, and
wherein the second rotating part is configured to rotate about a fourth axis.

9. The foldable electronic device of claim 8, wherein a distance between the third axis and the fourth axis is smaller than a distance between the first axis and the second axis.

10. The foldable electronic device of claim 8, further comprising:
a first fastening part fastening the first arm part and the first rotating part; and
a second fastening part fastening the second arm part and the second rotating part,
wherein the first rotating part is coupled to the first housing part,
wherein the second rotating part is coupled to the second housing part, and
wherein the first fastening part is configured to slide along a hole formed on one side of the first rotating part and the second fastening part is configured to slide along a hole formed on one side of the second rotating part while the first housing part and the second housing part are unfolded from the folded state or folded from the unfolded state.

11. A foldable electronic device comprising:
a housing including a first housing part and a second housing part;
a hinge structure connected to the first housing part and the second housing part,
wherein the hinge structure includes:
a first rotating shaft configured to rotate about a first axis;
a first cam connected to the first rotating shaft and including at least two peaks; and
a second cam engaged with the first cam and including at least two peaks; and
a flexible display disposed on the first housing part, the hinge structure, and the second housing part,
wherein the display at least partially has a restoring force from a folded state to an unfolded state when the housing is in an at least partially folded state,
wherein the first cam is configured to rotate in a first direction as the restoring force is applied to the hinge structure,
wherein a central portion of a peak of the first cam is inclined such that a second side thereof that faces a second direction that is an opposite direction to the first direction is higher than a first side thereof that faces the first direction, and
wherein a central portion of a peak of the second cam is inclined such that a second side thereof that faces the second direction is lower than a first side thereof that faces the first direction.

12. The foldable electronic device of claim 11, further comprising:
an arm part including the first cam, and a third cam connected to the first rotating shaft and located to be parallel to the first cam; and
a fourth cam engaged with the third cam.

13. The foldable electronic device of claim 12, wherein the third cam is configured to rotate in the first direction as the restoring force is applied to the hinge structure.

14. The foldable electronic device of claim 13,
wherein a central portion of a peak of the third cam is inclined such that a second side thereof that faces the second direction is higher than a first side thereof that faces the first direction, and
wherein a central portion of a peak of the fourth cam is inclined such that a second side thereof that faces the second direction is lower than a first side thereof that faces the first direction.

15. The foldable electronic device of claim 11, wherein the peak of the first cam includes, with respect to the first direction:
a first part connected to one end of a valley of the first cam and having a first inclination angle;

a second part connected to the first part, having a second inclination angle, and corresponding to the central portion of the peak of the first cam; and a third part connected to the second part and having a third inclination angle.

16. The foldable electronic device of claim 15, wherein an absolute value of the second inclination angle is smaller than an absolute value of the first inclination angle, and an absolute value of the second inclination angle is smaller than an absolute value of the third inclination angle.

17. The foldable electronic device of claim 15, wherein an absolute value of the third inclination angle is equal to or larger than an absolute value of the first inclination angle.

18. The foldable electronic device of claim 15,
wherein the peak of the second cam includes, with respect to the second direction:
a fourth part connected to one end of a valley of the second cam and having a fourth inclination angle;
a fifth part connected to the fourth part, having a fifth inclination angle, and corresponding to the central portion of the peak of the second cam; and
a sixth part connected to the fifth part and having a sixth inclination angle,
wherein an absolute value of the fifth inclination angle is smaller than an absolute value of the fourth inclination angle, and
wherein an absolute value of the fifth inclination angle is equal to or larger than an absolute value of the sixth inclination angle.

19. The foldable electronic device of claim 18, wherein an absolute value of the sixth inclination angle is equal to or smaller than an absolute value of the fourth inclination angle.

20. The foldable electronic device of claim 11, further comprising:
a second rotating shaft configured to rotate about a second axis in correspondence to rotation of the second housing part;
a third cam connected to the second rotating shaft and including at least two peaks;
a fourth cam engaged with the third cam and including at least two peaks;
a first elastic body exhibiting an elastic force such that the first cam and the second cam contact each other; and
a second elastic body exhibiting an elastic force such that the third cam and the fourth cam contact each other,
wherein the third cam is configured to rotate in the second direction as the restoring force is applied to the hinge structure,
wherein a central portion of a peak of the third cam is inclined such that a second side thereof that faces the second direction is higher than a first side thereof that faces the first direction, and
wherein a central portion of a peak of the fourth cam is inclined such that a second side thereof that faces the second direction is lower than a first side thereof that faces the first direction.

* * * * *